(12) United States Patent
Simmons et al.

(10) Patent No.: US 12,497,430 B2
(45) Date of Patent: Dec. 16, 2025

(54) METHODS OF PRODUCING MULTIMERIC PROTEINS IN EUKARYOTIC HOST CELLS

(71) Applicant: Genentech, Inc., South San Francisco, CA (US)

(72) Inventors: Laura C. Simmons, Burlingame, CA (US); Noelia Blanco Talavan, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 1085 days.

(21) Appl. No.: 17/379,761

(22) Filed: Jul. 19, 2021

(65) Prior Publication Data

US 2021/0363178 A1 Nov. 25, 2021

Related U.S. Application Data

(63) Continuation of application No. PCT/US2020/014623, filed on Jan. 22, 2020.

(60) Provisional application No. 62/796,014, filed on Jan. 23, 2019.

(51) Int. Cl.
*C07K 1/14* (2006.01)
*C07K 16/46* (2006.01)
*C12N 5/071* (2010.01)

(52) U.S. Cl.
CPC .............. *C07K 1/14* (2013.01); *C07K 16/468* (2013.01); *C12N 5/0602* (2013.01); *C07K 2317/14* (2013.01); *C07K 2317/31* (2013.01); *C07K 2317/524* (2013.01); *C07K 2317/526* (2013.01)

(58) Field of Classification Search
None
See application file for complete search history.

(56) References Cited

U.S. PATENT DOCUMENTS

| | | |
|---|---|---|
| RE30,985 E | 6/1982 | Cartaya |
| 4,419,446 A | 12/1983 | Howley |
| 4,560,655 A | 12/1985 | Baker |
| 4,601,978 A | 7/1986 | Karin |
| 4,657,866 A | 4/1987 | Kumar |
| 4,767,704 A | 8/1988 | Cleveland |
| 4,816,567 A | 3/1989 | Cabilly |
| 4,927,762 A | 5/1990 | Darfler |
| 4,965,199 A | 10/1990 | Capon |
| 5,122,469 A | 6/1992 | Mather |
| 5,500,362 A | 3/1996 | Robinson |
| 5,545,806 A | 8/1996 | Lonberg |
| 5,545,807 A | 8/1996 | Surani |
| 5,569,825 A | 10/1996 | Lonberg |
| 5,591,828 A | 1/1997 | Bosslet |
| 5,624,821 A | 4/1997 | Winter |
| 5,625,126 A | 4/1997 | Lonberg |
| 5,633,425 A | 5/1997 | Lonberg |
| 5,648,260 A | 7/1997 | Winter |
| 5,661,016 A | 8/1997 | Lonberg |
| 5,731,168 A | 3/1998 | Carter |
| 5,750,373 A | 5/1998 | Garrard |
| 5,821,337 A | 10/1998 | Carter |
| 6,194,551 B1 | 2/2001 | Idusogie |
| 6,248,516 B1 | 6/2001 | Winter |
| 6,737,056 B1 | 5/2004 | Presta |
| 7,332,581 B2 | 2/2008 | Presta |
| 7,371,826 B2 | 5/2008 | Presta |
| 10,112,994 B2 * | 10/2018 | Giulianotti ........... C07K 16/468 |
| 2005/0014934 A1 | 1/2005 | Hinton |
| 2005/0079574 A1 | 4/2005 | Bond |
| 2005/0119455 A1 | 6/2005 | Fuh |
| 2005/0266000 A1 | 12/2005 | Bond |
| 2007/0117126 A1 | 5/2007 | Sidhu |
| 2007/0160598 A1 | 7/2007 | Dennis |
| 2007/0237764 A1 | 10/2007 | Birtalan |
| 2007/0292936 A1 | 12/2007 | Barthelemy |

(Continued)

FOREIGN PATENT DOCUMENTS

| | | |
|---|---|---|
| CN | 1886512 A | 12/2006 |
| CN | 104788567 A | 7/2015 |
| EP | 0404097 A2 | 12/1990 |

(Continued)

OTHER PUBLICATIONS

Blanco et al., Biotechnology and Bioengineering 117: 1946-1960 (Year: 2020).*
Verdino, P. et al. (Mar. 2018). "Emerging Trends in Bispecific Antibody and Scaffold Protein Therapeutics," Curr. Opin. Chem. Eng. 19:107-123, 8 pages.
Von Kreudenstein, T.S. et al. (2013, e-pub. Jul. 8, 2013). "Improving Biophysical Properties of a Bispecific Antibody Scaffold to Aid Developability: Quality by Molecular Design," mAbs 5(5):646-654.
Atwell, S. et al. (1997). "Stable Heterodimers From Remodeling the Domain Interface of a Homodimer Using A Phage Display Library," J. Mol. Biol. 270 (1):26-35.

(Continued)

*Primary Examiner* — Phuong Huynh
(74) *Attorney, Agent, or Firm* — Morrison & Foerster LLP

(57) ABSTRACT

The present disclosure relates to the production of multimeric polypeptides (e.g., comprising two or more subunits, each subunit comprising two or more polypeptide chains, such as a multispecific or bispecific antibody) in eukaryotic host cells. In some embodiments, provided herein are methods for producing a multimeric polypeptide in a eukaryotic host cell using a host cell that comprises a polynucleotide comprising a translation initiation sequence operably linked to an open-reading frame encoding each polypeptide of the multimeric polypeptide. Advantageously, the present disclosure demonstrates that tuning the strength of the translation initiation sequences linked to each open-reading frame allows for higher production of the multimeric polypeptide with fewer incorrectly assembled side products. The present disclosure further provides cells, methods of screening, and kits related thereto.

25 Claims, 32 Drawing Sheets
Specification includes a Sequence Listing.

(56) References Cited

U.S. PATENT DOCUMENTS

2009/0002360 A1    1/2009    Chen

FOREIGN PATENT DOCUMENTS

| WO | 198700195 A1 | 1/1987 |
|---|---|---|
| WO | 199003430 A1 | 4/1990 |
| WO | 199110741 A1 | 7/1991 |
| WO | 199301161 A1 | 1/1993 |
| WO | 199308829 A1 | 5/1993 |
| WO | 199411026 A2 | 5/1994 |
| WO | 199429351 A2 | 12/1994 |
| WO | 199429351 A3 | 2/1995 |
| WO | 199633735 A1 | 10/1996 |
| WO | 199634096 A1 | 10/1996 |
| WO | 199824893 A2 | 6/1998 |
| WO | 199824893 A3 | 8/1998 |
| WO | 199951642 A1 | 10/1999 |
| WO | 2003018771 A2 | 3/2003 |
| WO | 2004056312 A2 | 7/2004 |
| WO | 2004106381 A1 | 12/2004 |
| WO | 2004056312 A3 | 5/2005 |
| WO | 2005061547 A2 | 7/2005 |
| WO | 2005100402 A1 | 10/2005 |
| WO | 2005061547 A3 | 11/2005 |
| WO | 2006028956 A2 | 3/2006 |
| WO | 2006029879 A2 | 3/2006 |
| WO | 2006029879 A3 | 9/2006 |
| WO | 2007042261 A2 | 4/2007 |
| WO | 2007042261 A3 | 12/2007 |
| WO | 2008119567 A2 | 10/2008 |
| WO | 2008119567 A3 | 1/2009 |
| WO | 2011057120 A1 | 5/2011 |
| WO | 2012023053 A2 | 2/2012 |
| WO | 2012023053 A3 | 5/2012 |
| WO | 2013106704 A1 | 7/2013 |
| WO | 2015016786 A1 | 2/2015 |
| WO | 2016073791 A1 | 5/2016 |
| WO | 2016172485 A2 | 10/2016 |
| WO | 2016172485 A3 | 12/2016 |
| WO | 2016200543 A2 | 12/2016 |

OTHER PUBLICATIONS

Ayyar, B.V. et al. (Mar. 1, 2017, e-pub. Feb. 2, 2017). "Optimizing Antibody Expression: The Nuts and Bolts," Methods 116:51-62.

Barnes, D. et al. (Mar. 1, 1980). "Methods for Growth of Cultured Cells in Serum-Free Medium," Anal. Biochem. 102(2):255-270.

Blanco, N. et al. (Apr. 4, 2020). "Tailoring Translational Strength Using Kozak Sequence Variants Improves Bispecific Antibody Assembly and Reduces Product-Related Impurities in CHO Cells," Biotechnology and Bioengineering, 41 pages.

Brinkmann, U. et al. (2017, e-pub. Jan. 10, 2017). "The Making of Bispecific Antibodies," mABS 9(2):182-212.

Brüggemann, M. et al. (1993). "Designer Mice: The Production of Human Antibody Repertoires in Transgenic Animals," Year in Immuno. 7:33-40.

Brüggemann, M. et al. (Nov. 1, 1987). "Comparison of the Effector Functions of Human Immunoglobulins Using a Matched Set of Chimeric Antibodies," J. Exp. Med. 166:1351-1361.

Carter, P.J. et al. (Mar. 2018, e-pub. Dec. 1, 2017). "Next Generation Antibody Drugs: Pursuit of the 'High-Hanging Fruit'," Nat. Rev. Drug. Discov. 17(3):197-223.

Cavener, D.R. (1987). "Comparison of the Consensus Sequences Flanking Translational Start Sites in Drosophila and Vertebrates," Nucleic Acids Research 15(4):1353-1361.

Chan, A.C. et al. (May 2010). "Therapeutic Antibodies for Autoimmunity and Inflammation," Nature Reviews 10(5):301-316.

Chen, Y. et al. (1999). "Selection and Analysis of an Optimized Anti-VEGF Antibody: Crystal Structure of an Affinity-Matured Fab in Complex with Antigen," J. Mol. Biol. 293:865-881.

Chintalacharuvu, K.R. et al. (2002). "Cysteine Residues Required for the Attachment of the Light Chain in Human IgA2," J. Immunol. 169(9):5072-5077.

Chothia, C. (1976). "The Nature of the Accessible and Buried Surfaces in Proteins," J. Mol. Biol. 105:1-14.

Chothia, C. et al. (Aug. 20, 1987). "Canonical Structures for the Hypervariable Regions of Immunoglobulins," J. Mol. Biol. 196(4):901-917.

Clackson, T. et al. (Aug. 15, 1991). "Making Antibody Fragments Using Phage Display Libraries," Nature 352:624-628.

Clynes, R. et al. (Jan. 1998). "Fc Receptors Are Required in Passive and Active Immunity to Melanoma," Proc. Natl. Acad. Sci. USA 95:652-656.

Cragg, M.S. et al. (Apr. 1, 2004). "Antibody Specificity Controls In Vivo Effector Mechanisms of Anti-CD20 Reagents," Blood 103(7):2738-2743.

Cragg, M.S. et al. (Feb. 1, 2003). "Complement-Mediated Lysis by Anti-CD20 Mab Correlates With Segregation Into Lipid Rafts," Blood 101(3):1045-1052.

De Bernardis, F. et al. (Jan. 1, 2007). "Human Domain Antibodies against Virulence Traits of Candida albicans Inhibit Fungus Adherence to Vaginal Epithelium and Protect against Experimental Vaginal Candidiasis," J Infect Dis. 195(1):149-157.

Degorce, F., et al. (2009). "HTRF: A Technology Tailored for Drug Discovery—A Review of Theoretical Aspects and Recent Applications," Curr Chem Genomics 3: 22-32.

Dillon, M. et al. (2017, e-pub. Dec. 8, 2016). "Efficient Production of Bispecific IgG of Different Isotypes and Species of Origin in Single Mammalian Cells," MABS 9(2):213-230.

Dong et al. (May/Jun. 2011, e-pub. May 1, 2011). A Stable IgG-Like Bispecific Antibody Targeting the Epidermal Growth Factor Receptor and the Type I Insulin-Like Growth Factor Receptor Demonstrates Superior Anti-Tumor Activity,: mAbs 3(3):273-288.

Duncan, A.R. et al. (Apr. 21, 1988). "The Binding Site for C1q on IgG," Nature 322:738-740.

Dvir, S. et al. (2013, e-pub. Jul. 5, 2013). "Deciphering the Rules by Which 5'-UTR Sequences Affect Protein Expression in Yeast," Proc Natl Acad Sci USA 110(30):E2792-E2801.

Fellouse, F.A. et al. (Aug. 24, 2004). "Synthetic Antibodies from a Four-Amino-Acid Code: A Dominant Role for Tyrosine in Antigen Recognition," Proc. Natl. Acad. Sci. USA 101(34):12467-12472.

Fishwild, D.M. et al. (Jul. 1996). "High-Avidity Human IgGx Monoclonal Antibodies from a Novel Strain of Minilocus Transgenic Mice," Nature Biotechnol. 14:845-851.

Gaidukov, L. et al. (2018, e-pub. Apr. 2, 2018). "A Multi-Landing Pad DNA Integration Platform for Mammalian Cell Engineering," Nucleic Acids Res. 46(8):4072-4086.

Gazzano-Santoro, H. et al. (Mar. 28, 1997). "A Non-Radioactive Complement-Dependent Cytotoxicity Assay for Anti-CD20 Monoclonal Antibody," J. Immunol. Methods 202:163-171.

Graham. F.L. et al. (1977). "Characteristics of a Human Cell Line Transformed by DNA from Human Adenovirus Type 5," J. Gen Virol. 36:59-74.

Griffiths, A.D. et al. (1993). "Human Anti-Self Antibodies With High Specificity From Phage Display Libraries," EMBO J. 12(2):725-734.

Gruber, M. et al. (1994). "Efficient Tumor Cell Lysis Mediated by a Bispecific Single Chain Antibody Expressed in Escherichia coli," J. Immunol. 152:5368-5374.

Grzegorski, S.J. et al. (Sep. 23, 2014). "Natural Variabilty of Kozak Sequences Correlates With Function in a Zebrafish Model," PLoS One. 9(9):e108475, 6 pages.

Gupta, P. et al. (Sep. 7, 2016, e-pub. Jun. 15, 2016). "Comparative Analysis of Contextual Bias Around the Translation Initiation Sites in Plant Genomes," J Theor Biol. 404:303-311.

Guss, B. et al. (Jul. 1986). "Structure of the IgG-Binding Regions of Streptococcal Protein G," EMBO J. 5(7):1567-1575.

Guyer, R.L. et al. (Aug. 1976). "Immunoglobulin Binding by Mouse Intestinal Epithelial Cell Receptors," J. Immunol. 117(2):587-593.

Ham, R.G. et al. (1979). "Media and Growth Requirements," Meth. Enzymol. 58:44-93.

Hamers-Casterman, C. et al. (Jun. 3, 1993). "Naturally Occurring Antibodies Devoid of Light Chains," Nature 363:446-448.

(56) References Cited

OTHER PUBLICATIONS

Hamilton, R. et al. (Apr. 24, 1987). "Compilation and Comparison of the Sequence Context Around the AUG Startcodons in *Saccharomyces cerevisiae* mRNAs," Nucleic Acids Res. 15(8):3581-3593.
Hammerling, G.J. et al. Eds. (1981). "Monoclonal Antibodies and T-Cell Hybridomas," Chapter 12 in Research Monographs in Immunology Elsevier. New York, NY, 3:563-681.
Harlow, E. et al. (1988). Antibodies a Laboratory Manual, Table of Contents only, 9 pages.
Hellstrom, I. et al. (Mar. 1985). "Strong Antitumor Activities of IgG3 Antibodies to a Human Melanoma-associated Ganglioside," Proc. Natl. Acad. Sci. USA 82:1499-1502.
Hellstrom, I. et al. (Sep. 1986). "Antitumor Effects of L6, an IgG2a Antibody That Reacts With Most Human Carcinomas," Proc. Natl. Acad. Sci. USA 83:7059-7063.
Helm, B.A. et al. (Jun. 1991). "The Nature and Importance of the Inter-E Chain Disulfide Bonds in Human IgE," Eur. J. Immunol. 21(6):1543-1548.
Hollinger, P. et al. (Jul. 1993). "Diabodies: Small Bivalent and Bispecific Antibody Fragments," Proc. Natl. Acad. Sci. USA 90:6444-6448.
Hongo, J.A.S. et al. (1995). "Development and Characterization of Murine Monoclonal Antibodies to the Latency-Associated Peptide of Transforming Growth Factor β1," Hybridoma 14(3):253-260.
Hoogenboom, H.R. et al. (1992). "By-Passing Immunisation. Human Antibodies From Synthetic Repertoires of Germline VH Gene Segments Rearranged in Vitro," J. Mol. Biol. 227:381-388.
Hoogenboom, H.R. et al. (2001) "Overview of Antibody Phage-Display Technology and Its Applications," Methods in Molecular Biology 178:1-37.
Hudson, P.J. et al. (Jan. 2003). "Engineered Antibodies," Nature Medicine 9(1):129-134.
Humphreys, D.P. et al. (2000). "High-Level Periplasmic Expression in *Escherichia coli* Using a Eukaryotic Signal Peptide: Importance of Codon Usage at the 5' End of the Coding Sequence," Protein Expr. Purif. 20(2):252-264.
Idusogie, E.E. et al. (2000). "Mapping of the C1q Binding Site on Rituxan, a Chimeric Antibody With a Human IgG1 Fc," J. Immunol. 164:4178-4184.
Ingolia, N.T. (Mar. 24, 2016). "Ribosome Footprint Profiling of Translation throughout the Genome," Cell 165:22-33.
International Preliminary Report on Patentability, issued Jul. 27, 2021, for PCT Application No. PCT/US2020/014623, filed Jan. 22, 2020, 10 pages.
International Search Report and Written Opinion, dated Apr. 29, 2020, for PCT Application No. PCT/US2020/014623, filed Jan. 22, 2020, 17 pages.
Ivanov, I.P. et al. (Oct. 19, 2010, e-pub. Oct. 4, 2010). "Initiation Context Modulates Autoregulation of Eukaryotic Translation Initiation Factor 1 (eIF1)," Proc Natl Acad Sci USA 107(42):18056-18060.
Jakobovits, A. et al. (Mar. 18, 1993). "Germ-Line Transmission and Expression of a Human-Derived Yeast Artificial Chromosome," Nature 362:255-258.
Jakobovits, A. et al. (Mar. 1993). "Analysis of Homozygous Mutant Chimeric Mice: Deletion of the Immunoglobulin Heavy-Chain Joining Region Blocks B-Cell Development and Antibody Production," Proc. Natl. Acad. Sci. USA 90:2551-2555.
Johnson, G. et al. (2003). "The Kabat Database and a Bioinformatics Example," Chapter 2 in Methods in Molecular Biology, Lo, B.K.C., ed., Human Press, Totowa, N.J., 248:1-25.
Kabat, E.A. et al. (1991). Sequences of Proteins of Immunological Interest, 5th ed., Public Health Service, National Institutes of Health, Bethesda, MD. TOC, 21 pages.
Kelley, B. et al. (2018, e-pub. May 4, 2018). "A Different Perspective: How Much Innovation Is Really Needed for Monoclonal Antibody Production Using Mammalian Cell Technology," Adv Biochem. Eng. Biotechnol., 20 pages.

Kim, J-K. et al. (1994). "Localization of the Site of the Murine IgGI Molecule That is Involved in Binding to the Murine Intestinal Fc Receptor," Eur. J. Immunol. 24:2429-2434.
Koh, E.Y.C. et al. (Dec. 9, 2013). "An Internal Ribosome Entry Site (IRES) Mutant Library for Tuning Expression Level of Multiple Genes in Mammalian Cells," PLOS One 8(12):e82100, 9 pages.
Kohler, G. et al. (Aug. 7, 1975) "Continuous Cultures of Fused Cells Secreting Antibody of Predefined Specificity," Nature 256:495-497.
Kontermann, R.E. et al. (March-Apr. 2012, e-pub. Mar. 1, 2012). "Dual Targeting Strategies With Strategies With Bispecific Antibodies," MAbs. 4(2):182-197.
Kostelny, S.A. et al. (Mar. 1, 1992). "Formation of a Bispecific Antibody by the Use of Leucine Zippers," J. Immunol. 148(5):1547-1553.
Kou, G. et al. (Dec. 28, 2010, e-pub. Sep. 9, 2010). "A Bispecific Antibody Effectively Inhibits Tumor Growth and Metastasis by Simultaneous Blocking Vascular Endothelial Growth Factor A and Osteopontin," Cancer Lett. 299(2):130-136.
Kozak, M. (1987). "An Analysis of 5'-Noncoding Sequences From 699 Vertebrate Messenger RNAs," Nucleic Acids Res. 5(20):8125-8148.
Kozak, M. (Aug. 20, 1987). "At Least Six Nucleotides Preceding the AUG Initiator Codon Enhance Translation in Mammalian Cell," J. Mol. Biol. 196(4):947-950.
Kozak, M. (Dec. 1978). "How Do Eucaryotic Ribosomes Select Initiation Regions in Messenger RNA?," Cell 5(4):1109-1123.
Kozak, M. (Jan. 25, 1984). "Compilation and Analysis of Sequences Upstream From the Translational Start Site in Eukaryotic mRNAs," Nucleic Acids Res. 12(2):857-872.
Kozak, M. (Jan. 31, 1986). "Point Mutations Define a Sequence Flanking the AUG Initiator Codon That Modulates Translation by Eukaryotic Ribosomes," Cell. 44(2):283-292.
Kozak, M. (May 1, 1997). "Recognition of AUG and Alternative Initiator Codons Is Augmented by G in Position +4 But is Not Generally Affected by the Nucleotides in Positions +5 and +6," EMBO J. 16(9):2482-2492.
Kozak, M. (Nov. 2, 1991). "An Analysis of Vertebrate mRNA Sequences: Intimations of Translational Control," J Cell Biol. 115(4):887-903.
Kozak, M. (Oct. 24, 1981). "Possible Role of Flanking Nucleotides in Recognition of the AUG Initiator Codon by Eukaryotic Ribosomes," Nucleic Acids Res. 9(20):5233-5252.
Kozak, M. (Oct. 25, 1991). "Structural Features in Eukaryotic mRNAs That Modulate the Initiation of Translation," J Biol Chem. 266(30):19867-19870.
Laventie, B.-J. et al. (Sep. 27, 2011, e-pub. Spetmeber 19, 2011). "Heavy Chain-Only Antibodies and Tetravalent Bispecific Antibody Neutralizing *Staphylococcus aureus* Leukotoxins," Proc Natl Acad Sci USA 108(39):16404-16409.
Lee, C.V. et al. (2004). "Bivalent Antibody Phage Display Mimics Natural Immunoglobulin," .J. Immunol. Methods 284(1-2):119-132.
Lee, C.V. et al. (2004). "High-Affinity Human Antibodies From Phage-Displayed Synthetic Fab Libraries With a Single Framework Scaffold," J. Mol. Biol. 340:1073-1093.
Lee, J.S. et al. (2015, e-pub. Feb. 25, 2015). "Site Specific Integration in CHO Cells Mediated by CRISPR/Cas9 and Homology-Directed DNA Repair Pathway," Sci. Rep. 5:8572, 11 pages.
Lee, Y.K. et al. (Jul. 1999). "BiP and Immunoglobulin Light Chain Cooperate to Control the Folding of Heavy Chain and Ensure the Fidelity of Immunoglobulin Assembly," Mol. Biol. Cell 10(7):2209-2219.
Lewis, N.E. et al. (Aug. 2013, e-pub. Jul. 21, 2013). "Genomic Landscapes of Chinese Hamster Ovary Cell Lines as Revealed by the Cricetulus griseus Draft Genome," Nat. Biotechnol. 31(8):759-765.
Lindmark, R. et al. (1983). "Binding of Immunoglobulins to Protein A and Immunoglobulin Levels in Mammalian Sera," J. Immunol. Meth. 62:1-13.
Liu, H. et al. (2012). "Disulfide Bond Structures of IgG Molecules. Structural Variations, Chemical Modifications and Possible Impacts to Stability and Biological Function," mAbs 4(1):17-23.

(56) References Cited

OTHER PUBLICATIONS

Lonberg, N. et al. (1995, e-pub. Jul. 10, 2009). "Human Antibodies From Transgenic Mice," Int. Rev. Immunol. 13(1):65-93.
Lonberg, N. et al. (Apr. 28, 1994). "Antigen Specific Human Antibodies From Mice Comprising Four Distinct Genetic Modifications," Nature 368(6474):856-859.
Marks, J.D. et al. (1991). "By-Passing Immunization. Human Antibodies From V-Gene Libraries Displayed on Phage," J. Mol. Biol. 222:581-597.
Marks, J.D. et al. (2004) "Selection of Human Antibodies from Phage Display Libraries," Chapter 8 in Methods in Molecular Biology, LO, B.K.C. (ed.), Humana Press Inc., Totowa, NJ, 248:161-176, 29 pages.
Marks, J.D. et al. (Jul. 1992). "By-Passing Immunization: Building High Affinity Human Antibodies by Chain Shuffling," Bio/Technology 10:779-783.
Mather, J.P. (1980). "Establishment and Characterization of Two Distinct Mouse Testicular Epithelial Cell Lines," Biology of Reproduction 23:243-252.
Mather, J.P. et al. (1982). "Culture of Testicular Cells in Hormone-Supplemented Serum-Free Medium," Annals N.Y. Acad. Sci. 383:44-68.
McCafferty, J. et al. (Dec. 6, 1990). "Phage Antibodies: Filamentous Phage Displaying Antibody Variable Domains," Nature 348:552-554.
Merchant, A. M. et al. (Jul. 1998). "An Efficient Route to Human Bispecific IgG," Nature Biotechnology 16:677-681.
Milstein, C. et al. (Oct. 6, 1983). "Hybrid Hybridomas and Their Use in Immunohistochemistry," Nature 305:537-539.
Mohan, R.A. et al. (Nov. 2014, e-pub. Aug. 5, 2014). "A Mutation in the Kozak Sequence of GATA4 Hampers Translation In a family With Atrial Septal Defects," Am J Med Genet A 164A(11):2732-2738.
Morrison, S.L. (Apr. 28, 1994). "Success in Specification," Nature 368:812-813.
Nanda, J.S. et al. (Feb. 22, 2013, e-pub. Jan. 4, 2013). "Coordinated Movements of Eukaryotic Translation Initiation Factors eIF1, eIF1A, and eIF5 Trigger Phosphate Release from eIF2 in Response to Start Codon Recognition by the Ribosomal Preinitiation Complex," J. Biol Chem. 288(8):5316-5329.
Neuberger, M. (Jul. 1996) "Generating High-Avidity Human Mabs in Mice," Nature Biotechnology 14:826, 1 page.
Pestova, T.V. et al. (Nov. 15, 2002). "The Roles of Individual Eukaryotic Translation Initiation Factors in Ribosomal Scanning and Initiation Codon Selection," Genes Dev. 16(22):2906-2922.
Petkova, S.B. et al. (2006, e-pub. Oct. 31, 2006). "Enhanced Half-Life of Genetically Engineered Human IgG1 Antibodies in a Humanized FcRn Mouse Model: Potential Application in Humorally Mediated Autoimmune Disease," Int'l. Immunol. 18(12):1759-1769.
Picken, R.N. et al. (Oct. 1983). "Nucleotide Sequence of the Gene for Heat-Stable Enterotoxin II of *Escherichia coli*," Infect. Immun. 42(1):269-275.
Plückthun, A. (1994). "Antibodies from *Escherichia coli*," in Chapter 11 The Pharmacology of Monoclonal Antibodies, vol. 113, Rosenburg and Moore eds., Springer-Verlag, New York, pp. 269-315, 48 pages.
Rajendra, Y. et al. (Mar. 1, 2017, e-pub. Feb. 3, 2017). "Transient and Stable CHO Expression, Purification and Characterization of Novel Hetero-Dimeric Bispecific IgG Antibodies," Biotechnology Progress 33(2):469-477.
Ravetch, J.V. et al. (1991). "Fc Receptors," Annu. Rev. Immunol. 9:457-492.
Reyes, G.R. et al. (Jun. 17, 1982) "Expression of Human β-interferon cDNA Under the Control of a Thymidine Kinase Promoter from Herpes Simplex Virus," Nature 297:598-601.

Ridgway, J.B.B. et al. (1996). "'Knobs-Into-Holes' Engineering of Antibody CH3 Domains for Heavy Chain Heterodimerization," Protein Engineering 9(7):617-621.
Schlatter, S. et al. (Jan. 1, 2005, e-pub. Nov. 16, 2004). "On the Optimal Ratio of Heavy to Light Chain Genes for Efficient Recombinant Antibody Production by CHO Cells," Biotechnology Progress 21(1):122-133.
Sheriff, S. et al. (Sep. 1996). "Redefining the Minimal Antigen-Binding Fragment," Nature Struct. Biol. 3(9):733-736.
Shields, R.L. et al. (Mar. 2, 2001). "High Resolution Mapping of the Binding Site on Human IgG1 for FcγRI, FcγRII. FcγRIII, and FcRn and Design of IgG1 Variants With Improved Binding to the FcγR," J. Biol.Chem. 276(9):6591-6604.
Shin, S-U. et al. (Apr. 1992). "Structural and Functional Properties of Mouse-Human Chimeric IgD," Hum. Antibodies Hybridomas 3(2):65-74.
Sidhu, S.S. et al. (2004). "Phage-Displayed Antibody Libraries of Synthetic Heavy Chain Complementarity Determining Regions," J. Mol. Biol. 338(2):299-310.
Simmons, L.C. et al. (May 1996). "Translational Level is a Critical Factor for the Secretion of Heterologous Proteins in *Escherichia coli*," Nat. Biotechnol. 14(5):629-634.
Sonenberg, N et al. (Mar. 28, 2013). "Regulation of Translation Initiation in Eukaryotes: Mechanisms and Biological Targets," Cell 136(4):731-745. 28 pages.
Spiess, C et al. (2015, e-pub. Jan. 27, 2015). "Alternative Molecular Formats and Therapeutic Applications for Bispecific Antibodies," Mol. Immunol. 67:95-106.
Spiess, C. et al. (Aug. 2013, e-pub. Jul. 7, 2013). "Bispecific Antibodies With Natural Architecture Produced by Co-Culture of Bacteria Expressing Two Distinct Half-Antibodies," Nature Biotech. 31(8):753-758.
Traunecker, A. et al. (1991). "Bispecific Single Chain Molecules (Janusins) Target Cytotoxic Lymphocytes on HIV Infected Cells," EMBO J. 10(12):3655-3659.
Tutt, A. et al. (Jul. 1, 1991), "Trispecific F(ab')3 Derivatives That Use Cooperative Signaling Via The TCR/CD3 Complex and CD2 to Activate and Redirect Resting Cytotoxic T Cells," J. Immunol. 147:60-69.
Urlaub, G. et al. (Jul. 1980). "Isolation of Chinese Hamster Cell Mutants Deficient in Dihydrofolate Reductase Activity," Proc. Natl. Acad. Sci. USA 77(7):4216-4220.
Vara, J.A. et al. (1986). "Expression in Mammalian Cells of a Gene From Steptomyces alboniger Conferring Puromycin Restance," Nucleic Acids Res. 14(11):4617-4624.
Wiersma, K.J. et al. (1995). "Assembly of IgM. Role of Disulfide Bonding and Noncovalent Interactions," J. Immunol. 154(10):5265-5272.
Winter, G. el al. (1994). "Making Antibodies by Phage Display Technology," Ann. Rev. Immunol. 12:433-455.
Wurm, F.M. (Nov. 2004, e-pub. Nov. 4, 2004). "Production of Recombinant Protein Therapeutics in Cultivated Mammalian Cells," Nature Biotechnology 22(11):1393-1398.
Xu, J.L. et al. (Jul. 2000). "Diversity in the eCDR3 Region of VH is Sufficient for Most Antibody Specificities," Immunity 13:37-45.
Yaniv, M. (May 6, 1982). "Enhancing Elements for Activation of Eukaryotic Promoters," Nature 297:17-18.
Zamyatnin, A.A. (1972). "Protein Volume in Solution," Prog. Biophys. Mol. Biol. 24:107-123.
Zapata, G. et al. (1995). "Engineering Linear F(ab')2 Fragments For Efficient Production in *Escherichia coli* and Enhanced Antiproliferative Activity," Protein Engineering 8(10):1057-1062.
Zhao, M. et al. (Jul. 2018, e-pub. May 22, 2018). "Rapid Development of Stable Transgene CHO Cell Lines by CRISPR/Cas9-Mediated Site-Specific Integration Into C12orf35," Appl. Microbiol. Biotechnol. 102(14):6105-6117.

\* cited by examiner

| Name | Sequence |
|---|---|
| Kz.Wt / consensus | ACC ATG G |
| Kz.G (A₋₃>G) | GCC ATG G |
| Kz.T (A₋₃>T) | TCC ATG G |
| Kz.TAG (ACC₋₃>TAG) | TAG ATG G |
| Kz.3T (ACC₋₃>TTT) | TTT ATG G |

FIG. 1

Kozak Wt        5'-CCCACC<u>ATG</u>GGA-3'
                      -3   +4

Kozak library   5'-NNNNN<u>ATG</u>NGA-3'

| Phase | Variants | Transient transfection (n times)* |
|---|---|---|
| 1st Round | 108 variants | n=2 |
| 2nd Round | 66 variants | n=2 |
| 3rd Round | 28 variants | n=3 |
| 4th Round | 10 variants | n=4 |

* Different DNA prep

Kozak variants selected

| Name | range |
|---|---|
| Kz.3 | (0.3x) |
| Kz.135 | (0.5x) |
| Kz.148 | (0.8x) |
| Kz.Wt | (1x) |
| Kz.228 | (1.3x) |

| Name | Sequence |
|---|---|
| Kz.3 | TTTTT ATG G |
| Kz.135 | GGCTC ATG C |
| Kz.148 | CCTAG ATG C |
| WT | CCACC ATG G |
| Kz.228 | GAAGT ATG A |

FIG. 10

| Ab1<br>Front vectors | | HC | | | | |
|---|---|---|---|---|---|---|
| | | Kz.3 | Kz.135 | Kz.148 | Kz.Wt | Kz.228 |
| | Kz.3 | 1 | 2 | 3 | 4 | 5 |
| | Kz.135 | 6 | 7 | 8 | 9 | 10 |
| | K.148 | 11 | 12 | 13 | 18 | 15 |
| | Kz.Wt | 16 | 17 | 18 | 19 | 20 |
| | Kz.228 | 21 | 22 | 23 | 24 | 25 |

FIG. 11

| Kozak variant | Translational strength |
|---|---|
| Kz.228 | 1.3 |
| Wt | 1 |
| Kz.148 | 0.75 |
| Kz.135 | 0.5 |
| Kz.3 | 0.3 |

| Kozak mix clone | Kozak sequence variant | | | |
|---|---|---|---|---|
| | Ab1 | | Ab2 | |
| | HC | LC | HC | LC |
| 69 | Kz.228 | Kz.228 | Kz.228 | Wt |
| 61 | Kz.228 | Wt | Kz.228 | Kz.228 |
| 88 | Kz.228 | Wt | Kz.228 | Kz.228 |
| 90 | Kz.228 | Wt | Kz.148 | Wt |
| 26 | Kz.228 | Kz.228 | Kz.135 | Kz.228 |
| 11 | Kz.228 | Wt | | Kz.228 |
| 22 | Wt | Kz.228 | Kz.135 | Wt |
| 28 | Wt | Wt | Kz.3 | Wt |

| Transfection #1 | Kozak sequence variant | | | | | |
|---|---|---|---|---|---|---|
| | Ab1 | | | Ab2 | | |
| Kozak mix clone | HC | LC | HC | LC |
| 26 | Kz.228 | Kz.228 | Kz.135 | Kz.228 |
| 11 | Kz.228 | Wt | Kz.135 | Kz.228 |
| 22 | Wt | Kz.228 | Kz.135 | Wt |
| 28 | Wt | Wt | Kz.3 | Wt |
| 7 | Kz.228 | Wt | Kz.135 | Wt |
| 33 | Kz.228 | Kz.228 | Kz.135 | Kz.228 |
| 42 | Wt | Wt | Kz.148 | Kz.228 |
| 4 | Wt | | Kz.3 | Wt |
| 24 | Wt | | Kz.148 | Kz.148 |
| 29 | | | | |
| 3 | | | Kz.135 | |

| Transfection #2 | Kozak sequence variant | | | | | |
|---|---|---|---|---|---|---|
| | Ab1 | | | Ab2 | | |
| Kozak mix clone | HC | LC | HC | LC |
| 61 | Kz.228 | Wt | Kz.228 | Kz.228 |
| 69 | Kz.228 | Kz.228 | Kz.228 | Wt |
| 88 | Wt | Wt | Kz.228 | Kz.228 |
| 90 | Kz.228 | Wt | Kz.148 | Wt |
| 60 | Kz.228 | Kz.135 | | Wt |
| 93 | Wt | Kz.228 | Kz.148 | Kz.228 |
| 50 | Kz.3 | Wt | Kz.148 | Wt |
| 76 | Kz.228 | Kz.3 | Kz.3 | Kz.228 |
| 58 | Wt | Kz.228 | kz.135 | Wt |
| 91 | Kz.228 | Wt | Kz.3 | Kz.228 |
| 51 | | | | Kz.228 |

FIG. 21C

| Kozak mix clone | Kozak sequence variant | | | | | |
|---|---|---|---|---|---|---|
| | Ab1 | | | Ab2 | | |
| | HC | LC | | HC | LC | |
| 15L | Wt | Kz.135 | | Kz.135 | Kz.228 | |
| 17M | Kz.135 | Kz.135 | | Wt | Kz.228 | |
| 21L | Kz.3 | | Kz.228 | Kz.3 | Kz.148 | |
| 12M | Wt | Kz.228 | | Kz.135 | Wt | |
| 28M | Kz.148 | Kz.148 | | Kz.148 | Kz.3 | |
| 14L | Kz.228 | Kz.135 | | Kz.135 | Kz.148 | |
| 18L | Kz.135 | Wt | | Kz.3 | Wt | |

| Kozak variant | Translational strength |
|---|---|
| Kz.228 | 1.3 |
| Wt | 1 |
| Kz.148 | 0.75 |
| Kz.135 | 0.5 |
| Kz.3 | 0.3 |

| Y43 | CE-SDS | | MS | | | Kozak sequence variant | | | |
|---|---|---|---|---|---|---|---|---|---|
| | | | LMWS (1HC + 1LC) | | Main peak (2LC + 2HC) | Ab1 | | Ab2 | |
| Kozak mix clone | Titer (g/L) | Main peak (%) | Pre-Peaks (%) | (Knob ½ mAb) Ab2 HC + Ab2 LC | Ab1 HC + Ab2 LC | Bispecific antibody | HC | LC | HC | LC |
| 17 | 0.8 | 47.8 | 52.2 | 50.8% | 1.4% | 47.8% | Kz.135 | Kz.135 | Wt | Kz.228 |

| Kozak variant | Translational strength |
|---|---|
| Kz.228 | 1.3 |
| Wt | 1 |
| Kz.135 | 0.5 |

FIG. 22C

METHODS OF PRODUCING MULTIMERIC PROTEINS IN EUKARYOTIC HOST CELLS

CROSS REFERENCE TO RELATED APPLICATIONS

This application is a continuation of International Application No. PCT/US2020/014623, filed internationally on Jan. 22, 2020, which claims the priority benefit of U.S. Provisional Application Ser. No. 62/796,014, filed Jan. 23, 2019, each of which is hereby incorporated by reference in its entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 146392045201SEQLIST.TXT, date recorded: Jul. 7, 2021, size: 5 KB).

FIELD

The present disclosure relates to methods for producing multimeric polypeptides in a eukaryotic (e.g., mammalian) host cell, as well as cells, methods, and kits or articles of manufacture related thereto.

BACKGROUND

Therapeutic antibodies represent the most successful biological drugs. In the past 30 years, 40+ therapeutic antibodies have been approved for clinical use in various indications, including cancer, autoimmune, infectious and vascular diseases. Thus, therapeutic antibodies represent one of the fastest growing areas of the pharmaceutical industry and their clinical impact is remarkable.

Due to the fact that most diseases involve several parallel signaling pathways, multiple inhibitions of receptors and ligands may achieve better therapeutic efficacy. Therefore, bispecific antibodies (bsAb), which have the ability to bind to two different epitopes, have emerged as promising for application in multifaceted disease therapies such as inflammatory and autoimmune diseases (Chan A C, Carter P J. *Nat Rev Immunol.* 2010; 10(5):301-16), cancer (Kou G, Shi J, Chen L, Zhang D, Hou S, Zhao L, et al. *Cancer Lett.* 2010; 299(2):130-6; Dong J, Sereno A, Aivazian D, Langley E, Miller B R, Snyder W B, et al. *MAbs.* 2011; 3(3):273-88) and infectious diseases (De Bernardis F, Liu H, O'Mahony R, La Valle R, Bartollino S, Sandini S, et al. *J Infect Dis.* 2007; 195(1):149-57; Laventie B J, Rademaker H J, Saleh M, de Boer E, Janssens R, Bourcier T, et al. *Proc Natl Acad Sci USA.* 2011; 108(39):16404-9) among others (Kontermann R E. *MAbs.* 2012; 4(2):182-97; Brinkmann U, Kontermann R E. *MAbs.* 2017; 9(2):182-212; Carter P J, Lazar G A. *Nat Rev Drug Discov.* 2018; 17(3):197-223). Over the past decades, genetic engineering has resulted in over 60 different bispecific antibody formats improving immunogenicity, pharmacokinetics properties and distribution of bsAb (Spiess C, Zhai Q, Carter P J. *Mol Immunol.* 2015; 67(2 Pt A):95-106).

Regardless of the application of bsAb, the production process has been challenging due to promiscuous pairing of two different heavy chains and two different light chains resulting in 16 different combinations with only one being bispecific, which makes it difficult to produce them in sufficient quantity, quality and assembly to support both preclinical and clinical development. Antibody engineering has been used to alleviate the chain mispairing problem through heterodimerization of the heavy or light chain with knobs-into-holes and crossMab technology respectively (Ridgway J B, Presta L G, Carter P. *Protein Eng.* 1996; 9(7):617-21; Atwell S, Ridgway J B, Wells J A, Carter P. *J Mol Biol.* 1997; 270(1):26-35; Merchant A M, Zhu Z, Yuan J Q, Goddard A, Adams C W, Presta L G, et al. *Nat Biotechnol.* 1998; 16(7):677-81). A manufacturing process solution is to employ separate expression of half-antibodies followed by in vitro assembly to the bsAb (Spiess C, Merchant M, Huang A, Zheng Z, Yang N Y, Peng J, et al. *Nat Biotechnol.* 2013; 31(8):753-8). This is linked, however, with a more time-consuming and costly manufacturing process due to the generation of two distinct stable cell lines.

Therefore, co-expression of two antibodies in a single cell might be more straightforward, but at the same time frequently requires more extensive optimization of expression systems to guide the light chain to its cognate heavy chain and achieve a suitable amount of correctly assembled bsAb, avoiding presence of undesired side products and the need for complex purification processes.

Over the past few decades, mammalian cells such as Chinese hamster ovary (CHO) cells have emerged as the primary host for the biopharmaceutical industry (Wurm F M. *Nat Biotechnol.* 2004; 22(11):1393-8). Bioprocessing innovations and cell engineering efforts have improved product titer (Ayyar B V, Arora S, Ravi S S. Methods. 2017; 116:51-62; Kelley B, Kiss R, Laird M. *Adv Biochem Eng Biotechnol.* 2018. Epub 2018/05/04); however, uncharacterized cellular processes and gene regulatory mechanisms still hinder cell growth, specific productivity and protein quality. Currently, there are a few systematic approaches to precisely control the translation levels of recombinant proteins in mammalian cells.

Although advances have been made in the engineering of complex antibody formats such as bispecific antibodies, the manufacturability of these in a single mammalian expression system often exhibits low performance. A low titer and insufficient product quality are two of the factors that contribute to making stable production of bsAb difficult. As a consequence, there is an urgent need to identify the limiting steps in the production system and to provide methods that allow for improved production of correctly assembled multimeric polypeptides, e.g., in a eukaryotic or mammalian host cell system.

All references cited herein, including patent applications, patent publications, non-patent literature, and UniProtKB/Swiss-Prot Accession numbers are herein incorporated by reference in their entirety, as if each individual reference were specifically and individually indicated to be incorporated by reference.

SUMMARY

To meet these and other demands, provided herein are methods for producing multimeric polypeptides in a eukaryotic (e.g., mammalian) host cell. These multimeric polypeptides comprise two or more subunits, with each subunit comprising two or more polypeptide chains (e.g., as with a multispecific or bispecific antibody). Advantageously, these methods provide for more precise manipulation of the translational level of each polypeptide chain in the multimeric polypeptide, allowing for improved production of correctly assembled multimeric polypeptides.

Certain aspects of the present disclosure relate to methods for producing a multimeric polypeptide in a eukaryotic host cell. In some embodiments, the multimeric polypeptide comprises a first subunit comprising a first polypeptide chain and a second polypeptide chain and a second subunit comprising a third polypeptide chain and a fourth polypeptide chain. In some embodiments, the methods comprise: providing a eukaryotic host cell; culturing the eukaryotic host cell under conditions suitable for expression of the first, second, third, and fourth polypeptide chains, wherein upon expression the first, second, third, and fourth polypeptide chains form the multimeric polypeptide; and recovering the multimeric polypeptide produced by the eukaryotic host cell. In some embodiments, the eukaryotic host cell comprises a first polynucleotide comprising a first translation initiation sequence operably linked to a first open-reading frame that encodes the first polypeptide chain, a second polynucleotide comprising a second translation initiation sequence operably linked to a second open-reading frame that encodes the second polypeptide chain, a third polynucleotide comprising a third translation initiation sequence operably linked to a third open-reading frame that encodes the third polypeptide chain, and a fourth polynucleotide comprising a fourth translation initiation sequence operably linked to a fourth open-reading frame that encodes the fourth polypeptide chain. In some embodiments, the first subunit is expressed at a lower level than the second subunit when each subunit is expressed individually in the eukaryotic host cell, and one or both of the first translation initiation sequence and the second translation initiation sequence is weaker than one or both of the third translation initiation sequence and the fourth translation initiation sequence. In some embodiments, the first subunit is expressed at a lower level than the second subunit when all subunits are expressed together in the same eukaryotic host cell, and one or both of the first translation initiation sequence and the second translation initiation sequence is weaker than one or both of the third translation initiation sequence and the fourth translation initiation sequence. In some embodiments, the multimeric polypeptide is a bispecific antibody. In some embodiments, the multimeric polypeptide is a bispecific antibody, the first and third polypeptide chains are antibody heavy chains, the second and fourth polypeptide chains are antibody light chains, the first subunit is a first half-antibody that binds a first antigen, and the second subunit is a second half-antibody that binds a second antigen.

Other aspects of the present disclosure relate to methods for producing a bispecific antibody in a eukaryotic host cell, wherein the bispecific antibody comprises a first half antibody comprising a first antibody heavy chain and a first antibody light chain and a second half antibody comprising a second antibody heavy chain and a second antibody light chain, the method comprising: (a) providing the eukaryotic host cell, wherein the eukaryotic host cell comprises a first polynucleotide comprising a first translation initiation sequence operably linked to a first open-reading frame that encodes the first antibody heavy chain, a second polynucleotide comprising a second translation initiation sequence operably linked to a second open-reading frame that encodes the first antibody light chain, a third polynucleotide comprising a third translation initiation sequence operably linked to a third open-reading frame that encodes the second antibody heavy chain, and a fourth polynucleotide comprising a fourth translation initiation sequence operably linked to a fourth open-reading frame that encodes the second antibody light chain, wherein the first half antibody is expressed at a lower level than the second half antibody when each half antibody is expressed individually in the eukaryotic host cell, and wherein one or both of the first translation initiation sequence and the second translation initiation sequence is weaker than one or both of the third translation initiation sequence and the fourth translation initiation sequence; (b) culturing the eukaryotic host cell under conditions suitable for expression of the first and second antibody heavy and light chains, wherein the first and second antibody heavy and light chains form the bispecific antibody, and wherein the first half antibody binds a first antigen and the second half antibody binds a second antigen; and (c) recovering the bispecific antibody produced by the eukaryotic host cell.

In some embodiments, the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the first antibody Fc region is altered so that within the CH3/CH3 interface one or more amino acid residues are replaced with amino acid residues having a smaller side chain volume, thereby generating a hole on the surface of the CH3 domain of the first antibody Fc region that interacts with the CH3 domain of the second antibody Fc region; and wherein the CH3 domain of the second antibody Fc region is altered so that within the CH3/CH3 interface one or more amino acid residues are replaced with amino acid residues having a larger side chain volume, thereby generating a knob on the surface of the CH3 domain of the second antibody Fc region that interacts with the CH3 domain of the first antibody Fc region. In some embodiments, the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the second antibody Fc region is altered so that within the CH3/CH3 interface one or more amino acid residues are replaced with amino acid residues having a smaller side chain volume, thereby generating a hole on the surface of the CH3 domain of the second antibody Fc region that interacts with the CH3 domain of the first antibody Fc region; and wherein the CH3 domain of the first antibody Fc region is altered so that within the CH3/CH3 interface one or more amino acid residues are replaced with amino acid residues having a larger side chain volume, thereby generating a knob on the surface of the CH3 domain of the first antibody Fc region that interacts with the CH3 domain of the second antibody Fc region. In some embodiments, the knob mutation comprises at least one of: T366Y, T366W, T394W, and F405W, numbering based on human IgG1 according to EU index. In some embodiments, the hole mutation comprises at least one of: F405A, Y407T, Y407A, T366S, L368A, Y407V, and T394S, numbering based on human IgG1 according to EU index. In some embodiments, the knob mutation comprises T366W, and wherein the hole mutation comprises at least one, at least two, or all three of T366S, L368A, and Y407V, numbering based on human IgG1 according to EU index. In some embodiments, the first antibody light chain comprises a first mutation, the first antibody heavy chain comprises a second mutation, and the first and second mutations promote selective association of the first antibody light chain with the first antibody heavy chain. In some embodiments, the first mutation comprises an amino acid substitution at V133, and/or the second mutation comprises an amino acid substitution at S183, numbering based on EU index. In some embodiments, the S183 substitution is selected from the group consisting of S183A, S183T, S183V, S183Y, S183F, S183H, S183N, S183D, S183E, S183R, and S183K; and/or the V133 substitution is selected from the group consisting of V133E, V133S, V133L, V133W, V133K, V133R, and V133D. In some embodiments, the second antibody light chain comprises a third mutation, the second antibody heavy chain comprises a fourth mutation, and the third and fourth mutations promote selective association of the second antibody light chain with the second antibody heavy chain. In some embodiments, the third mutation comprises an amino acid substitution at V133, and/or the fourth mutation comprises an amino acid substitution at S183, numbering based on EU index. In some embodiments, the S183 substitution is selected from the group consisting of S183A, S183T, S183V, S183Y, S183F, S183H, S183N, S183D, S183E, S183R, and S183K; and/or the V133 substitution is selected from the group consisting of V133E, V133S, V133L, V133W, V133K, V133R, and V133D. In some embodiments, the amino acid substitution at S183 results in a positively charged residue (e.g., S183K), and the amino acid substitution at V133 results in a negatively charged residue (e.g., V133E). In some embodiments, the amino acid substitution at S183 results in a negatively charged residue (e.g., S183E), and the amino acid substitution at V133 results in a positively charged residue (e.g., V133K).

In some embodiments, the method results in higher production of the multimeric polypeptide in the eukaryotic host cell, e.g., as compared with production in which one or more, two or more, three or more, or four of the polynucleotides encoding polypeptide chains of a multimeric polypeptide comprise an open-reading frame operably linked to a native or unmodified translation initiation sequence, or production in which each of the polynucleotides encoding polypeptide chains of a multimeric polypeptide comprise the same translation initiation sequence. In some embodiments, the method results in fewer incorrectly paired side products in the eukaryotic host cell, e.g., as compared with production in which one or more, two or more, three or more, or four of the polynucleotides encoding polypeptide chains of a multimeric polypeptide comprise an open-reading frame operably linked to a native or unmodified translation initiation sequence, or production in which each of the polynucleotides encoding polypeptide chains of a multimeric polypeptide comprise the same translation initiation sequence. For example, transient or stable transfectants can be cultured, and production of multimeric polypeptide can be assayed. Fed-batch or perfusion cultures are grown, and titers of product in the cell medium or on the cell surface can be assayed. For surface expression, cells can be stained with antibody to detect product and analyzed, e.g., by flow cytometry. Product quality and/or purity can be assayed, e.g., with electrophoresis and/or mass spectrometry. In some embodiments, one or both polypeptide chains of the first subunit is/are translated at a slower rate than one or both polypeptide chains of the second subunit when each subunit is expressed individually in the eukaryotic host cell. In some embodiments, one or both polypeptide chains of the first subunit fold(s) more slowly and/or less efficiently than one or both polypeptide chains of the second subunit when each subunit is expressed individually in the eukaryotic host cell. In some embodiments, the first subunit assembles at a slower rate than the second subunit when each subunit is expressed individually in the eukaryotic host cell. In some embodiments, the first and/or second translation initiation sequence is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% weaker than the third and/or fourth translation initiation sequence. In some embodiments, the first and/or second translation initiation sequence is at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold weaker than the third and/or fourth translation initiation sequence. In some embodiments, the first subunit or half antibody is expressed at a level that is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% lower than expression level of the second subunit or half antibody, e.g., when each subunit or half antibody is expressed individually in the eukaryotic host cell. In some embodiments, the first subunit or half antibody is expressed at a level that is at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold lower than expression level of the second subunit or half antibody, e.g., when each subunit or half antibody is expressed individually in the eukaryotic host cell. In some embodiments, the first subunit or half antibody is expressed at a level that is 0.2-fold to 0.8-fold, less than 0.8-fold, less than 0.5-fold, or less than 0.3-fold that of expression level of the second subunit or half antibody, e.g., when each subunit or half antibody is expressed individually in the eukaryotic host cell.

Other aspects of the present disclosure relate to a plurality or composition of multimeric polypeptides or bispecific antibodies, wherein each multimeric polypeptide or bispecific antibody of the plurality or composition is produced according to the method of any one of the embodiments described herein.

Other aspects of the present disclosure relate to a recombinant eukaryotic host cell for expression of a non-native multimeric polypeptide that comprises a first subunit comprising a first polypeptide chain and a second polypeptide chain and a second subunit comprising a third polypeptide chain and a fourth polypeptide chain, the host cell comprising: a first polynucleotide comprising a first translation initiation sequence operably linked to a first open-reading frame that encodes the first polypeptide chain; a second polynucleotide comprising a second translation initiation sequence operably linked to a second open-reading frame that encodes the second polypeptide chain; a third polynucleotide comprising a third translation initiation sequence operably linked to a third open-reading frame that encodes the third polypeptide chain; and a fourth polynucleotide comprising a fourth translation initiation sequence operably linked to a fourth open-reading frame that encodes the fourth polypeptide chain; wherein the first subunit is expressed at a lower level than the second subunit when each subunit is expressed individually in the recombinant eukaryotic host cell or when all subunits are expressed together in the same eukaryotic host cell; and wherein one or both of the first translation initiation sequence and the second translation initiation sequence is weaker than one or both of the third translation initiation sequence and the fourth translation initiation sequence. In some embodiments, the multimeric polypeptide is a bispecific antibody, the first and third polypeptide chains are antibody heavy chains, the second and fourth polypeptide chains are antibody light chains, the first subunit is a first half-antibody that binds a first antigen, and the second subunit is a second half-antibody that binds a second antigen.

Other aspects of the present disclosure relate to a recombinant eukaryotic host cell for expression of a bispecific antibody that comprises a first half antibody comprising a first antibody heavy chain and a first antibody light chain and a second half antibody comprising a second antibody heavy chain and a second antibody light chain, the recombinant cell comprising: (a) a first polynucleotide comprising a first translation initiation sequence operably linked to a first open-reading frame that encodes the first antibody heavy chain; (b) a second polynucleotide comprising a second translation initiation sequence operably linked to a second open-reading frame that encodes the first antibody light chain; (c) a third polynucleotide comprising a third translation initiation sequence operably linked to a third open-reading frame that encodes the second antibody heavy chain; and (d) a fourth polynucleotide comprising a fourth translation initiation sequence operably linked to a fourth open-reading frame that encodes the second antibody light chain; wherein the first half antibody is expressed at a lower level than the second half antibody when each half antibody is expressed individually in the recombinant eukaryotic host cell; and wherein one or both of the first translation initiation sequence and the second translation initiation sequence is weaker than one or both of the third translation initiation sequence and the fourth translation initiation sequence. In some embodiments, the first and second antibody heavy and light chains form the bispecific antibody, and the first half antibody binds a first antigen and the second half antibody binds a second antigen.

In some embodiments, the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the first antibody Fc region is altered so that within the CH3/CH3 interface one or more amino acid residues are replaced with amino acid residues having a smaller side chain volume, thereby generating a hole on the surface of the CH3 domain of the first antibody Fc region that interacts with the CH3 domain of the second antibody Fc region; and wherein the CH3 domain of the second antibody Fc region is altered so that within the CH3/CH3 interface one or more amino acid residues are replaced with amino acid residues having a larger side chain volume, thereby generating a knob on the surface of the CH3 domain of the second antibody Fc region that interacts with the CH3 domain of the first antibody Fc region. In some embodiments, the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the second antibody Fc region is altered so that within the CH3/CH3 interface one or more amino acid residues are replaced with amino acid residues having a smaller side chain volume, thereby generating a hole on the surface of the CH3 domain of the second antibody Fc region that interacts with the CH3 domain of the first antibody Fc region; and wherein the CH3 domain of the first antibody Fc region is altered so that within the CH3/CH3 interface one or more amino acid residues are replaced with amino acid residues having a larger side chain volume, thereby generating a knob on the surface of the CH3 domain of the first antibody Fc region that interacts with the CH3 domain of the second antibody Fc region. In some embodiments, the knob mutation comprises at least one of: T366Y, T366W, T394W, and F405W, numbering based on human IgG1 according to EU index. In some embodiments, the hole mutation comprises at least one of: F405A, Y407T, Y407A, T366S, L368A, Y407V, and T394S, numbering based on human IgG1 according to EU index. In some embodiments, the knob mutation comprises T366W, and wherein the hole mutation comprises at least one, at least two, or all three of T366S, L368A, and Y407V, numbering based on human IgG1 according to EU index. In some embodiments, the first antibody light chain comprises a first mutation, the first antibody heavy chain comprises a second mutation, and the first and second mutations promote selective association of the first antibody light chain with the first antibody heavy chain. In some embodiments, the first mutation comprises an amino acid substitution at V133, and/or the second mutation comprises an amino acid substitution at S183, numbering based on EU index. In some embodiments, the S183 substitution is selected from the group consisting of S183A, S183T, S183V, S183Y, S183F, S183H, S183N, S183D, S183E, S183R, and S183K; and/or the V133 substitution is selected from the group consisting of V133E, V133S, V133L, V133W, V133K, V133R, and V133D. In some embodiments, the second antibody light chain comprises a third mutation, the second antibody heavy chain comprises a fourth mutation, and the third and fourth mutations promote selective association of the second antibody light chain with the second antibody heavy chain. In some embodiments, the third mutation comprises an amino acid substitution at V133, and/or the fourth mutation comprises an amino acid substitution at S183, numbering based on EU index. In some embodiments, the S183 substitution is selected from the group consisting of S183A, S183T, S183V, S183Y, S183F, S183H, S183N, S183D, S183E, S183R, and S183K; and/or the V133 substitution is selected from the group consisting of V133E, V133S, V133L, V133W, V133K, V133R, and V133D. In some embodiments, the amino acid substitution at S183 results in a positively charged residue (e.g., S183K), and the amino acid substitution at V133 results in a negatively charged residue (e.g., V133E). In some embodiments, the amino acid substitution at S183 results in a negatively charged residue (e.g., S183E), and the amino acid substitution at V133 results in a positively charged residue (e.g., V133K). In some embodiments, the first antibody light chain comprises a V133K mutation, the first antibody heavy chain comprises an S183E mutation, the second antibody light chain comprises a V133E mutation, and the second antibody heavy chain comprises an S183K mutation, numbering based on EU index. In some embodiments, the first antibody heavy chain further comprises T366S, L368A, and Y407V mutations, and the second antibody heavy chain further comprises a T366W mutation, numbering based on human IgG1 according to EU index. In some embodiments, the second antibody light chain comprises a V133K mutation, the second antibody heavy chain comprises an S183E mutation, the first antibody light chain comprises a V133E mutation, and the first antibody heavy chain comprises an S183K mutation, numbering based on EU index. In some embodiments, the second antibody heavy chain further comprises T366S, L368A, and Y407V mutations, and the first antibody heavy chain further comprises a T366W mutation, numbering based on human IgG1 according to EU index.

Other aspects of the present disclosure relate to methods for identifying a combination of translation initiation sequences for expressing a multimeric polypeptide in a eukaryotic host cell, wherein the multimeric polypeptide comprises a first subunit comprising a first polypeptide chain and a second polypeptide chain and a second subunit comprising a third polypeptide chain and a fourth polypeptide chain. In some embodiments, the methods comprise: providing a library comprising a plurality of eukaryotic host cells, wherein each eukaryotic host cell in the plurality comprises: a first polynucleotide comprising a first translation initiation sequence operably linked to a first open-reading frame that encodes the first polypeptide chain, a second polynucleotide comprising a second translation initiation sequence operably linked to a second open-reading frame that encodes the second polypeptide chain, a third polynucleotide comprising a third translation initiation sequence operably linked to a third open-reading frame that encodes the third polypeptide chain, and a fourth polynucleotide comprising a fourth translation initiation sequence operably linked to a fourth open-reading frame that encodes the fourth polypeptide chain, wherein a plurality of combinations of first, second, third, and fourth translation initiation sequences are represented in the plurality of eukaryotic host cells; culturing the library of eukaryotic host cells under conditions suitable for expression of the multimeric polypeptide by the eukaryotic host cells of the plurality; measuring an amount of the multimeric polypeptide that is expressed by single eukaryotic host cells of the plurality or clones of single eukaryotic host cells of the plurality; and identifying the first, second, third, and fourth translation initiation sequences of one or more single eukaryotic host cells of the plurality or clones of single eukaryotic host cells of the plurality that express the multimeric polypeptide. In some embodiments, the first, second, third, and fourth translation initiation sequences of one or more single eukaryotic host cells of the plurality or clones of single eukaryotic host cells of the plurality that express the multimeric polypeptide are identified based on higher production of the multimeric polypeptide and/or a lower level of incorrectly paired side products, e.g., as compared to a reference or different combination of four translation initiation sequences. In some embodiments, all of the first, second, third, and fourth translation initiation sequences in each host cell of the plurality comprise the sequence (from 5' to 3') NNNNNATGNGA, wherein N is C, G, A, or T/U (SEQ ID NO:1).

Other aspects of the present disclosure relate to kits or articles of manufacture comprising polynucleotides for expression of a multimeric polypeptide that comprises a first subunit comprising a first polypeptide chain and a second polypeptide chain and a second subunit comprising a third polypeptide chain and a fourth polypeptide chain. In some embodiments, the kit or article of manufacture comprises a first polynucleotide comprising a first translation initiation sequence operably linked to a first open-reading frame that encodes the first polypeptide chain; a second polynucleotide comprising a second translation initiation sequence operably linked to a second open-reading frame that encodes the second polypeptide chain; a third polynucleotide comprising a third translation initiation sequence operably linked to a third open-reading frame that encodes the third polypeptide chain; and a fourth polynucleotide comprising a fourth translation initiation sequence operably linked to a fourth open-reading frame that encodes the fourth polypeptide chain; wherein one or more of the first, second, third, and fourth translation initiation sequences is not operably linked with its respective open-reading frame as the respective open-reading frame exists in a naturally occurring host cell genome. In some embodiments, the multimeric polypeptide is a bispecific antibody, the first and third polypeptide chains are antibody heavy chains, the second and fourth polypeptide chains are antibody light chains, the first subunit is a first half-antibody that binds a first antigen, and the second subunit is a second half-antibody that binds a second antigen.

In some embodiments, one or both polypeptide chains of the first subunit are produced at a lower level than one or both polypeptide chains of the second subunit when each subunit is produced individually. In some embodiments, one or both polypeptide chains of the first subunit are produced at a lower level than one or both polypeptide chains of the second subunit when all subunits are produced by the same host cell. In some embodiments, the first subunit assembles with more incorrectly paired side products than the second subunit when each subunit is expressed individually in the eukaryotic host cell. In some embodiments, the first subunit assembles with more incorrectly paired side products than the second subunit when all subunits are expressed together in the same eukaryotic host cell.

In some embodiments of any of the embodiments described herein, all of the first, second, third, and fourth translation initiation sequences comprise the sequence (from 5' to 3') NNNNNATGNGA, wherein N is C, G, A, or T/U (SEQ ID NO:1). In some embodiments, one or both of the first translation initiation sequence and the second translation initiation sequence comprises a sequence selected from the group consisting of SEQ ID NOs:8-10. In some embodiments, one or both of the third translation initiation sequence and the fourth translation initiation sequence comprises the sequence ACCATGG (SEQ ID NO:3) or GAAGTATGA (SEQ ID NO:11). In some embodiments, the first translation initiation sequence comprises a sequence selected from the group consisting of SEQ ID NOs:8-10, the second translation initiation sequence comprises a sequence selected from the group consisting of SEQ ID NOs:8-10, the third translation initiation sequence comprises the sequence of SEQ ID NO:2, and the fourth translation initiation sequence comprises the sequence of SEQ ID NO:11. In some embodiments, the first translation initiation sequence comprises the sequence of SEQ ID NO:9, the second translation initiation sequence comprises the sequence of SEQ ID NO:9, the third translation initiation sequence comprises the sequence of SEQ ID NO:2, and the fourth translation initiation sequence comprises the sequence of SEQ ID NO:11. In some embodiments, each of the first, second, third, and fourth polynucleotides are operably linked to a promoter. In some embodiments, the first and the second polynucleotides are operably linked to the same promoter, and the third and the fourth polynucleotides are operably linked to the same promoter. In some embodiments, the first translation initiation sequence is weaker than the third translation initiation sequence. In some embodiments, the second translation initiation sequence is weaker than the fourth translation initiation sequence. In some embodiments, the first translation initiation sequence is weaker than the fourth translation initiation sequence. In some embodiments, the second translation initiation sequence is weaker than the third translation initiation sequence. In some embodiments, the first translation initiation sequence is the same as the second translation initiation sequence. In some embodiments, the third translation initiation sequence is the same as the fourth translation initiation sequence. In some embodiments of any of the embodiments described herein, the multimeric polypeptide specifically binds one or more target antigens. In some embodiments, the multimeric polypeptide is a multispecific antigen binding protein.

Also provided herein is a polynucleotide comprising an open-reading frame operably linked with a translation initiation sequence selected from the group consisting of SEQ ID NOs:8-11. Further provided herein is a set of polynucleotides comprising: a first translation initiation sequence that comprises a sequence selected from the group consisting of SEQ ID NOs:8-10 operably linked with a first open-reading frame, a second translation initiation sequence that comprises a sequence selected from the group consisting of SEQ ID NOs:8-10 operably linked with a second open-reading frame, a third translation initiation sequence that comprises the sequence of SEQ ID NO:2 operably linked with a third open-reading frame, and a fourth translation initiation sequence that comprises the sequence of SEQ ID NO:11 operably linked with a fourth open-reading frame. In some embodiments, the first translation initiation sequence comprises the sequence of SEQ ID NO:9, the second translation initiation sequence comprises the sequence of SEQ ID NO:9, the third translation initiation sequence comprises the sequence of SEQ ID NO:2, and the fourth translation initiation sequence comprises the sequence of SEQ ID NO:11. Yet further provided herein are host cells comprising the polynucleotide or set of polynucleotides according to any one of the embodiments described herein.

In some embodiments of any of the embodiments described herein, the first, second, third, and fourth polynucleotides are integrated into one or more chromosomes of the eukaryotic host cell. In some embodiments, the first, second, third, and fourth polynucleotides are integrated into the same chromosomal locus of the eukaryotic host cell. In some embodiments, the first, second, third, and fourth polynucleotides are part of one of more extrachromosomal polynucleotides in the eukaryotic host cell. In some embodiments, the eukaryotic host cell is a mammalian host cell. In some embodiments, the mammalian host cell is a Chinese hamster ovary (CHO) cell.

It is to be understood that one, some, or all of the properties of the various embodiments described herein may be combined to form other embodiments of the present invention. These and other aspects of the invention will become apparent to one of skill in the art. These and other embodiments of the invention are further described by the detailed description that follows.

BRIEF DESCRIPTION OF THE DRAWINGS

FIG. 1 shows the names and nucleotide sequences of the Kozak (Kz) sequence variants designed and analyzed by transient transfection. The start codon is gray and underlined. Sequences shown correspond to SEQ ID NOs:3-7 (top to bottom).

FIG. 4 shows the wild-type (WT) Kozak sequence in the upper line. In the lower line, the designed Kozak library is shown. N is either A, T, G or C. The start codon is gray and underlined. Positions −3 and +4 from start codon are indicated. Sequences shown correspond to (top to bottom) SEQ ID NOs:23 and 1, respectively.

FIG. 7 shows the screening process by transient transfection in CHO cells that was carried out to decrease the number of Kozak variants. The criteria to select variants round to round were reproducibility between transient transfections, stability between DNA preparations, and preservation of the nucleotide diversity.

FIG. 8A shows the normalized antibody titer of the indicated Kozak sequence variants that were transiently transfected into CHO cells. Data is presented as mean values and error bars represent the standard deviation of eleven independent transfections. The 11 Kozak sequence variants represented expression ranges from 0.2 to 1.3-fold of Wt Kozak, enabling modulation of titer with high precision. Stars indicate the Kozak sequence variants that were selected as a representative panel of five variants, including Wt Kozak, as they covered the broad range of expression levels observed in transient transfections. FIG. 8B provides the sequences of the final panel of Kozak sequence variants. The Wt consensus Kozak sequence is framed in a box.

FIG. 10 provides the translational strengths of the listed Kozak variants relative to Wt Kozak (1×). The sequences of the named Kozak variants are provided on the right. These Kozak sequence variants were selected as a representative panel of five variants, including Wt Kozak, as they covered the broad range of expression levels observed in transient transfections. Sequences correspond to SEQ ID NOs:8, 9, 10, 2, and 11 (top to bottom).

FIG. 11 provides the combinations of Kozak variants used to develop 25 integrated expression vectors for each arm of the Ab1/Ab2 BsAb. A mix of the 50 plasmids was transfected into CHO cells. The diversity generated with this approach reached up to a potential 625 different chain ratio combinations. Only the combinations for Ab1 are shown, however, the same combinations were used to generate the Ab2 arm vectors.

FIG. 19A shows the general absolute titer of the 3 medium and 4 low Kozak mix clones as measured by a shake flask fed-batch production assay at day 14. Production titer of these clones showed a similar behavior as previously observed in the primary screening. FIG. 19B provides an assessment of the quality of assembled antibodies for the medium and low Kozak mix clones. Samples were analyzed by Non-reducing CE-SDS to distinguish and quantify the main peak that equated with the full antibody (full-ab) in the form of incorrectly paired side products and correctly assembled BsAb, and the sum of the pre-peaks that represented other species of different molecular weight. There was no direct correlation between general titer and the highest content of full antibody. For example, some Kozak mix clones with more moderate titer compared to the top 11 clones showed similar percentage of full-ab of about 50-60%.

FIG. 20A provides quantification of the species detected by mass spectrophotometry of eight Kozak mix clones and eight Wt Kozak clones. The structure of each species is indicated in the legend. Correctly assembled BsAb is highlighted in white. The best individual Kozak mix clone showed around 40% of correctly assembled BsAb, which is more than double of the best individual Wt Kozak clone (about 18%). FIG. 20B provides the estimated titer of the bispecific antibody and various incorrectly paired side products and half antibody species. It was calculated as the percentage of each format multiplied by general titer. The bispecific effective titer is highlighted in white. Because of the fact that some Kozak mix clones have higher BsAb assembly than Wt Kozak clones, some Kozak mix clones overcame the deficit in general titer previously shown in FIG. 17.

FIG. 21A-21C show the Kozak sequence variant combinations and translational strength of the indicated Kozak mix clones. FIG. 21A shows Kozak sequence variant combinations for the Kozak Mix clones. Highlighted in gray are the sequencing data that could not be obtained. The name and translational strength of each Kozak sequence variant is shown on the right. FIG. 21B shows the Kozak sequence variant combinations for the best antibody-producing Kozak mix clones. The names of the Kozak mix clones and transfection numbers are indicated. Highlighted in gray the sequencing data that could not be obtained. FIG. 21C provides the Kozak sequence variant combinations for the 3 medium (labeled with an M) and 4 low Kozak mix clones (labeled with an L) on the left. On the right, the name and translational strength of each Kozak sequence variant is provided. Highlighted in gray the sequencing data that could not be obtained.

FIG. 22C, on the top, shows the production performance of clone 17M. CE-SDS data of this clone showed that the product quality is about 48% of full-ab and about 52% of half-ab. Mass spectrometry data indicated that of the about 48% full ab, all of it represented the correctly assembled bispecific antibody. On the other hand, almost all of the half-ab species were knob ½ Ab2, which is in line with the fact that the heavy and light chains of Ab2 were under Wt Kozak and the strongest Kozak sequence variant #228, respectively. On the bottom, the name and translational strength of each Kozak sequence variant are shown. Clone 17M carried both the heavy and light chains of Ab1 under a weaker Kozak sequence variant.

DETAILED DESCRIPTION

I. Definitions

Figure 2:
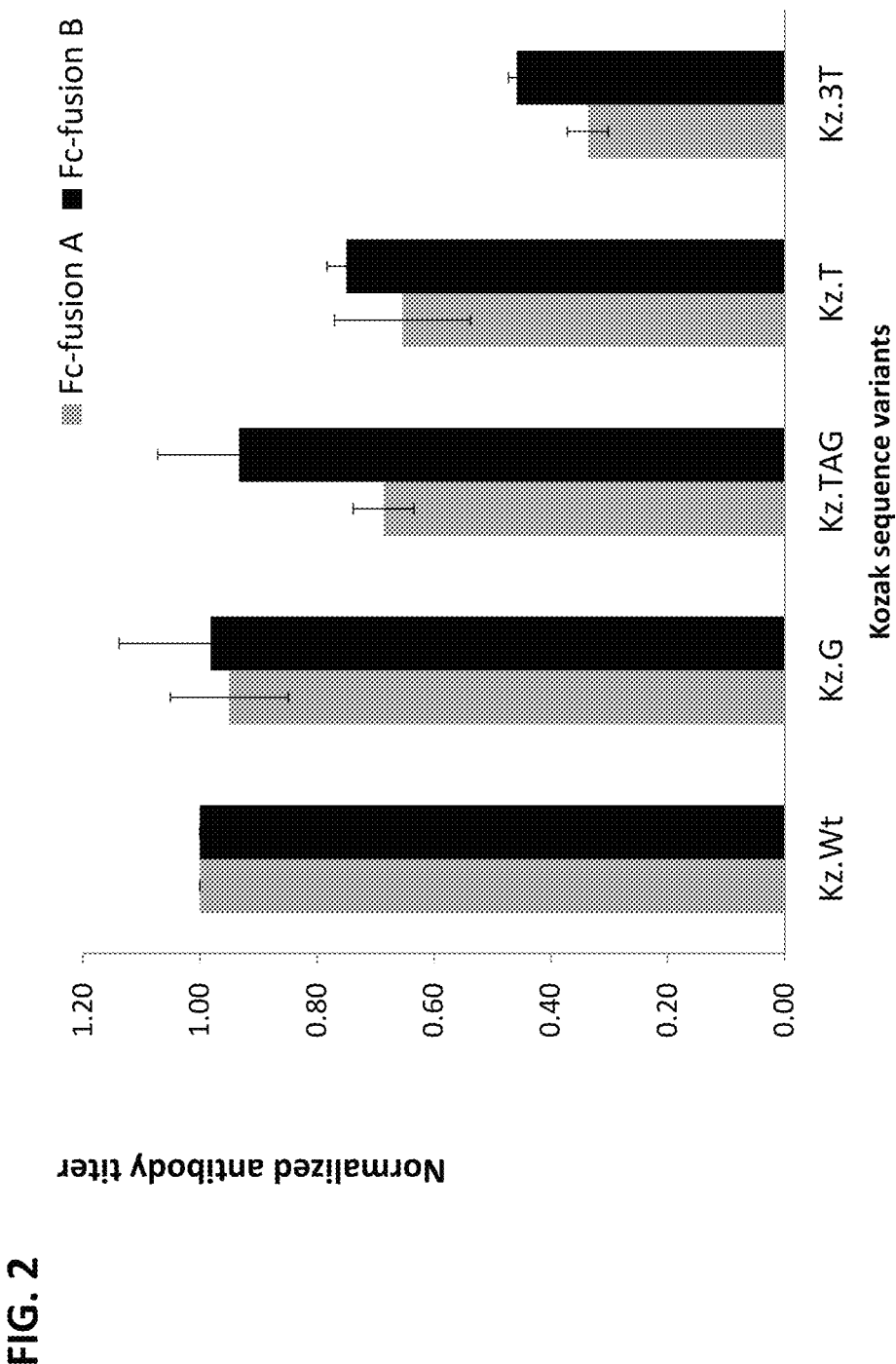
FIG. 2 provides the normalized titer of Fc-fusion proteins A and B with different Kozak sequence variants tested by transient transfection followed by homogeneous time resolved fluorescence (HTRF). Data are presented as mean values, and error bars represent the standard deviation (SD) of four independent transfections. Variations in the Kozak consensus sequence modulated the Fc-fusion protein titer.

Before describing the disclosure in detail, it is to be understood that this disclosure is not limited to particular compositions or biological systems, which can, of course, vary. It is also to be understood that the terminology used herein is for the purpose of describing particular embodiments only, and is not intended to be limiting.

As used in this specification and the appended claims, the singular forms "a", "an" and "the" include plural referents unless the content clearly dictates otherwise. Thus, for example, reference to "a molecule" optionally includes a combination of two or more such molecules, and the like.

The term "about" as used herein refers to the usual error range for the respective value readily known to the skilled person in this technical field. Reference to "about" a value or parameter herein includes (and describes) embodiments that are directed to that value or parameter per se.

It is understood that aspects and embodiments of the disclosure described herein include "comprising," "consisting," and "consisting essentially of" aspects and embodiments.

The term "polypeptide" or "protein" are used interchangeably herein to refer to polymers of amino acids of any length. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component or toxin. Also included within the definition are, for example, polypeptides containing one or more analogs of an amino acid (including, for example, unnatural amino acids, etc.), as well as other modifications known in the art. The terms "polypeptide" and "protein" as used herein specifically encompass antibodies and antigen binding proteins.

A "multimeric" polypeptide or protein as used herein may refer to any complex comprising more than one polypeptide or protein monomer (e.g., a polypeptide chain). For example, a multimeric polypeptide or protein can refer to a complex comprising two or more subunits, with each subunit comprising one, two, or more distinct polypeptide chains. The term "multimeric" polypeptide or protein specifically encompasses antibodies and antigen binding proteins. In certain embodiments, the multimeric polypeptide is a bispecific antibody. In certain embodiments, the bispecific antibody comprises a first heavy chain, a first light chain, a second heavy chain and a second light chain. In certain embodiments, the bispecific antibody is of the IgG1, IgG2 or IgG4 isotype. In certain embodiments, the bispecific antibody is of the IgG1 or IgG4 isotype. In certain embodiments, the bispecific antibody is of the IgG1 isotype.

The term "subunit," when used in reference to a component of a multimeric polypeptide or protein, as used herein is intended to refer to any polypeptide containing more than one distinct polypeptide chain. In some embodiments, a subunit may include a macromolecular complex of two or more polypeptides linked together through one or more intermolecular linkages, including without limitation one or more disulfide bonds. In certain embodiments, the subunit comprises an immunoglobulin heavy chain and light chain. In certain embodiments, the subunit comprises a half antibody. In certain embodiments, the immunoglobulin heavy chain and light chain or half antibody is of the IgG1, IgG2 or IgG4 isotype. In certain embodiments, the immunoglobulin heavy chain and light chain or half antibody is of the IgG1 or IgG4 isotype. In certain embodiments, the immunoglobulin heavy chain and light chain or half antibody is of the IgG1 isotype.

An "incorrectly paired side product" as used herein refers to the assembly of one or more polypeptide chain constituents of a multimeric polypeptide in an undesirable arrangement. For example, if the multimeric polypeptide is a bispecific antibody comprising the subunit light chain A/heavy chain A in association with the subunit light chain B/heavy chain B, incorrectly paired side products would arise from incorrect pairing during production of heavy chain A dimers, heavy chain B dimers, and/or incorrect pairing of one or more of the light chain A/heavy chain A and light chain B/heavy chain B subunits and would include any product other than the correctly assembled bispecific antibody. Specific examples of incorrectly paired side products are described in reference to and illustrated in FIGS. 20A, 20B, and 22A-22D. Other methods for assessing protein folding, such as Differential Scanning Fluorometry, MS, or predicting production outcomes using in silico tools, may also be used.

The term "translation initiation sequence" as used herein refers to a polynucleotide sequence comprising the start codon and adjacent bases of a polynucleotide comprising an open-reading frame. According to the translation scanning model, the ribosomal preinitiation complex binds to the 5' end of a polynucleotide and advances linearly in the 3' direction in search of a stop codon. Translation initiation sequences may include "Kozak" sequences, based on the work of Marilyn Kozak detailing the scanning model of translation initiation (see, e.g., Kozak M. *Nucleic Acids Res.* 1981; 9(20):5233-52; Kozak M. *Nucleic Acids Res.* 1987; 15(20):8125-48; Kozak M. *EMBO J.* 1997; 16(9):2482-92; Kozak M. *J Mol. Biol.* 1987; 196(4):947-50; Hamilton R, Watanabe C K, de Boer H A. *Nucleic Acids Res.* 1987; 15(8):3581-93; Cavener D R. *Nucleic Acids Res.* 1987; 15(4):1353-61; Kozak M. *Nucleic Acids Res.* 1984; 12(2): 857-72; Gupta P, Rangan L, Ramesh T V, Gupta M. *J Theor Biol.* 2016; 404:303-11; Grzegorski S J, Chiari E F, Robbins A, Kish P E, Kahana A. *PLoS One.* 2014; 9(9):e108475; and Kozak M. *Cell.* 1986; 44(2):283-92), as well as the variant Kozak sequences described herein.

The terms "native" and "non-native," as used herein in reference to one or more genetic elements (e.g., encoding a polypeptide, promoter, translational unit, or combination thereof), are intended to refer to the genomic context of the genetic element in a host cell chromosome as it occurs in nature. For example, a polypeptide (e.g., a multimeric polypeptide) is "native" with regard to a host cell or host cell chromosome when a polynucleotide encoding the polypeptide naturally occurs in the genome of the host cell, and is "non-native" when a polynucleotide encoding the polypeptide does not naturally occur in the genome of the host cell. A translation initiation sequence or open-reading frame is "native" with regard to a host cell or host cell chromosome when the translation initiation sequence or open-reading frame naturally occurs in the genome of the host cell, and is "non-native" when the translation initiation sequence or open-reading frame does not naturally occur in the genome of the host cell. The operable combination of a translation initiation sequence with an open-reading frame is "non-native" when the translation initiation sequence does not naturally occur in the genome of the host cell in the same operable linkage with the open-reading frame, or vice versa. For example, a translation initiation sequence:open-reading frame combination is "non-native" with respect to a host cell or host cell chromosome when one or both of the translation initiation sequence and the open-reading frame is/are not naturally present in the host cell genome, when the translation initiation sequence is present in the host cell genome in operable linkage with an open-reading frame with which it is not operably combined in the naturally-occurring host cell genome (even if the same translation initiation sequence is naturally present elsewhere in the host cell genome), or when the open-reading frame is present in the host cell genome in operable linkage with a translation initiation sequence with which it is not operably combined in the naturally-occurring host cell genome (even if the same open-reading frame sequence is naturally present elsewhere in the host cell genome).

The term "vector," as used herein, is intended to refer to a nucleic acid molecule capable of transporting another nucleic acid to which it has been linked. One type of vector is a "plasmid", which refers to a circular double stranded DNA loop into which additional DNA segments may be ligated. Another type of vector is a phage vector. Another type of vector is a viral vector, wherein additional DNA segments may be ligated into the viral genome. Certain vectors are capable of autonomous replication in a host cell into which they are introduced (e.g., vectors having an origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "recombinant vectors"). In general, expression vectors of utility in recombinant DNA techniques are often in the form of plasmids. In the present specification, "plasmid" and "vector" may be used interchangeably as the plasmid is the most commonly used form of vector.

"Operably linked" refers to a juxtaposition of two or more components, wherein the components so described are in a relationship permitting them to function in their intended manner. Generally, but not necessarily, the DNA sequences that are "operably linked" are contiguous and, where necessary to join two protein coding regions or in the case of a secretory leader, contiguous and in the reading frame. However, although an operably linked promoter is generally located upstream of the coding sequence or translational unit, it is not necessarily contiguous with it. Operably linked enhancers can be located upstream, within or downstream of coding sequences/translational units and at considerable distances from the promoter. Linking is accomplished by recombinant methods known in the art, e.g., using PCR methodology, by annealing, or by ligation at convenient restriction sites. If convenient restriction sites do not exist, then synthetic oligonucleotide adaptors or linkers are used in accord with conventional practice.

A "promoter" refers to a polynucleotide sequence that controls transcription of a gene or sequence to which it is operably linked. A promoter includes signals for RNA polymerase binding and transcription initiation. The promoters used will be functional in the cell type of the host cell in which expression of the selected sequence is contemplated. A large number of promoters including constitutive, inducible and repressible promoters from a variety of different sources are well known in the art (and identified in databases such as GenBank).

The term "host cell" (or "recombinant host cell"), as used herein, is intended to refer to a cell that has been genetically altered, or is capable of being genetically altered by introduction of an exogenous or non-native polynucleotide, such as a recombinant plasmid or vector. It should be understood that such terms are intended to refer not only to the particular subject cell but to the progeny of such a cell. Because certain modifications may occur in succeeding generations due to either mutation or environmental influences, such progeny may not, in fact, be identical to the parent cell, but are still included within the scope of the term "host cell" as used herein.

The term "antigen" herein is used in the broadest sense and encompasses various forms of both polypeptide and non-polypeptide antigens, including, without limitation, small peptide antigens, full-length protein antigens, carbohydrate antigens, lipid antigens, and nucleic acid antigens.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity. The term "immunoglobulin" (Ig) is used interchangeable with antibody herein.

An "isolated" antibody is one which has been identified and separated and/or recovered from a component of its natural environment. Contaminant components of its natural environment are materials which would interfere with research, diagnostic or therapeutic uses for the antibody, and may include enzymes, hormones, and other proteinaceous or nonproteinaceous solutes. In some embodiments, an antibody is purified (1) to greater than 95% by weight of antibody as determined by, for example, the Lowry method, and in some embodiments, to greater than 99% by weight; (2) to a degree sufficient to obtain at least 15 residues of N-terminal or internal amino acid sequence by use of, for example, a spinning cup sequenator, or (3) to homogeneity by SDS-PAGE under reducing or nonreducing conditions using, for example, Coomassie blue or silver stain. Isolated antibody includes the antibody in situ within recombinant cells since at least one component of the antibody's natural environment will not be present. Ordinarily, however, isolated antibody will be prepared by at least one purification step.

The term "constant domain" refers to the portion of an immunoglobulin molecule having a more conserved amino acid sequence relative to the other portion of the immunoglobulin, the variable domain, which contains the antigen binding site. The constant domain contains the $C_H1$, $C_H2$ and $C_H3$ domains (collectively, CH) of the heavy chain and the CHL (or CL) domain of the light chain.

The "variable region" or "variable domain" of an antibody refers to the amino-terminal domains of the heavy or light chain of the antibody. The variable domain of the heavy chain may be referred to as "$V_H$." The variable domain of the light chain may be referred to as "$V_L$." These domains are generally the most variable parts of an antibody and contain the antigen-binding sites.

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called hypervariable regions (HVRs) both in the light-chain and the heavy-chain variable domains. The more highly conserved portions of variable domains are called the framework regions (FR). The variable domains of native heavy and light chains each comprise four FR regions, largely adopting a beta-sheet configuration, connected by three HVRs, which form loops connecting, and in some cases forming part of, the beta-sheet structure. The HVRs in each chain are held together in close proximity by the FR regions and, with the HVRs from the other chain, contribute to the formation of the antigen-binding site of antibodies (see Kabat et al., *Sequences of Proteins of Immunological Interest*, Fifth Edition, National Institute of Health, Bethesda, Md. (1991)). The constant domains are not involved directly in the binding of an antibody to an antigen, but exhibit various effector functions, such as participation of the antibody in antibody-dependent cellular toxicity.

The "light chains" of antibodies (immunoglobulins) from any mammalian species can be assigned to one of two clearly distinct types, called kappa ("κ") and lambda ("λ"), based on the amino acid sequences of their constant domains.

The term IgG "isotype" or "subclass" as used herein is meant any of the subclasses of immunoglobulins defined by the chemical and antigenic characteristics of their constant regions.

Depending on the amino acid sequences of the constant domains of their heavy chains, antibodies (immunoglobulins) can be assigned to different classes. There are five major classes of immunoglobulins: IgA, IgD, IgE, IgG, and IgM, and several of these may be further divided into subclasses (isotypes), e.g., $IgG_1$, $IgG_2$, $IgG_3$, $IgG_4$, $IgA_1$, and $IgA_2$. The heavy chain constant domains that correspond to the different classes of immunoglobulins are called α, γ, ε, γ, and μ, respectively. The subunit structures and three-dimensional configurations of different classes of immunoglobulins are well known and described generally in, for example, Abbas et al. *Cellular and Mol. Immunology*, 4th ed. (W.B. Saunders, Co., 2000). An antibody may be part of a larger fusion molecule, formed by covalent or non-covalent association of the antibody with one or more other proteins or peptides.

The terms "full length antibody," "intact antibody" and "whole antibody" are used herein interchangeably to refer to an antibody in its substantially intact form, not antibody fragments as defined below. The terms particularly refer to an antibody with heavy chains that contain an Fc region.

"Antibody fragments" comprise a portion of an intact antibody, preferably comprising the antigen binding region thereof. In some embodiments, the antibody fragment described herein is an antigen-binding fragment. Examples of antibody fragments include Fab, Fab', $F(ab')_2$, and Fv fragments; diabodies; linear antibodies; single-chain antibody molecules; and multispecific antibodies formed from antibody fragments.

Papain digestion of antibodies produces two identical antigen-binding fragments, called "Fab" fragments, each with a single antigen-binding site, and a residual "Fc" fragment, whose name reflects its ability to crystallize readily. Pepsin treatment yields an $F(ab')_2$ fragment that has two antigen-combining sites and is still capable of cross-linking antigen.

"Fv" is the minimum antibody fragment which contains a complete antigen-binding site. In one embodiment, a two-chain Fv species consists of a dimer of one heavy- and one light-chain variable domain in tight, non-covalent association. In a single-chain Fv (scFv) species, one heavy- and one light-chain variable domain can be covalently linked by a flexible peptide linker such that the light and heavy chains can associate in a "dimeric" structure analogous to that in a two-chain Fv species. It is in this configuration that the three HVRs of each variable domain interact to define an antigen-binding site on the surface of the VH-VL dimer. Collectively, the six HVRs confer antigen-binding specificity to the antibody. However, even a single variable domain (or half of an Fv comprising only three HVRs specific for an antigen) has the ability to recognize and bind antigen, although at a lower affinity than the entire binding site.

The Fab fragment contains the heavy- and light-chain variable domains and also contains the constant domain of the light chain and the first constant domain (CH1) of the heavy chain. Fab' fragments differ from Fab fragments by the addition of a few residues at the carboxy terminus of the heavy chain CH1 domain including one or more cysteines from the antibody hinge region. Fab'-SH is the designation herein for Fab' in which the cysteine residue(s) of the constant domains bear a free thiol group. F(ab')2 antibody fragments originally were produced as pairs of Fab' fragments which have hinge cysteines between them. Other chemical couplings of antibody fragments are also known.

"Single-chain Fv" or "scFv" antibody fragments comprise the VH and VL domains of antibody, wherein these domains are present in a single polypeptide chain. Generally, the scFv polypeptide further comprises a polypeptide linker between the VH and VL domains which enables the scFv to form the desired structure for antigen binding. For a review of scFv, see, e.g., Pluckthün, in *The Pharmacology of Monoclonal Antibodies*, vol. 113, Rosenburg and Moore eds., (Springer-Verlag, New York, 1994), pp. 269-315.

The term "diabodies" refers to antibody fragments with two antigen-binding sites, which fragments comprise a heavy-chain variable domain (VH) connected to a light-chain variable domain (VL) in the same polypeptide chain (VH-VL). By using a linker that is too short to allow pairing between the two domains on the same chain, the domains are forced to pair with the complementary domains of another chain and create two antigen-binding sites. Diabodies may be bivalent or bispecific. Diabodies are described more fully in, for example, EP 404,097; WO 1993/01161; Hudson et al., *Nat. Med.* 9:129-134 (2003); and Hollinger et al., *Proc. Natl. Acad. Sci. USA* 90: 6444-6448 (1993). Triabodies and tetrabodies are also described in Hudson et al., *Nat. Med.* 9:129-134 (2003).

The term "monoclonal antibody" as used herein refers to an antibody obtained from a population of substantially homogeneous antibodies, e.g., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In certain embodiments, such a monoclonal antibody typically includes an antibody comprising a polypeptide sequence that binds a target, wherein the target-binding polypeptide sequence was obtained by a process that includes the selection of a single target binding polypeptide sequence from a plurality of polypeptide sequences. For example, the selection process can be the selection of a unique clone from a plurality of clones, such as a pool of hybridoma clones, phage clones, or recombinant DNA clones. It should be understood that a selected target binding sequence can be further altered, for example, to improve affinity for the target, to humanize the target binding sequence, to improve its production in cell culture, to reduce its immunogenicity in vivo, to create a multispecific antibody, etc., and that an antibody comprising the altered target binding sequence is also a monoclonal antibody of this disclosure. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins.

The modifier "monoclonal" indicates the character of the antibody as being obtained from a substantially homogeneous population of antibodies, and is not to be construed as requiring production of the antibody by any particular method. For example, the monoclonal antibodies to be used in accordance with the disclosure may be made by a variety of techniques, including, for example, expression in a prokaryotic host cell, the hybridoma method (e.g., Kohler and Milstein, *Nature*, 256:495-97 (1975); Hongo et al., *Hybridoma*, 14 (3): 253-260 (1995), Harlow et al., *Antibodies: A Laboratory Manual*, (Cold Spring Harbor Laboratory Press, 2nd ed. 1988); Hammerling et al., in: *Monoclonal Antibodies and T-Cell Hybridomas* 563-681 (Elsevier, N.Y., 1981)), recombinant DNA methods (see, e.g., U.S. Pat. No. 4,816,567), phage-display technologies (see, e.g., Clackson et al., *Nature*, 352: 624-628 (1991); Marks et al., *J. Mol. Biol.* 222: 581-597 (1992); Sidhu et al., *J. Mol. Biol.* 338(2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J. Immunol. Methods* 284(1-2): 119-132 (2004), and technologies for producing human or human-like antibodies in animals that have parts or all of the human immunoglobulin loci or genes encoding human immunoglobulin sequences (see, e.g., WO 1998/24893; WO 1996/34096; WO 1996/33735; WO 1991/10741; Jakobovits et al., *Proc. Natl. Acad. Sci. USA* 90: 2551 (1993); Jakobovits et al., *Nature* 362: 255-258 (1993); Bruggemann et al., *Year in Immunol.* 7:33 (1993); U.S. Pat. Nos. 5,545,807; 5,545,806; 5,569,825; 5,625,126; 5,633,425; and 5,661,016; Marks et al., *Bio/Technology* 10: 779-783 (1992); Lonberg et al., *Nature* 368: 856-859 (1994); Morrison, *Nature* 368: 812-813 (1994); Fishwild et al., *Nature Biotechnol.* 14: 845-851 (1996); Neuberger, *Nature Biotechnol.* 14: 826 (1996); and Lonberg and Huszar, *Intern. Rev. Immunol.* 13: 65-93 (1995).

The term "hypervariable region," "HVR," or "HV," when used herein refers to the regions of an antibody variable domain which are hypervariable in sequence and/or form structurally defined loops. Generally, antibodies comprise six HVRs; three in the VH (H1, H2, H3), and three in the VL (L1, L2, L3). In native antibodies, H3 and L3 display the most diversity of the six HVRs, and H3 in particular is believed to play a unique role in conferring fine specificity to antibodies. See, e.g., Xu et al., *Immunity* 13:37-45 (2000); Johnson and Wu, in *Methods in Molecular Biology* 248:1-25 (Lo, ed., Human Press, Totowa, N.J., 2003). Indeed, naturally occurring camelid antibodies consisting of a heavy chain only are functional and stable in the absence of light chain. See, e.g., Hamers-Casterman et al., *Nature* 363:446-448 (1993); Sheriff et al., *Nature Struct. Biol.* 3:733-736 (1996).

A number of HVR delineations are in use and are encompassed herein. The Kabat Complementarity Determining Regions (CDRs) are based on sequence variability and are the most commonly used (Kabat et al., *Sequences of Proteins of Immunological Interest*, 5th Ed. Public Health Service, National Institutes of Health, Bethesda, Md. (1991)). Chothia refers instead to the location of the structural loops (Chothia and Lesk *J. Mol. Biol.* 196:901-917 (1987)). The AbM HVRs represent a compromise between the Kabat HVRs and Chothia structural loops, and are used by Oxford Molecular's AbM antibody modeling software. The "contact" HVRs are based on an analysis of the available complex crystal structures. The residues from each of these HVRs are noted below.

TABLE 1a

Antibody Hypervariable Regions

| Loop | Kabat | AbM | Chothia | Contact |
|---|---|---|---|---|
| L1 | L24-L34 | L24-L34 | L26-L32 | L30-L36 |
| L2 | L50-L56 | L50-L56 | L50-L52 | L46-L55 |
| L3 | L89-L97 | L89-L97 | L91-L96 | L89-L96 |
| H1 | H31-H35B | H26-H35B | H26-H32 | H30-H35B (Kabat Numbering) |
| H1 | H31-H35 | H26-H35 | H26-H32 | H30-H35 (Chothia Numbering) |
| H2 | H50-H65 | H50-H58 | H53-H55 | H47-H58 |
| H3 | H95-H102 | H95-H102 | H96-H101 | H93-H101 |

HVRs may comprise "extended HVRs" as follows: 24-36 or 24-34 (L1), 46-56 or 50-56 (L2) and 89-97 or 89-96 (L3) in the VL and 26-35 (H1), 50-65 or 49-65 (H2) and 93-102, 94-102, or 95-102 (H3) in the VH. The variable domain residues are numbered according to Kabat et al., supra, for each of these definitions.

"Framework" or "FR" residues are those variable domain residues other than the HVR residues as herein defined.

The term "variable domain residue numbering as in Kabat" or "amino acid position numbering as in Kabat," and variations thereof, refers to the numbering system used for heavy chain variable domains or light chain variable domains of the compilation of antibodies in Kabat et al., supra. Using this numbering system, the actual linear amino acid sequence may contain fewer or additional amino acids corresponding to a shortening of, or insertion into, a FR or HVR of the variable domain. For example, a heavy chain variable domain may include a single amino acid insert (residue 52a according to Kabat) after residue 52 of H2 and inserted residues (e.g. residues 82a, 82b, and 82c, etc. according to Kabat) after heavy chain FR residue 82. The Kabat numbering of residues may be determined for a given antibody by alignment at regions of homology of the sequence of the antibody with a "standard" Kabat numbered sequence.

The Kabat numbering system is generally used when referring to a residue in the variable domain (approximately residues 1-107 of the light chain and residues 1-113 of the heavy chain) (e.g., Kabat et al., *Sequences of Immunological Interest*. 5th Ed. Public Health Service, National Institutes of Health, Bethesda, Md. (1991)). The "EU numbering system" or "EU index" is generally used when referring to a residue in an immunoglobulin heavy chain constant region (e.g., the EU index reported in Kabat et al., supra).

The expression "linear antibodies" refers to the antibodies described in Zapata et al. (1995 *Protein Eng,* 8(10):1057-1062). Briefly, these antibodies comprise a pair of tandem Fd segments (VH-CH1-VH-CH1) which, together with complementary light chain polypeptides, form a pair of antigen binding regions. Linear antibodies can be bispecific or monospecific.

II. Methods of Multimeric Polypeptide Production and Screening

Provided herein are methods of producing a multimeric polypeptide in a eukaryotic host cell (e.g., a mammalian host cell). In some embodiments, the methods include: providing a eukaryotic host cell that comprises a first polynucleotide comprising a first translation initiation sequence operably linked to a first open-reading frame that encodes a first polypeptide chain of the multimeric polypeptide, a second polynucleotide comprising a second translation initiation sequence operably linked to a second open-reading frame that encodes a second polypeptide chain of the multimeric polypeptide, a third polynucleotide comprising a third translation initiation sequence operably linked to a third open-reading frame that encodes a third polypeptide chain of the multimeric polypeptide, and a fourth polynucleotide comprising a fourth translation initiation sequence operably linked to a fourth open-reading frame that encodes a fourth polypeptide chain of the multimeric polypeptide; culturing the eukaryotic host cell under conditions suitable for expression of the first, second, third, and fourth polypeptide chains, wherein the first, second, third, and fourth polypeptide chains form the multimeric polypeptide; and recovering the multimeric polypeptide produced by the eukaryotic host cell.

In some embodiments, the first subunit is produced at a lower level than the second subunit when each polypeptide chain is produced individually in the eukaryotic host cell or when both polypeptide chains are produced together by the same eukaryotic host cell, and one or both of the first translation initiation sequence and the second translation initiation sequence is weaker than one or both of the third translation initiation sequence and the fourth translation initiation sequence. In some embodiments, each subunit comprises a half antibody comprising an antibody heavy chain and an antibody light chain, and the multimeric polypeptide is a bispecific antibody.

The methods of production described herein are based at least in part on the demonstration herein that tuning translational strength using different translation initiation sequences can improve multimeric polypeptide (e.g., bispecific antibody) assembly and reduce product-related impurities such as incorrectly paired side products. Surprisingly, it was found that reduction in translation of a selected polypeptide chain, relative to the translational level of the other polypeptide chains of the multimeric polypeptide, can increase multimeric polypeptide assembly efficiency and improve overall product quality by limiting the accumulation of incorrectly paired side products. Without wishing to be bound by theory, it is thought that production of some polypeptide chains under the strongest translation initiation sequences actually prompted the generation of more incorrectly paired side products including that chain instead of more correctly assembled multimeric polypeptide. Therefore, downregulation of the translation of one or more chains of the multimeric polypeptide, such as a bispecific antibody, which may slow down the assembly of the multimeric polypeptide, such as a bispecific antibody, may actually have a positive impact on the assembly efficiency and the reduction of the undesired incorrectly paired side products. As such, the methods described herein not only allow for higher levels of multimeric polypeptide expression, but also reduce the production of impurities such as incorrectly paired side products that impose burdens such as the need for costly purification methods to remove them.

In some embodiments, one or both polypeptide chains of the first subunit is/are translated at a lower level than one or both polypeptide chains of the second subunit when each subunit is produced individually in the eukaryotic host cell, or when all subunits are produced together in the same eukaryotic host cell. In some embodiments, the first subunit assembles with more incorrectly paired side products than the second subunit when each subunit is produced individually in the eukaryotic host cell, or when all subunits are produced together in the same eukaryotic host cell. In some embodiments, using a weaker translation initiation sequence in operable linkage with one or more (e.g., one or both) of the polypeptide chains of the first subunit (e.g., the subunit that is a weaker or more difficult expressor in the host cell) as compared with the translation initiation sequence(s) linked to one or more (e.g., one or both) of the polypeptide chains of the second subunit leads to higher production of the multimeric polypeptide and/or fewer incorrectly paired side products. In some embodiments, one or both polypeptide chains of the first subunit is/are translated at a slower rate than one or both polypeptide chains of the second subunit when each subunit is expressed individually in the eukaryotic host cell. In some embodiments, one or both polypeptide chains of the first subunit fold(s) more slowly and/or less efficiently than one or both polypeptide chains of the second subunit when each subunit is expressed individually in the eukaryotic host cell. In some embodiments, the first subunit assembles at a slower rate than the second subunit when each subunit is expressed individually in the eukaryotic host cell. Assays for measuring protein translation rate are known in the art and include, without limitation, 35S methionine labeling and ribosome profiling (see, e.g., Ingolia, N. (2016) *Cell* 165:22-33).

As described herein, in some embodiments a multimeric polypeptide of the present disclosure comprises two subunits. In some embodiments, a subunit of the present disclosure comprises two or more polypeptide chains. In some embodiments, a subunit of the present disclosure comprises two polypeptide chains. In some embodiments, each polynucleotide encoding a polypeptide chain of a multimeric polypeptide comprises a translation initiation sequence operably linked to the open-reading frame. In some embodiments, a multimeric polypeptide of the present disclosure comprises two subunits, each subunit comprises two polypeptide chains, a first subunit of the multimeric polypeptide is expressed at a lower level than the second subunit when each subunit is expressed individually in the eukaryotic host cell or when all subunits are expressed together in the same eukaryotic host cell, and one or both of the first translation initiation sequence (operably linked to the first open-reading frame) and the second translation initiation sequence (operably linked to the second open-reading frame) is weaker than one or both of the third translation initiation sequence (operably linked to the third open-reading frame) and the fourth translation initiation sequence (operably linked to the fourth open-reading frame). In some embodiments, the multimeric polypeptide is a bispecific antibody.

In some embodiments, a subunit or half-antibody of the present disclosure is expressed at a lower level than another subunit or half-antibody, e.g., when each subunit or half-antibody is expressed individually in a eukaryotic host cell. In some embodiments, a subunit or half-antibody of the present disclosure is expressed at a level that is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% lower than another subunit or half-antibody, e.g., when each subunit or half-antibody is expressed individually in a eukaryotic host cell. In some embodiments, a subunit or half-antibody of the present disclosure is expressed at a level that is at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold lower than another subunit or half-antibody, e.g., when each subunit or half-antibody is expressed individually in a eukaryotic host cell. In some embodiments, a subunit or half-antibody of the present disclosure is expressed at a level that is 0.2-fold to 0.8-fold, less than 0.8-fold, less than 0.5-fold, or less than 0.3-fold that of another subunit or half-antibody, e.g., when each subunit or half-antibody is expressed individually in a eukaryotic host cell.

In some embodiments, the methods include: providing a eukaryotic host cell that comprises a first polynucleotide comprising a first translation initiation sequence operably linked to a first open-reading frame that encodes a first antibody heavy chain of a bispecific antibody, a second polynucleotide comprising a second translation initiation sequence operably linked to a second open-reading frame that encodes a first antibody light chain of the bispecific antibody, a third polynucleotide comprising a third translation initiation sequence operably linked to a third open-reading frame that encodes a second antibody heavy chain of the bispecific antibody, and a fourth polynucleotide comprising a fourth translation initiation sequence operably linked to a fourth open-reading frame that encodes a second antibody light chain of the bispecific antibody; culturing the eukaryotic host cell under conditions suitable for expression of the first, second, third, and fourth polypeptide chains, wherein upon expression the first, second, third, and fourth polypeptide chains form the bispecific antibody; and recovering the bispecific antibody from the eukaryotic host cell. In some embodiments, the bispecific antibody specifically binds to two antigens (e.g., the first antibody heavy and light chains form an antigen binding domain that binds a first antigen, and the second antibody heavy and light chains form an antigen binding domain that binds a second antigen).

In some embodiments, a first translation initiation sequence is said to be weaker than another translation initiation sequence when it results in lower translational efficiency and/or expression of an open-reading frame operably linked thereto, as compared to a reference or efficiency/ expression of the same open-reading frame in operable linkage with another translation initiation sequence. Suitable methods for comparing the strength of various translation initiation sequences in a eukaryotic host cell are described and exemplified herein. For example, transient or stable transfectants can be cultured, and production of multimeric polypeptide can be assayed. Fed-batch or perfusion cultures are grown, and titers of product in the cell medium or on the cell surface can be assayed. For surface expression, cells can be stained with antibody to detect product and analyzed, e.g., by flow cytometry. Product quality and/or purity can be assayed, e.g., with electrophoresis and/or mass spectrometry.

In some embodiments, a translation initiation sequence is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% weaker than another translation initiation sequence. In some embodiments, a translation initiation sequence is said to be weaker than another translation initiation sequence when it results in at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% lower translational efficiency of an open-reading frame operably linked thereto, as compared to a reference or efficiency of the same open-reading frame in operable linkage with another translation initiation sequence (e.g., when measured as described above). In some embodiments, a translation initiation sequence is said to be weaker than another translation initiation sequence when it results in at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, 5% to 30%, 5% to 50%, 5% to 75%, 10% to 30%, 10% to 50%, 10% to 75%, 25% to 50%, 25% to 75%, 25% to 100%, 50% to 75%, 50% to 100%, or 75% to 100% lower expression of an open-reading frame operably linked thereto, as compared to a reference or expression level of the same open-reading frame in operable linkage with another translation initiation sequence (e.g., when measured as described above).

In some embodiments, a translation initiation sequence is at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold weaker than another translation initiation sequence. In some embodiments, a translation initiation sequence is said to be weaker than another translation initiation sequence when it results in at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold lower translational efficiency of an open-reading frame operably linked thereto, as compared to a reference or efficiency of the same open-reading frame in operable linkage with another translation initiation sequence (e.g., when measured as described above). In some embodiments, a translation initiation sequence is said to be weaker than another translation initiation sequence when it results in at least 1.3-fold, at least 1.5-fold, at least 2-fold, at least 2.5-fold, at least 3-fold, at least 3.5-fold, at least 4-fold, at least 4.5-fold, at least 5-fold, at least 6-fold, at least 7-fold, at least 8-fold, at least 9-fold, at least 10-fold, 1.3-fold to 3-fold, 1.5-fold to 3-fold, 2-fold to 10-fold, 2-fold to 5-fold, 3-fold to 5-fold, 3-fold to 10-fold, 5-fold to 10-fold, or 7-fold to 10-fold lower expression of an open-reading frame operably linked thereto, as compared to a reference or expression level of the same open-reading frame in operable linkage with another translation initiation sequence (e.g., when measured as described above). In some embodiments, a translation initiation sequence is said to be weaker than another translation initiation sequence when it results in expression that is 0.2-fold to 0.8-fold, less than 0.8-fold, less than 0.5-fold, or less than 0.3-fold that of an open-reading frame operably linked thereto, as compared to a reference or expression level of the same open-reading frame in operable linkage with another translation initiation sequence (e.g., when measured as described above).

In some embodiments, the first translation initiation sequence is weaker than the third translation initiation sequence. In some embodiments, the second translation initiation sequence is weaker than the fourth translation initiation sequence. In some embodiments, the first translation initiation sequence is weaker than the fourth translation initiation sequence. In some embodiments, the second translation initiation sequence is weaker than the third translation initiation sequence. In some embodiments, the first translation initiation sequence is the same as the second translation initiation sequence. In some embodiments, the first translation initiation sequence is different from the second translation initiation sequence. In some embodiments, the third translation initiation sequence is the same as the fourth translation initiation sequence. In some embodiments, the third translation initiation sequence is different from the fourth translation initiation sequence.

In some embodiments, the methods of the present disclosure result in higher production of a multimeric polypeptide in a eukaryotic host cell, e.g., as compared with production of the multimeric polypeptide using existing methods. In some embodiments, the methods of the present disclosure result in at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% higher production (e.g., higher level of correctly assembled multimeric polypeptide, such as a bispecific antibody) of a multimeric polypeptide in a eukaryotic host cell, e.g., as compared with production of the multimeric polypeptide using existing methods. For example, expression can be compared with expression in which one or more, two or more, three or more, or four of the polynucleotides encoding polypeptide chains of a multimeric polypeptide comprise an open-reading frame operably linked to a native or unmodified translation initiation sequence, or expression in which each of the polynucleotides encoding polypeptide chains of a multimeric polypeptide comprise the same translation initiation sequence.

In some embodiments, the methods of the present disclosure result in fewer incorrectly paired side products of a multimeric polypeptide in a eukaryotic host cell, e.g., as compared with production of the multimeric polypeptide using existing methods. In some embodiments, the methods of the present disclosure result in at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% fewer incorrectly paired side products of a multimeric polypeptide in a eukaryotic host cell, e.g., as compared with production of the multimeric polypeptide using existing methods. The methods of the present disclosure are advantageous in performing downstream purification in manufacturing because of less impurity (e.g., incorrectly aired side products) in the cell culture supernatant. In some embodiments, production can be compared with production in which one or more, two or more, three or more, or four of the polynucleotides encoding polypeptide chains of a multimeric polypeptide comprise an open-reading frame operably linked to a native or unmodified translation initiation sequence, or production in which each of the polynucleotides encoding polypeptide chains of a multimeric polypeptide comprise the same translation initiation sequence. In some embodiments, an amount of incorrectly paired side products refers to the amount of one or more specific incorrectly paired side products. In some embodiments, an amount of incorrectly paired side products refers to the aggregate amount of all incorrectly paired side products.

In some embodiments, the methods of the present disclosure can be used to express four subunits of a multimeric polypeptide of the present disclosure at a chain ratio of 1:1:1:1. However, the methods described herein can also be used to tune expression of the four subunits of a multimeric polypeptide of the present disclosure at other desired chain ratios, e.g., to improve expression and/or assembly of correctly paired multimeric polypeptides. For example, it has been well documented that antibody light chains can serve as chaperones for antibody heavy chains (see, e.g., Lee, Y. K, et al. (1999) *Mol. Biol. Cell* 10:2209-2219) and having higher light chain expression can then be an advantage during production. As such, in some embodiments, the methods of the present disclosure are used to increase expression of one or both light chains of a bispecific antibody, relative to expression of the heavy chains. Moreover, the data provided herein demonstrate that in some cases, a higher proportion of correctly assembled bispecific antibody can be obtained by manipulating the ratio of light chain 1:light chain 2. As such, in some embodiments, the methods of the present disclosure are used to increase expression of one light chain of a bispecific antibody, relative to expression of the other light chain. In some embodiments, the methods of the present disclosure can be used to express four polypeptide chains of a bispecific antibody at a chain ratio of 1:1:1:1 or another chain ratio, depending upon optimal production methods for the bispecific antibody, which can be determined as described herein.

In some embodiments, one or more of the first, second, third, and fourth translation initiation sequences comprise the sequence (from 5' to 3') NNNNNATGNGA, wherein N is C, G, A, or T/U (SEQ ID NO:1). In some embodiments, all of the first, second, third, and fourth translation initiation sequences comprise the sequence (from 5' to 3') NNNN-NATGNGA, wherein N is C, G, A, or T/U (SEQ ID NO:1). In some embodiments, one or both translation initiation sequence(s) operably linked to open-reading frames encoding the polypeptide chains of a first subunit (e.g., the more weakly expressing subunit of a multimeric polypeptide) comprise a sequence selected from the group consisting of SEQ ID NOs:8-10. In some embodiments, one or both translation initiation sequence(s) operably linked to open-reading frames encoding the polypeptide chains of a second subunit (e.g., the more strongly expressing subunit of a multimeric polypeptide) comprise a sequence selected from the group consisting of SEQ ID NOs:2, 3, and 11.

Exemplary translation initiation sequences are provided in Table 2. Relative strengths of exemplary translation initiation sequences are provided in FIG. 10.

TABLE 2

Translation initiation sequences.

| SEQ ID NO | Sequence | Description |
|---|---|---|
| 1 | NNNNNATGNGA, wherein N is C, G, A, or T/U | Consensus |
| 22 | CCACCATGGG | Kozak wt |
| 3 | ACCATGG | Shorter Kozak wt |
| 4 | GCCATGG | Kz.G (A-3 > g) |
| 5 | TCCATGG | Kz.T (A-3 > t) |
| 6 | TAGATGG | Kz.TAG (ACC-3 > tag) |
| 7 | TTTATGG | Kz.TTT (ACC-3 > ttt) |
| 8 | TTTTTATGG | Kz.3 |
| 9 | GGCTCATGC | Kz.135 |
| 10 | CCTAGATGC | Kz.148 |
| 11 | GAAGTATGA | Kz.228 |

In some embodiments, the translation efficiency (i.e., strength) of a translation initiation sequence is compared with a reference. In some embodiments, the reference is a translation initiation sequence comprising a wild-type Kozak sequence in the host cell. In some embodiments, the reference sequence comprises the polynucleotide sequence of SEQ ID NO:2 or 3. Exemplary assays suitable for determining relative strength of translation initiation sequences are described and exemplified herein (see, e.g., Examples 1-3). In some embodiments, strength of a translation initiation sequence is assayed by expressing in a host cell (e.g., after transient transfection) a polynucleotide comprising the translation initiation sequence operably linked to an open-reading frame (e.g., encoding a polypeptide, subunit, or multimeric polypeptide of the present disclosure, such as an antibody or half-antibody) and measuring production of the polypeptide product. In some embodiments, the level of production of the polypeptide product (e.g., product titer) is compared with a reference, such as the level of production of the same product in the same host cell type in which the open-reading frame is operably linked to a reference translation initiation sequence, such as a wild-type Kozak sequence active in the host cell. Relative strengths of exemplary translation initiation sequences are provided in FIG. 10. For example, transient or stable transfectants can be cultured, and production of multimeric polypeptide can be assayed. Fed-batch or perfusion cultures are grown, and titers of product in the cell medium or on the cell surface can be assayed. For surface expression, cells can be stained with antibody to detect product and analyzed, e.g., by flow cytometry. Product quality and/or purity can be assayed, e.g., with electrophoresis and/or mass spectrometry.

In some embodiments, an open-reading frame of a first polypeptide chain of a first subunit (e.g., the more weakly expressing subunit) of a multimeric protein is operably linked to a translation initiation sequence comprising SEQ ID NO:9. In some embodiments, an open-reading frame of a second polypeptide chain of a first subunit (e.g., the more weakly expressing subunit) of a multimeric protein is operably linked to a translation initiation sequence comprising SEQ ID NO:9. In some embodiments, an open-reading frame of a first polypeptide chain of a second subunit (e.g., the more strongly expressing subunit) of a multimeric protein is operably linked to a translation initiation sequence comprising SEQ ID NO:2 or 11. In some embodiments, an open-reading frame of a second polypeptide chain of a second subunit (e.g., the more strongly expressing subunit) of a multimeric protein is operably linked to a translation initiation sequence comprising SEQ ID NO:2 or 11. In some embodiments, the open-reading frame of a first polypeptide chain of the first subunit (e.g., the more weakly expressing subunit) is operably linked to a translation initiation sequence comprising SEQ ID NO:9, the open-reading frame of the second polypeptide chain of the first subunit (e.g., the more weakly expressing subunit) is operably linked to a translation initiation sequence comprising SEQ ID NO:9, the open-reading frame of the first polypeptide chain of the second subunit (e.g., the more strongly expressing subunit) is operably linked to a translation initiation sequence comprising SEQ ID NO:2 or 11, and the open-reading frame of the second polypeptide chain of the second subunit (e.g., the more strongly expressing subunit) is operably linked to a translation initiation sequence comprising SEQ ID NO:2 or 11. In some embodiments, the multimeric protein is a bispecific antibody. In some embodiments, the first and second subunits comprise half-antibodies. In some embodiments, the two polypeptide chains of each subunit represent an antibody heavy chain and an antibody light chain, respectively. In some embodiments, the open-reading frame encoding the heavy chain of the first half-antibody is operably linked to a translation initiation sequence comprising SEQ ID NO:9, the open-reading frame encoding the light chain of the first half-antibody is operably linked to a translation initiation sequence comprising SEQ ID NO:9, the open-reading frame encoding the heavy chain of the second half-antibody is operably linked to a translation initiation sequence comprising SEQ ID NO:3, and the open-reading frame encoding the light chain of the second half-antibody is operably linked to a translation initiation sequence comprising SEQ ID NO:11.

Promoters

In some embodiments, a translation initiation sequence and/or open-reading frame of the present disclosure are operably linked to a promoter. In some embodiments, each of the first, second, third, and fourth polynucleotides is operably linked to a promoter. A promoter is an untranslated regulatory sequence located upstream (5') to a cistron that modulates its expression. Prokaryotic promoters typically fall into two classes, inducible and constitutive. An inducible promoter is a promoter that initiates increased levels of transcription of the cistron under its control in response to changes in the culture condition, e.g., the presence or absence of a nutrient or a change in temperature.

In some embodiments, the promoter is a constitutive promoter. In some embodiments, the promoter is an inducible promoter. A variety of promoters suitable for use in eukaryotic host cells are known in the art. In some embodiments, polynucleotides encoding the first and second polypeptide chains of a subunit are operably linked to the same promoter. In some embodiments, polynucleotides encoding the first and second polypeptide chains of a subunit are operably linked to a different promoter.

A large number of promoters recognized by a variety of potential host cells are well known. The selected promoter can be operably linked to cistron DNA encoding, for example, the light or heavy chain by removing the promoter from the source DNA via restriction enzyme digestion and inserting the isolated promoter sequence into the vector of the invention. Both the native promoter sequence and many heterologous promoters may be used to direct amplification and/or expression of the target genes. In some embodiments, heterologous promoters are utilized, as they generally permit greater transcription and higher yields of the expressed target gene as compared to the native target polypeptide promoter.

Expression and cloning vectors usually contain a promoter that is recognized by the host organism and is operably linked to the desired Fc-containing polypeptide(s) (e.g., antibody) nucleic acid. Promoter sequences are known for eukaryotes. Virtually all eukaryotic genes have an AT-rich region located approximately 25 to 30 bases upstream from the site where transcription is initiated. Another sequence found 70 to 80 bases upstream from the start of transcription of many genes is a CNCAAT region where N may be any nucleotide. At the 3' end of most eukaryotic genes is an AATAAA sequence that may be the signal for addition of the poly A tail to the 3' end of the coding sequence. All of these sequences are suitably inserted into eukaryotic expression vectors.

For production of Fc-containing polypeptide(s) (such as, for example, an antibody) transcription from vectors in mammalian host cells is controlled, for example, by promoters obtained from the genomes of viruses such as, for example, polyoma virus, fowlpox virus, adenovirus (such as Adenovirus 2), bovine papilloma virus, avian sarcoma virus, cytomegalovirus, a retrovirus, hepatitis-B virus and Simian Virus 40 (SV40), from heterologous mammalian promoters, e.g., the actin promoter or an immunoglobulin promoter, or from heat-shock promoters, provided such promoters are compatible with the host cell systems. In some embodiments, the promoter is a CMV promoter.

The early and late promoters of the SV40 virus are conveniently obtained as an SV40 restriction fragment that also contains the SV40 viral origin of replication. The immediate early promoter of the human cytomegalovirus is conveniently obtained as a Hind 111 E restriction fragment. A system for expressing DNA in mammalian hosts using the bovine papilloma virus as a vector is disclosed in U.S. Pat. No. 4,419,446. A modification of this system is described in U.S. Pat. No. 4,601,978. See also Reyes et al., Nature 297:598-601 (1982) on expression of human β-interferon cDNA in mouse cells under the control of a thymidine kinase promoter from herpes simplex virus. Alternatively, the Rous Sarcoma Virus long terminal repeat can be used as the promoter.

Transcription of DNA encoding an antigen binding polypeptide(s) (such as, for example, an antibody) by higher eukaryotes can be increased by inserting an enhancer sequence into the vector. Many enhancer sequences are now known from mammalian genes (e.g., globin, elastase, albumin, a-fetoprotein, and insulin genes). Also, one may use an enhancer from a eukaryotic cell virus. Examples include the SV40 enhancer on the late side of the replication origin (bp 100-270), the cytomegalovirus early promoter enhancer, the polyoma enhancer on the late side of the replication origin, and adenovirus enhancers. See also Yaniv, Nature 297:17-18 (1982) for a description of elements for enhancing activation of eukaryotic promoters. The enhancer may be spliced into the vector at a position 5' or 3' to the antibody polypeptide-encoding sequence, provided that enhancement is achieved, but is generally located at a site 5' from the promoter.

Multispecific Multimeric Polypeptides

Certain aspects of the present disclosure relate to multimeric polypeptides, e.g., comprising two or more subunits that each comprise two or more polypeptide chains. In some embodiments, one or more polypeptide chains, one or more subunits, or one or more multimeric polypeptides of the present disclosure are non-native to the host cell.

In some embodiments, a subunit of the present disclosure is a monomer of a heterodimer. As used herein, a heterodimer may refer to any polypeptide complex that contains two distinct polypeptides or polypeptide complexes in operable linkage. A non-limiting example of a heterodimer is a bispecific or bivalent antibody composed of two distinct antibody monomers (i.e., a light chain-heavy chain pair in operable linkage). In this example, the folding and assembly of a first heavy chain-light chain pair recognizing a first antigen produces a first antibody monomer. The folding and assembly of a second heavy chain-light chain pair recognizing a second antigen produces a second antibody monomer. These monomers may be assembled by any means known in the art (described below in more detail with respect to bispecific antibodies) to form a heterodimer. For more details on an illustrative example of heterodimeric antibody formation, see Ridgway J B B et al. 1996 Protein Eng. 9(7):617-621.

In some embodiments, a multimeric polypeptide or subunit of the present disclosure is a secretory protein. As used herein, a secretory protein may refer to any protein that is secreted by a host cell into the host cell periplasm or extracellular milieu. A secretory protein may be a protein that is endogenously secreted by a host cell, or a secretory protein may be a protein that is not endogenously secreted by a host cell but is modified in such a way as to promote its secretion. For example, the presence of a signal sequence, typically found at the N-terminus of a polypeptide, may direct a polypeptide to the secretory pathway for secretion. Numerous signal sequences are known in the art and may be useful for promoting the secretion of a secretory protein or allowing the secretion of protein not naturally secreted by a host cell; see, e.g., Picken et al., Infect. Immun. 42:269-275 (1983); Simmons and Yansura, Nature Biotechnology 14:629-634 (1996); and Humphreys D P et al. 2000 Protein Expr. Purif. 20(2):252. One non-limiting example of a signal sequence is a heat stable enterotoxin II (STII) signal sequence.

In some embodiments, polypeptide chains of a subunit of the present disclosure are linked to each other by at least one disulfide bond. In some embodiments, subunits of a multimeric polypeptide of the present disclosure are linked to each other by at least one disulfide bond. Disulfide bonds may refer to any covalent bond linking two thiol groups. Disulfide bonds in polypeptides typically form between the thiol groups of cysteine residues. Polypeptide disulfide bonds are known in the art to be important for the folding and assembly of many polypeptides, such as two chain proteins of the present disclosure. Polypeptide disulfide bonds may include disulfide bonds between cysteine residues in a single polypeptide chain (i.e., intramolecular or intra-chain disulfide bonds). Polypeptide disulfide bonds may also include disulfide bonds between cysteine residues found on separate polypeptide chains (i.e., intermolecular or inter-chain disulfide bonds).

Disulfide bonds are known in the art to be important for the folding and assembly of antibodies and antibody fragments. Different antibody isotypes, and different subclasses within an isotope, are known to possess different patterns of disulfide bonds. For example, IgG antibodies may contain 12 intra-chain disulfide bonds, one inter-chain disulfide bond between each light chain and its corresponding heavy chain, and between 2 and 11 inter-chain disulfide bonds between heavy chains, depending upon the particular IgG subclass (see Liu H and May K 2012 MAbs. 4(1):17 for more detailed description). IgM (see, e.g., Wiersma E J and Shulman M J 1995 J. Immunol. 154(10):5265), IgE (see, e.g., Helm B A et al. 1991 Eur. J. Immunol. 21(6):1543), IgA (see, e.g., Chintalacharuvu K R et al. 2002 J. Immunol. 169(9):5072), and IgD (see, e.g., Shin S U et al. 1992 Hum. Antibodies Hybridomas 3(2):65) are also known to form disulfide bonds during folding and assembly.

In some embodiments, a multimeric polypeptide of the present disclosure comprises a multispecific antigen binding protein. In some embodiments, the multispecific antigen binding protein binds two or more epitopes of one, two, or more polypeptides or other antigens. Multispecific antibodies have binding specificities for at least two different epitopes, where the epitopes are usually from different antigens. While such molecules normally will only bind two different epitopes (i.e. bispecific antibodies, BsAbs), antibodies with additional specificities such as trispecific antibodies are encompassed by this expression when used herein. Bispecific antibodies can be prepared as full length antibodies or antibody fragments (e.g. F(ab')$_2$ bispecific antibodies).

In some embodiments, a multimeric polypeptide of the present disclosure is an antibody. In some embodiments, a subunit of the present disclosure is a half antibody. In some embodiments, an antibody provided herein is a chimeric, human, or humanized antibody. Antibodies or antibody fragments isolated from human antibody libraries are considered human antibodies or human antibody fragments herein. As described below, antibodies are prepared using techniques available in the art for generating antibodies, exemplary methods of which are described in more detail in the following sections. One of skill in the art will recognize that many of the methods described below may be applied to multimeric polypeptides other than antibodies.

In some embodiments, a subunit of the present disclosure is a monovalent antibody in which the first chain and the second chain represent an immunoglobulin heavy chain and an immunoglobulin light chain. As used herein, a monovalent antibody may refer to any polypeptide complex made from an antibody heavy chain and an antibody light chain operably linked together to form a heavy chain-light chain pair in which the heavy chain-light chain pair is not operably linked to a second heavy chain-light chain pair. The term "half-antibody (hAb)" may be used interchangeably herein.

In some embodiments, the multimeric polypeptide specifically binds one or more target antigens. In some embodiments, a multimeric polypeptide or subunit of the present disclosure is capable of specifically binding an antigen. As used herein, the term "binds", "specifically binding an," or is "specific for" refers to measurable and reproducible interactions such as binding between a target (i.e., and an antibody, which is determinative of the presence of the target in the presence of a heterogeneous population of molecules including biological molecules. For example, an antibody that binds to or specifically binds to a target (which can be an epitope) is an antibody that binds this target with greater affinity, avidity, more readily, and/or with greater duration than it binds to other targets. In one embodiment, the extent of binding of an antibody to an unrelated target is less than about 10% of the binding of the antibody to the target as measured, e.g., by a radioimmunoassay (RIA). In certain embodiments, an antibody that specifically binds to a target has a dissociation constant (Kd) of ≤1 µM, ≤100 nM, ≤10 nM, ≤1 nM, or ≤0.1 nM. In certain embodiments, an antibody specifically binds to an epitope on a protein that is conserved among the protein from different species. In another embodiment, specific binding can include, but does not require, exclusive binding. In certain embodiments, an antibody provided herein has a dissociation constant (Kd) of ≤1 µM, ≤150 nM, ≤100 nM, ≤50 nM, ≤10 nM, ≤1 nM, ≤0.1 nM, ≤0.01 nM, or ≤0.001 nM (e.g. $10^{-8}$M or less, e.g. from $10^{-8}$M to $10^{-13}$M, e.g., from $10^{-9}$M to $10^{-13}$ M).

In one embodiment, Kd is measured by a radiolabeled antigen binding assay (MA) performed with the Fab version of an antibody of interest and its antigen as described by the following assay. Solution binding affinity of Fabs for antigen is measured by equilibrating Fab with a minimal concentration of ($^{125}$I)-labeled antigen in the presence of a titration series of unlabeled antigen, then capturing bound antigen with an anti-Fab antibody-coated plate (see, e.g., Chen et al., J. Mol. Biol. 293:865-881(1999)). To establish conditions for the assay, MICROTITER® multi-well plates (Thermo Scientific) are coated overnight with 5 µg/ml of a capturing anti-Fab antibody (Cappel Labs) in 50 mM sodium carbonate (pH 9.6), and subsequently blocked with 2% (w/v) bovine serum albumin in PBS for two to five hours at room temperature (approximately 23° C.). In a non-adsorbent plate (Nunc #269620), 100 µM or 26 µM [$^{125}$I]-antigen are mixed with serial dilutions of a Fab of interest. The Fab of interest is then incubated overnight; however, the incubation may continue for a longer period (e.g., about 65 hours) to ensure that equilibrium is reached. Thereafter, the mixtures are transferred to the capture plate for incubation at room temperature (e.g., for one hour). The solution is then removed and the plate washed eight times with 0.1% polysorbate 20 (TWEEN-20) in PBS. When the plates have dried, 150 µl/well of scintillant (MICROSCINT-20™; Packard) is added, and the plates are counted on a TOP-COUNT™ gamma counter (Packard) for ten minutes. Concentrations of each Fab that give less than or equal to 20% of maximal binding are chosen for use in competitive binding assays.

According to another embodiment, Kd is measured using surface plasmon resonance assays using a BIACORE®-2000 or a BIACORE®-3000 (BIAcore, Inc., Piscataway, NJ) at 25° C. with immobilized antigen CMS chips at ~10 response units (RU). Briefly, carboxymethylated dextran biosensor chips (CMS, BIACORE, Inc.) are activated with N-ethyl-N'-(3-dimethylaminopropyl)-carbodiimide hydrochloride (EDC) and N-hydroxysuccinimide (NHS) according to the supplier's instructions. Antigen is diluted with 10 mM sodium acetate, pH 4.8, to 5 µg/ml (~0.2 µM) before injection at a flow rate of 5 µl/minute to achieve approximately 10 response units (RU) of coupled protein. Following the injection of antigen, 1 M ethanolamine is injected to block unreacted groups. For kinetics measurements, two-fold serial dilutions of Fab (0.78 nM to 500 nM) are injected in PBS with 0.05% polysorbate 20 (TWEEN-20™) surfactant (PBST) at 25° C. at a flow rate of approximately 25 µl/min. Association rates ($k_{on}$) and dissociation rates ($k_{off}$) are calculated using a simple one-to-one Langmuir binding model (BIACORE® Evaluation Software version 3.2) by simultaneously fitting the association and dissociation sensorgrams. The equilibrium dissociation constant (Kd) is calculated as the ratio $k_{off}/k_{on}$. See, e.g., Chen et al., *J. Mol. Biol.* 293:865-881 (1999). If the on-rate exceeds $10^6 M^{-1} s^{-1}$ by the surface plasmon resonance assay above, then the on-rate can be determined by using a fluorescent quenching technique that measures the increase or decrease in fluorescence emission intensity (excitation=295 nm; emission=340 nm, 16 nm band-pass) at 25° C. of a 20 nM anti-antigen antibody (Fab form) in PBS, pH 7.2, in the presence of increasing concentrations of antigen as measured in a spectrometer, such as a stop-flow equipped spectrophometer (Aviv Instruments) or a 8000-series SLM-AMINCO™ spectrophotometer (ThermoSpectronic) with a stirred cuvette.

In some embodiments, a multimeric polypeptide of the present disclosure comprises a bispecific antibody. In some embodiments, the first and third polypeptide chains are antibody heavy chains, and the second and fourth polypeptide chains are antibody light chains. In some embodiments, the first subunit is a first half-antibody that binds a first antigen, and the second subunit is a second half-antibody that binds a second antigen. In some embodiments, the first and second antigens are different. In some embodiments, the first and second antigens represent different epitopes of the same target. Other antibodies such as trispecific or tetravalent antibodies are also contemplated.

Methods for making bispecific antibodies are known in the art. Traditional production of full length bispecific antibodies is based on the coexpression of two immunoglobulin heavy chain-light chain pairs, where the two chains have different specificities (Millstein et al., *Nature,* 305:537-539 (1983)). Because of the random assortment of immunoglobulin heavy and light chains, these hybridomas (quadromas) produce a potential mixture of 10 different antibody molecules, of which only one has the correct bispecific structure. Purification of the correct molecule, which is usually done by affinity chromatography steps, is rather cumbersome, and the product yields are low. Similar procedures are disclosed in WO 93/08829, and in Traunecker et al., *EMBO J.* 10:3655-3659 (1991).

In certain embodiments, one or more amino acid modifications may be introduced into the Fc region of an antibody provided herein, thereby generating an Fc region variant. The Fc region variant may comprise a human Fc region sequence (e.g., a human IgG1, IgG2, IgG3 or IgG4 Fc region) comprising an amino acid modification (e.g. a substitution) at one or more amino acid positions.

In certain embodiments, the disclosure contemplates an antibody variant that possesses some but not all effector functions, which make it a desirable candidate for applications in which the half life of the antibody in vivo is important yet certain effector functions (such as complement and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the antibody lacks FcγR binding (hence likely lacking ADCC activity), but retains FcRn binding ability. The primary cells for mediating ADCC, NK cells, express Fc(RIII only, whereas monocytes express Fc(RI, Fc(RII and Fc(RIII. FcR expression on hematopoietic cells is summarized in Table 3 on page 464 of Ravetch and Kinet, *Annu. Rev. Immunol.* 9:457-492 (1991). Non-limiting examples of in vitro assays to assess ADCC activity of a molecule of interest is described in U.S. Pat. No. 5,500,362 (see, e.g. Hellstrom, I. et al. *Proc. Nat'l Acad. Sci. USA* 83:7059-7063 (1986)) and Hellstrom, I et al., *Proc. Nat'l Acad. Sci. USA* 82:1499-1502 (1985); 5,821,337 (see Bruggemann, M. et al., *J. Exp. Med.* 166:1351-1361 (1987)). Alternatively, non-radioactive assays methods may be employed (see, for example, ACTI™ non-radioactive cytotoxicity assay for flow cytometry (CellTechnology, Inc. Mountain View, CA; and CytoTox 96® non-radioactive cytotoxicity assay (Promega, Madison, WI). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *Proc. Nat'l Acad. Sci. USA* 95:652-656 (1998). C1q binding assays may also be carried out to confirm that the antibody is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al., *J. Immunol. Methods* 202:163 (1996); Cragg, M. S. et al., *Blood* 101:1045-1052 (2003); and Cragg, M. S. and M. J. Glennie, *Blood* 103: 2738-2743 (2004)). FcRn binding and in vivo clearance/half life determinations can also be performed using methods known in the art (see, e.g., Petkova, S. B. et al., *Int'l. Immunol.* 18(12):1759-1769 (2006)).

Antibodies with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

Certain antibody variants with improved or diminished binding to FcRs are described. (See, e.g., U.S. Pat. No. 6,737,056; WO 2004/056312, and Shields et al., *J. Biol. Chem.* 9(2): 6591-6604 (2001).)

In certain embodiments, an antibody variant comprises an Fc region with one or more amino acid substitutions which improve ADCC, e.g., substitutions at positions 298, 333, and/or 334 of the Fc region (EU numbering of residues). In an exemplary embodiment, the antibody comprising the following amino acid substitutions in its Fc region: S298A, E333A, and K334A.

In some embodiments, alterations are made in the Fc region that result in altered (i.e., either improved or diminished) C1q binding and/or Complement Dependent Cytotoxicity (CDC), e.g., as described in U.S. Pat. No. 6,194,551, WO 99/51642, and Idusogie et al. *J. Immunol.* 164: 4178-4184 (2000).

Antibodies with increased half lives and improved binding to the neonatal Fc receptor (FcRn), which is responsible for the transfer of maternal IgGs to the fetus (Guyer et al., *J. Immunol.* 117:587 (1976) and Kim et al., *J. Immunol.* 24:249 (1994)), are described in US2005/0014934A1 (Hinton et al.)). Those antibodies comprise an Fc region with one or more substitutions therein which improve binding of the Fc region to FcRn. Such Fc variants include those with substitutions at one or more of Fc region residues: 238, 256, 265, 272, 286, 303, 305, 307, 311, 312, 317, 340, 356, 360, 362, 376, 378, 380, 382, 413, 424 or 434, e.g., substitution of Fc region residue 434 (U.S. Pat. No. 7,371,826). See also Duncan & Winter, *Nature* 322:738-40 (1988); U.S. Pat. Nos. 5,648,260; 5,624,821; and WO 94/29351 concerning other examples of Fc region variants.

The antibodies of the disclosure can be further modified to contain additional nonproteinaceous moieties that are known in the art and readily available. In certain embodiments, the moieties suitable for derivatization of the antibody are water soluble polymers.

Knobs-into-Holes Approach

One approach known in the art for making bispecific antibodies is the "knobs-into-holes" or "protuberance-into-cavity" approach (see, e.g., U.S. Pat. No. 5,731,168). In this approach, two immunoglobulin polypeptides (e.g., heavy chain polypeptides) each comprise an interface. An interface of one immunoglobulin polypeptide interacts with a corresponding interface on the other immunoglobulin polypeptide, thereby allowing the two immunoglobulin polypeptides to associate. These interfaces may be engineered such that a "knob" or "protuberance" (these terms may be used interchangeably herein) located in the interface of one immunoglobulin polypeptide corresponds with a "hole" or "cavity" (these terms may be used interchangeably herein) located in the interface of the other immunoglobulin polypeptide. In some embodiments, the hole is of identical or similar size to the knob and suitably positioned such that when the two interfaces interact, the knob of one interface is positionable in the corresponding hole of the other interface. Without wishing to be bound to theory, this is thought to stabilize the heteromultimer and favor formation of the heteromultimer over other species, for example homomultimers. In some embodiments, this approach may be used to promote the heteromultimerization of two different immunoglobulin polypeptides, creating a bispecific antibody comprising two immunoglobulin polypeptides with binding specificities for different epitopes.

In some embodiments, a knob may be constructed by replacing a small amino acid side chain with a larger side chain. In some embodiments, a hole may be constructed by replacing a large amino acid side chain with a smaller side chain. Knobs or holes may exist in the original interface, or they may be introduced synthetically. For example, knobs or holes may be introduced recombinantly by altering the nucleic acid sequence encoding the interface to replace at least one "original" amino acid residue with at least one "import" amino acid residue. Methods for altering nucleic acid sequences may include standard molecular biology techniques well known in the art. The side chain volumes of various amino acid residues are shown in the following table. In some embodiments, original residues have a small side chain volume (e.g., alanine, asparagine, aspartic acid, glycine, serine, threonine, or valine), and import residues for forming a knob are naturally occurring amino acids and may include arginine, phenylalanine, tyrosine, and tryptophan. In some embodiments, original residues have a large side chain volume (e.g., arginine, phenylalanine, tyrosine, and tryptophan), and import residues for forming a hole are naturally occurring amino acids and may include alanine, serine, threonine, and valine.

In some embodiments, original residues for forming a knob or hole are identified based on the three-dimensional structure of the heteromultimer. Techniques known in the art for obtaining a three-dimensional structure may include X-ray crystallography and NMR. In some embodiments, the interface is the CH3 domain of an immunoglobulin constant domain. In these embodiments, the CH3/CH3 interface of human $IgG_1$ involves sixteen residues on each domain located on four anti-parallel β-strands. Without wishing to be bound to theory, mutated residues are preferably located on the two central anti-parallel β-strands to minimize the risk that knobs can be accommodated by the surrounding solvent, rather than the compensatory holes in the partner CH3 domain. In some embodiments, the mutations forming corresponding knobs and holes in two immunoglobulin polypeptides correspond to one or more pairs provided in the following table.

In certain embodiments, the CH3 and/or CH2 domains of an antibody of the present disclosure are from an IgG4 subtype. In some embodiments, the IgG4 CH3 and/or CH2 domains of an antibody of the present disclosure may comprise one or more additional mutations, including without limitation an S228P mutation (EU numbering).

TABLE 1b

Properties of amino acid residues

| Amino Acid | One-letter abbreviation | Mass[a] (daltons) | Volume[b] (Å³) | Accessible surface area[c] (Å²) |
|---|---|---|---|---|
| Alanine (Ala) | A | 71.08 | 88.6 | 115 |
| Arginine (Arg) | R | 156.20 | 173.4 | 225 |
| Asparagine (Asn) | N | 114.11 | 117.7 | 160 |
| Aspartic Acid (Asp) | D | 115.09 | 111.1 | 150 |
| Cysteine (Cys) | C | 103.14 | 108.5 | 135 |
| Glutamine (Gln) | Q | 128.14 | 143.9 | 180 |
| Glutamic Acid (Glu) | E | 129.12 | 138.4 | 190 |
| Glycine (Gly) | G | 57.06 | 60.1 | 75 |
| Histidine (His) | H | 137.15 | 153.2 | 195 |
| Isoleucine (Ile) | I | 113.17 | 166.7 | 175 |
| Leucine (Leu) | L | 113.17 | 166.7 | 170 |
| Lysine (Lys) | K | 128.18 | 168.6 | 200 |
| Methionine (Met) | M | 131.21 | 162.9 | 185 |
| Phenylalanine (Phe) | F | 147.18 | 189.9 | 210 |
| Proline (Pro) | P | 97.12 | 122.7 | 145 |
| Serine (Ser) | S | 87.08 | 89.0 | 115 |
| Threonine (Thr) | T | 101.11 | 116.1 | 140 |
| Tryptophan (Trp) | W | 186.21 | 227.8 | 255 |
| Tyrosine (Tyr) | Y | 163.18 | 193.6 | 230 |
| Valine (Val) | V | 99.14 | 140.0 | 155 |

[a]Molecular weight of amino acid minus that of water. Values from Handbook of Chemistry and Physics, 43rd ed. Cleveland, Chemical Rubber Publishing Co., 1961.
[b]Values from A.A. Zamyatnin, Prog. Biophys. Mol. Biol. 24:107-123, 1972.
[c]Values from C. Chothia, J. Mol. Biol. 105:1-14, 1975. The accessible surface area is defined in FIGS. 6-20 of this reference.

In some embodiments, a polypeptide chain of one subunit comprises at least one hole mutation, and a polypeptide chain of the other subunit comprises at least one knob mutation. For example, the first subunit comprises an antibody Fc region comprising at least one hole mutation and the second subunit comprises an antibody Fc region comprising at least one knob mutation, or the first subunit comprises an antibody Fc region comprising at least one knob mutation and the second subunit comprises an antibody Fc region comprising at least one hole mutation.

In some embodiments, the CH3 domains of an antibody of the present disclosure are from an IgG (e.g., IgG1 subtype, IgG2 subtype, IgG2A subtype, IgG2B subtype, IgG3, subtype, or IgG4 subtype). In some embodiments, the CH3 domains of an antibody of the present disclosure may comprise one or more knob or hole mutations, such as those described in Table 3 below.

TABLE 3

Exemplary sets of corresponding knob and hole mutations

| CH3 of first immunoglobulin | CH3 of second immunoglobulin |
|---|---|
| T366Y | Y407T |
| T366W | Y407A |
| T366W | T366S: L368A: Y407V |
| F405A | T394W |
| Y407T | T366Y |
| T366Y:F405A | T394W:Y407T |
| T366W:F405W | T394S:Y407A |
| F405W:Y407A | T366W:T394S |
| F405W | T394S |

In some embodiments, an immunoglobulin polypeptide comprises a CH3 domain comprising one or more amino acid substitutions listed in Table 2 above. In some embodiments, a bispecific antibody comprises a first immunoglobulin polypeptide comprising a CH3 domain comprising one or more amino acid substitutions listed in the left column of Table 3, and a second immunoglobulin polypeptide comprising a CH3 domain comprising one or more corresponding amino acid substitutions listed in the right column of Table 3. In some embodiments, one subunit of a multimeric polypeptide of the present disclosure comprises the mutation(s) listed in the left column of a row in Table 3, and another subunit of the multimeric polypeptide comprises the mutation(s) listed in the right column of the same row in Table 3. As a non-limiting example of a knob-and-hole pair, in some embodiments, a bispecific antibody comprises a first immunoglobulin polypeptide comprising a CH3 domain comprising a T366W mutation, and a second immunoglobulin polypeptide comprising a CH3 domain comprising T366S, L368A, and Y407V mutations. In some embodiments, at least one knob mutation is/are selected from the group consisting of: T366Y, T366W, T394W, and F405W, numbering based on human IgG1 according to EU index. In some embodiments, at least one hole mutation is/are selected from the group consisting of: F405A, Y407T, Y407A, T366S, L368A, Y407V, and T394S, numbering based on human IgG1 according to EU index. In certain embodiments, the knob mutation comprises the T366W substitution, and the hole mutation comprises the T366S, L368A, and Y407V substitutions, numbering based on human IgG1 according to EU index. Other descriptions of knob and hole mutations useful in the methods and cells described herein can be found, e.g., in Ridgway J B B et al. 1996 Protein Eng. 9(7):617-621 and www.imgt.org/IMGT-biotechnology/Knobs-into-holes_IgG.html.

Following mutation of the DNA as discussed above, polynucleotides encoding modified immunoglobulin polypeptides with one or more corresponding knob or hole mutations may be expressed and purified using standard recombinant techniques and cell systems known in the art. For example, all four polypeptide chains of the bispecific antibody can be produced and assembled in a single host cell, e.g., as described and exemplified in the Examples infra.

Bispecific antibodies have been produced using leucine zippers. Kostelny et al., *J. Immunol.*, 148(5):1547-1553 (1992). The leucine zipper peptides from the Fos and Jun proteins were linked to the Fab' portions of two different antibodies by gene fusion. The antibody homodimers were reduced at the hinge region to form monomers and then re-oxidized to form the antibody heterodimers. This method can also be utilized for the production of antibody homodimers. The "diabody" technology described by Hollinger et al., *Proc. Natl. Acad. Sci. USA*, 90:6444-6448 (1993) has provided an alternative mechanism for making bispecific antibody fragments. The fragments comprise a heavy-chain variable domain (VH) connected to a light-chain variable domain (VL) by a linker which is too short to allow pairing between the two domains on the same chain. Accordingly, the VH and VL domains of one fragment are forced to pair with the complementary VL and VH domains of another fragment, thereby forming two antigen-binding sites. Another strategy for making bispecific antibody fragments by the use of single-chain Fv (sFv) dimers has also been reported. See Gruber et al, *J. Immunol*, 152:5368 (1994).

Another technique for making bispecific antibody fragments is the "bispecific T cell engager" or BiTE® approach (see, e.g., WO2004/106381, WO2005/061547, WO2007/042261, and WO2008/119567). This approach utilizes two antibody variable domains arranged on a single polypeptide. For example, a single polypeptide chain includes two single chain Fv (scFv) fragments, each having a variable heavy chain (VH) and a variable light chain (VL) domain separated by a polypeptide linker of a length sufficient to allow intramolecular association between the two domains. This single polypeptide further includes a polypeptide spacer sequence between the two scFv fragments. Each scFv recognizes a different epitope, and these epitopes may be specific for different cell types, such that cells of two different cell types are brought into close proximity or tethered when each scFv is engaged with its cognate epitope. One particular embodiment of this approach includes a scFv recognizing a cell-surface antigen expressed by an immune cell, e.g., a CD3 polypeptide on a T cell, linked to another scFv that recognizes a cell-surface antigen expressed by a target cell, such as a malignant or tumor cell.

Antibodies with more than two valencies are contemplated. For example, trispecific antibodies can be prepared. Tuft et al. *J. Immunol.* 147: 60 (1991).

In some embodiments, an antibody of the disclosure is a single-domain antibody. A single-domain antibody is a single polypeptide chain comprising all or a portion of the heavy chain variable domain or all or a portion of the light chain variable domain of an antibody. In certain embodiments, a single-domain antibody is a human single-domain antibody (Domantis, Inc., Waltham, Mass.; see, e.g., U.S. Pat. No. 6,248,516 B 1). In one embodiment, a single-domain antibody consists of all or a portion of the heavy chain variable domain of an antibody.

Mutations Promoting Selective Light Chain-Heavy Chain Pairing

In some embodiments, a multimeric polypeptide of the present disclosure comprises one or more mutations that promote selective association of an antibody light chain with an antibody heavy chain. Exemplary amino acid substitutions that promote selective association between an antibody heavy chain and an antibody light chain useful in the methods and cells described herein can be found in WO2016/172485. In some embodiments, the antibody heavy chain of a subunit comprises one or more mutations that promote selective association, and the antibody light chain of the subunit comprises one or more mutations that promote selective association in combination with the heavy chain. In some embodiments, both half antibodies of a bispecific antibody comprise one or more mutations that promote selective association of an antibody light chain with an antibody heavy chain (e.g., one heavy chain has a positively charged mutation and its corresponding light chain has a negatively charged mutation, while the other heavy chain has a negatively charged mutation and its corresponding light chain has a positively charged mutation, or vice versa). In some embodiments, only one half antibody of a bispecific antibody comprises one or more mutations that promote selective association of an antibody light chain with an antibody heavy chain (e.g., one heavy chain has a positively charged mutation and its corresponding light chain has a negatively charged mutation, or vice versa).

In some embodiments, an antibody heavy chain (e.g., the CH1 domain) comprises an amino acid substitution at 5183, and an antibody light chain (e.g., the CL domain) comprises an amino acid substitution at V133 (numbering based on EU index). In some embodiments, the S183 substitution is selected from the group consisting of S183A, S183T, S183V, S183Y, S183F, S183H, S183N, S183D, S183E, S183R, and S183K. In some embodiments, the V133 substitution is selected from the group consisting of V133E, V133S, V133L, V133W, V133K, V133R, and V133D. In some embodiments, the amino acid substitution at S183 results in a positively charged residue, and wherein the amino acid substitution at V133 results in a negatively charged residue. In some embodiments, the amino acid substitution at S183 results in a negatively charged residue, and wherein the amino acid substitution at V133 results in a positively charged residue.

Mutations that promote selective association of heavy chain/light chain pairs can be combined with mutations that promote selective association of heavy chains (e.g., knob and hole mutations). In some embodiments, a multimeric polypeptide (e.g., a bispecific antibody) can comprise a set of knob and hole mutations and one or more mutations that promote selective association of an antibody light chain with an antibody heavy chain. Advantageously, this promotes proper heavy chain/light chain association in one or both half antibodies as well as proper assembly of the bispecific antibody (e.g., as opposed to forming dimers of each half antibody), leading to fewer incorrectly paired side products. In some embodiments, a polypeptide chain of the present disclosure (e.g., an antibody heavy chain of a bispecific antibody or half antibody) comprises one or more knob or hole mutations and one or more mutations that promote selective association of an antibody light chain with an antibody heavy chain. For example, in some embodiments, a first antibody heavy chain of a bispecific antibody comprises a mutation resulting in a negative charge (e.g., an S183E mutation) and a hole mutation, the first antibody light chain comprises a mutation resulting in a positive charge (e.g., a V133K mutation), the second antibody heavy chain of a bispecific antibody comprises a mutation resulting in a positive charge (e.g., an S183K mutation) and a knob mutation, and the second antibody light chain comprises a mutation resulting in a negative charge (e.g., a V133E mutation).

Pluralities and Compositions of Multimeric Polypeptides

Further provided herein are multimeric polypeptides, as well as pluralities of multimeric polypeptides or compositions of multimeric polypeptides, produced according to the methods described herein. Advantageously, the present disclosure demonstrates that the methods described herein allow for improved production of multimeric polypeptides with higher production of desired multimeric polypeptides and/or lower amounts of impurities such as incorrectly paired side products. As such, in some embodiments, the pluralities of multimeric polypeptides and multimeric polypeptide compositions produced by the methods of the present disclosure comprise fewer incorrectly paired side products, as compared with pluralities and compositions produced by existing techniques (e.g., as compared with an expression system in which one or more, two or more, three or more, or four of the polynucleotides encoding polypeptide chains of a multimeric polypeptide comprise an open-reading frame operably linked to a native or unmodified translation initiation sequence, or expression in which each of the polynucleotides encoding polypeptide chains of a multimeric polypeptide comprise the same translation initiation sequence). In some embodiments, the pluralities of multimeric polypeptides and multimeric polypeptide compositions produced by the methods of the present disclosure comprise a higher ratio of multimeric polypeptide to incorrectly paired side products, as compared with pluralities and compositions produced by existing techniques (e.g., as compared with an expression system in which one or more, two or more, three or more, or four of the polynucleotides encoding polypeptide chains of a multimeric polypeptide comprise an open-reading frame operably linked to a native or unmodified translation initiation sequence, or expression in which each of the polynucleotides encoding polypeptide chains of a multimeric polypeptide comprise the same translation initiation sequence). In some embodiments, all of the polypeptide chains of a multimeric polypeptide are produced from a single eukaryotic (e.g., mammalian) cell. In some embodiments, the multimeric polypeptides are bispecific antibodies.

Multimeric Protein Production

Host cells (e.g., as described in section III infra) are transformed with one or more polynucleotides or vectors (e.g., expression vectors) and cultured in conventional nutrient media modified as appropriate for inducing promoters, selecting transformants, or amplifying the genes encoding the desired sequences.

The host cells used to produce a desired multimeric polypeptide of the present disclosure or a subunit thereof may be cultured in a variety of media. Commercially available media such as Ham's F10 (Sigma), Minimal Essential Medium ((MEM), (Sigma), RPMI-1640 (Sigma), and Dulbecco's Modified Eagle's Medium ((DMEM), Sigma) are suitable for culturing the host cells. In addition, any of the media described in Ham et al., Meth. Enz. 58:44 (1979), Barnes et al., Anal. Biochem. 102:255 (1980), U.S. Pat. Nos. 4,767,704; 4,657,866; 4,927,762; 4,560,655; or 5,122,469; WO 90/03430; WO 87/00195; or U.S. Pat. No. Re. 30,985 may be used as culture media for the host cells. Any of these media may be supplemented as necessary with hormones and/or other growth factors (such as insulin, transferrin, or epidermal growth factor), salts (such as sodium chloride, calcium, magnesium, and phosphate), buffers (such as HEPES), nucleotides (such as adenosine and thymidine), antibiotics (such as GENTAMYCIN™ drug), trace elements (defined as inorganic compounds usually present at final concentrations in the micromolar range), and glucose or an equivalent energy source. Any other necessary supplements may also be included at appropriate concentrations that would be known to those skilled in the art. The culture conditions, such as temperature, pH, and the like, are those previously used with the host cell selected for expression, and will be apparent to the ordinarily skilled artisan.

Methods for recovering a multimeric polypeptide of the present disclosure are described herein. When using recombinant techniques, the multimeric polypeptides of the present disclosure or subunit(s) thereof can be produced intracellularly, or directly secreted into the medium. If the polypeptide is produced intracellularly, as a first step, the particulate debris, either host cells or lysed fragments, are removed, for example, by centrifugation or ultrafiltration. Where the polypeptide is secreted into the medium, supernatants from such expression systems are generally first concentrated using a commercially available protein concentration filter, for example, an Amicon or Millipore Pellicon ultrafiltration unit. A protease inhibitor such as PMSF may be included in any of the foregoing steps to inhibit proteolysis and antibiotics may be included to prevent the growth of adventitious contaminants.

The polypeptide composition prepared from the cells can be purified using, for example, hydroxylapatite chromatography, gel electrophoresis, dialysis, and affinity chromatography, with affinity chromatography being the preferred purification technique. The suitability of protein A as an affinity ligand depends on the species and isotype of any immunoglobulin Fc domain that is present in the antibody.

Protein A can be used to purify antibodies that are based on human γ1, γ2, or γ4 heavy chains (Lindmark et al., J. Immunol. Meth. 62: 1-13 (1983)). Protein G is recommended for all mouse isotypes and for human γ3 (Guss et al., EMBO J. 5:15671575 (1986)). The matrix to which the affinity ligand is attached is most often agarose, but other matrices are available. Mechanically stable matrices such as controlled pore glass or poly(styrenedivinyl)benzene allow for faster flow rates and shorter processing times than can be achieved with agarose. Where the antibody comprises a CH3 domain, the Bakerbond ABX™ resin (J. T. Baker, Phillipsburg, NJ) is useful for purification. Other techniques for protein purification such as fractionation on an ion-exchange column, ethanol precipitation, Reverse Phase HPLC, chromatography on silica, chromatography on heparin SEPHAROSE™ chromatography on an anion or cation exchange resin (such as a polyaspartic acid column), chromatofocusing, SDS-PAGE, and ammonium sulfate precipitation are also available depending on the antibody to be recovered.

Following any preliminary purification step(s), the mixture comprising the polypeptide(s) of interest and contaminants may be subjected to low pH hydrophobic interaction chromatography using an elution buffer at a pH between about 2.5-4.5, preferably performed at low salt concentrations (e.g., from about 0-0.25M salt). The production of the antigen binding polypeptides can alternatively or additionally (to any of the foregoing particular methods) comprise dialyzing a solution comprising a mixture of the polypeptides.

In one embodiment, the multimeric polypeptide of the present disclosure or a subunit thereof produced herein is further purified to obtain preparations that are substantially homogeneous for further assays and uses. Standard protein purification methods known in the art can be employed. The following procedures are exemplary of suitable purification procedures: fractionation on immunoaffinity or ion-exchange columns, ethanol precipitation, reverse phase HPLC, chromatography on silica or on a cation-exchange resin such as DEAE, chromatofocusing, SDS-PAGE, ammonium sulfate precipitation, and gel filtration using, for example, Sephadex G-75.

Purification of the multimeric polypeptide can be performed using known chromatography techniques, including for instance, Protein A or protein G column chromatography. In one embodiment, the multimeric polypeptide of interest may be recovered from the solid phase of the column by elution into a solution containing a chaotropic agent or mild detergent. Exemplary chaotropic agents and mild detergents include, but are not limited to, Guanidine-HCl, urea, lithium perclorate, Arginine, Histidine, SDS (sodium dodecyl sulfate), Tween, Triton, and NP-40, all of which are commercially available.

In one embodiment, Protein A immobilized on a solid phase is used for immunoaffinity purification of, for example, antigen binding polypeptides of the invention. Protein A is a 41 kD cell wall protein from *Staphylococcus aureus* which binds with a high affinity to the Fc region of antigen binding polypeptides. Lindmark et al. (1983) J. Immunol. Meth. 62:1-13. The solid phase to which Protein A is immobilized is preferably a column comprising a glass or silica surface, more preferably a controlled pore glass column or a silicic acid column. In some applications, the column has been coated with a reagent, such as glycerol, in an attempt to prevent nonspecific adherence of contaminants.

As the first step of purification, the preparation derived from the cell culture as described above is applied onto the Protein A immobilized solid phase to allow specific binding of the antigen binding polypeptide of interest to Protein A. The solid phase is then washed to remove contaminants non-specifically bound to the solid phase. The antigen binding polypeptide (such as, for example, an antibody) is recovered from the solid phase by elution.

Screening Methods

Yet further provided herein are methods for identifying a combination of translation initiation sequences for expressing a multimeric polypeptide in a eukaryotic host cell of the present disclosure. In some embodiments, the methods comprise providing a library comprising a plurality of eukaryotic host cells, culturing the library of eukaryotic host cells under conditions suitable for expression of the multimeric polypeptide by the eukaryotic host cells of the plurality, measuring an amount of the multimeric polypeptide that is produced by single eukaryotic host cells of the plurality or clones of single eukaryotic host cells of the plurality, and identifying the first, second, third, and fourth translation initiation sequences of one or more single eukaryotic host cells of the plurality or clones of single eukaryotic host cells of the plurality that produce the multimeric polypeptide. Exemplary such methods are described and exemplified infra.

In some embodiments, a library of the present disclosure comprises a plurality of host cells of the present disclosure. In some embodiments, two or more, or all, of the host cells in the plurality comprise the set of polynucleotides necessary to encode each polypeptide chain of a subunit or multimeric polypeptide as described herein. For example, in some embodiments, multiple or all of the host cells in the library comprise a first polynucleotide comprising a first translation initiation sequence operably linked to a first open-reading frame that encodes the first polypeptide chain of a multimeric polypeptide of the present disclosure, a second polynucleotide comprising a second translation initiation sequence operably linked to a second open-reading frame that encodes the second polypeptide chain of a multimeric polypeptide of the present disclosure, a third polynucleotide comprising a third translation initiation sequence operably linked to a third open-reading frame that encodes the third polypeptide chain of a multimeric polypeptide of the present disclosure, and a fourth polynucleotide comprising a fourth translation initiation sequence operably linked to a fourth open-reading frame that encodes the fourth polypeptide chain of a multimeric polypeptide of the present disclosure. In some embodiments, the plurality of host cells or library comprises a plurality of combinations of first, second, third, and fourth translation initiation sequences. As such, screening the library can be used to identify a combination of translation initiation sequences that gives rise to a property of interest (e.g., expression of a multimeric polypeptide, such as a high level of expression or low level of incorrectly paired side products). The present disclosure demonstrates that expression of multimeric polypeptides can be improved by tuning the strength of translation initiation sequences operably linked to the polynucleotide(s) encoding one or more of the constituent polypeptide chains.

In some embodiments, one or more of the translation initiation sequences operably linked to an open-reading frame in each host cell of the plurality comprise the sequence (from 5' to 3') NNNNNATGNGA, wherein N is C, G, A, or T/U (SEQ ID NO:1).

Various methods described herein can be used to measure an amount of multimeric polypeptide that is produced by one or more host cells, or clonal populations of host cells, of the present disclosure. For example, transient or stable transfectants can be cultured, and production of multimeric polypeptide can be assayed. Fed-batch or perfusion cultures are grown, and titers of product in the cell medium or on the cell surface can be assayed. For surface expression, cells can be stained with antibody to detect product and analyzed, e.g., by flow cytometry. Product quality and/or purity can be assayed, e.g., with electrophoresis and/or mass spectrometry.

Antibodies of the disclosure may be isolated by screening combinatorial libraries for antibodies with the desired activity or activities. For example, a variety of methods are known in the art for generating phage display libraries and screening such libraries for antibodies possessing the desired binding characteristics such as the methods described in Example 3. Additional methods are reviewed, e.g., in Hoogenboom et al. in *Methods in Molecular Biology* 178:1-37 (O'Brien et al., ed., Human Press, Totowa, NJ, 2001) and further described, e.g., in the McCafferty et al., *Nature* 348:552-554; Clackson et al., *Nature* 352: 624-628 (1991); Marks et al., *J. Mol. Biol.* 222: 581-597 (1992); Marks and Bradbury, in *Methods in Molecular Biology* 248:161-175 (Lo, ed., Human Press, Totowa, NJ, 2003); Sidhu et al., *J Mol. Biol.* 338(2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J Immunol. Methods* 284(1-2): 119-132(2004).

In certain phage display methods, repertoires of VH and VL genes are separately cloned by polymerase chain reaction (PCR) and recombined randomly in phage libraries, which can then be screened for antigen-binding phage as described in Winter et al., *Ann. Rev. Immunol.*, 12: 433-455 (1994). Phage typically display antibody fragments, either as single-chain Fv (scFv) fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self-antigens without any immunization as described by Griffiths et al., *EMBO J*, 12: 725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, *J Mol. Biol.*, 227: 381-388 (1992). Patent publications describing human antibody phage libraries include, for example: U.S. Pat. No. 5,750,373, and US Patent Publication Nos. 2005/0079574, 2005/0119455, 2005/0266000, 2007/0117126, 2007/0160598, 2007/0237764, 2007/0292936, and 2009/0002360.

III. Cells

Also provided herein are recombinant eukaryotic host cells useful in producing a multimeric polypeptide, e.g., according to the methods described in section II. In some embodiments, the cells comprise a first polynucleotide comprising a first translation initiation sequence operably linked to a first open-reading frame that encodes the first polypeptide chain of a multimeric polypeptide of the present disclosure, a second polynucleotide comprising a second translation initiation sequence operably linked to a second open-reading frame that encodes the second polypeptide chain of a multimeric polypeptide of the present disclosure, a third polynucleotide comprising a third translation initiation sequence operably linked to a third open-reading frame that encodes the third polypeptide chain of a multimeric polypeptide of the present disclosure, and a fourth polynucleotide comprising a fourth translation initiation sequence operably linked to a fourth open-reading frame that encodes the fourth polypeptide chain of a multimeric polypeptide of the present disclosure. In some embodiments, the first subunit is expressed at a lower level than the second subunit when each subunit is expressed individually in the recombinant eukaryotic host cell, and one or both of the first translation initiation sequence and the second translation initiation sequence is weaker than one or both of the third translation initiation sequence and the fourth translation initiation sequence. In some embodiments, the multimeric polypeptide is non-native to the recombinant eukaryotic host cell. In some embodiments, the recombinant eukaryotic host cell is an isolated recombinant eukaryotic host cell.

In some embodiments, a host cell of the present disclosure is a eukaryotic cell. In some embodiments, a host cell of the present disclosure is a mammalian cell.

Suitable host cells include higher eukaryote cells described herein, including vertebrate host cells. Propagation of vertebrate cells in culture (tissue culture) has become a routine procedure. Examples of useful mammalian host cell lines are monkey kidney CV1 line transformed by SV40 (COS-7, ATCC CRL 1651); human embryonic kidney line (293 or 293 cells subcloned for growth in suspension culture, Graham et al., J. Gen Virol. 36:59 (1977)); baby hamster kidney cells (BHK, ATCC CCL 10); Chinese hamster ovary cells/-DHFR (CHO, Urlaub et al., Proc. Natl. Acad. Sci. USA 77:4216 (1980)); mouse Sertoli cells (TM4, Mather, Biol. Reprod. 23:243-251 (1980)); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TRI cells (Mather et al., Annals N. Y. Acad. Sci. 383:44-68 (1982)); MRC 5 cells; FS4 cells; and a human hepatoma line (Hep G2).

In some embodiments, a host cell of the present disclosure is a Chinese hamster ovary (CHO) cell or cell line. In some embodiments, a host cell of the present disclosure is a CHO-K1 cell line (see, e.g., ATCC catalog no. CCL-61™ and Lewis, N. E. et al. (2013) *Nat. Biotechnol.* 31:759-765). In some embodiments, a host cell of the present disclosure is a CHO cell that is deficient in dihydrofolate reductase (DHFR) activity (see, e.g., Urlaub, G. and Chasin, L. A. (1980) *Proc. Natl. Acad. Sci.* 77:4216-4220).

In some embodiments, all of the polypeptide chains of a multimeric polypeptide are produced from a single eukaryotic (e.g., mammalian) cell. Advantageously, this obviates the need for post-production assembly of multimeric polypeptides (e.g., bispecific antibodies), as is the case when two subunits (e.g., half antibodies) are assembled in vitro after production.

Any of the promoters and/or translation initiation sequences described herein may find use in a host cell of the present disclosure.

In some embodiments, one or more polynucleotides encoding a polypeptide chain of a subunit of a multimeric polypeptide of the present disclosure are present on a chromosome (e.g., via integration) of a host cell of the present disclosure. In some embodiments, each of the polynucleotides encoding a polypeptide chain of a subunit of a multimeric polypeptide of the present disclosure are present on a chromosome (e.g., via integration) of a host cell of the present disclosure. In some embodiments, each of the polynucleotides encoding a polypeptide chain of a subunit of a multimeric polypeptide of the present disclosure are present at the same chromosome or chromosomal locus (e.g., via integration) of a host cell of the present disclosure.

Stable integration or stable transfection of the polynucleotides of the present disclosure onto a host cell chromosome can provide a stable producer cell line for producing a multimeric polypeptide of the present disclosure. Various approaches suitable for integrating polynucleotide(s) into a host cell genome are known in the art, including random integration or site-specific integration (e.g., a "landing pad" approach); see, e.g., Zhao, M. et al. (2018) *Appl. Microbiol. Biotechnol.* 102:6105-6117; Lee, J. S. et al. (2015) *Sci. Rep.* 5:8572; and Gaidukov, L. et al. (2018) *Nucleic Acids Res.* 46:4072-4086.

In some embodiments, one or more polynucleotides encoding a polypeptide chain of a subunit of a multimeric polypeptide of the present disclosure are maintained as extrachromosomal polynucleotide(s) in the host cell. In some embodiments, each of the polynucleotides encoding a polypeptide chain of a subunit of a multimeric polypeptide of the present disclosure are maintained as extrachromosomal polynucleotide(s) in the host cell. In some embodiments, one or more polynucleotides encoding a polypeptide chain of a subunit of a multimeric polypeptide of the present disclosure are present in a vector (e.g., expression vector). In some embodiments, each of the polynucleotides encoding a polypeptide chain of a subunit of a multimeric polypeptide of the present disclosure are present in one or more vectors (e.g., expression vectors).

Vector components generally include, but are not limited to, one or more of the following: a signal sequence, an origin of replication, one or more marker genes, an enhancer element, a promoter, and a transcription termination sequence.

A vector for use in a eukaryotic host cell may also contain a signal sequence or other polypeptide having a specific cleavage site at the N-terminus of the mature protein or polypeptide of interest. The heterologous signal sequence selected preferably is one that is recognized and processed (i.e., cleaved by a signal peptidase) by the host cell. In mammalian cell expression, mammalian signal sequences as well as viral secretory leaders, for example, the herpes simplex gD signal, are available. The DNA for such precursor region is ligated in reading frame to DNA encoding the desired antigen binding polypeptide(s) (e.g., antibodies).

Generally, an origin of replication component is not needed for mammalian expression vectors. For example, the SV40 origin may typically be used, but only because it contains the early promoter.

Any of the promoters and/or translation initiation sequences described herein may find use in a vector of the present disclosure.

Expression and cloning vectors may contain a selection gene, also termed a selectable marker. Typical selection genes encode proteins that (a) confer resistance to antibiotics or other toxins, e.g., ampicillin, neomycin, methotrexate, or tetracycline, (b) complement auxotrophic deficiencies, where relevant, or (c) supply critical nutrients not available from complex media.

One example of a selection scheme utilizes a drug to arrest growth of a host cell. Those cells that are successfully transformed with a heterologous gene produce a protein conferring drug resistance and thus survive the selection regimen. Examples of such dominant selection use the drugs neomycin, mycophenolic acid and hygromycin.

Another example of suitable selectable markers for mammalian cells are those that enable the identification of cells competent to take up the antibody nucleic acid, such as DHFR, thymidine kinase, metallothionein-1 and -II, preferably primate metallothionein genes, adenosine deaminase, ornithine decarboxylase, etc.

For example, cells transformed with the DHFR selection gene are first identified by culturing all of the transformants in a culture medium that contains methotrexate (Mtx), a competitive antagonist of DHFR. An appropriate host cell when wild-type DHFR is employed is the Chinese hamster ovary (CHO) cell line deficient in DHFR activity (e.g., ATCC CRL-9096).

Alternatively, host cells (particularly wild-type hosts that contain endogenous DHFR) transformed or co-transformed with DNA sequences encoding a polypeptide chain of the present disclosure, wild-type DHFR protein, and another selectable marker such as aminoglycoside 3'-phosphotransferase (APH) can be selected by cell growth in medium containing a selection agent for the selectable marker such as an aminoglycosidic antibiotic, e.g., kanamycin, neomycin, or G418. See, for example, U.S. Pat. No. 4,965,199.

Expression vectors used in eukaryotic host cells will typically also contain sequences necessary for the termination of transcription and for stabilizing the mRNA. Such sequences are commonly available from the 5' and, occasionally 3', untranslated regions of eukaryotic or viral DNAs or cDNAs. These regions contain nucleotide segments transcribed as polyadenylated fragments in the untranslated portion of the mRNA encoding an antibody. One useful transcription termination component is the bovine growth hormone polyadenylation region. See WO94/1 1026 and the expression vector disclosed therein.

Host cells are transformed with the above-described expression or cloning vectors for desired polypeptide(s) (such as, for example, a multimeric polypeptide) production and cultured in conventional nutrient media modified as appropriate for inducing promoters, selecting transformants, or amplifying the genes encoding the desired sequences.

IV. Kits and Articles of Manufacture

Further provided herein are kits or articles of manufacture useful, e.g., for expression of a multimeric polypeptide.

In some embodiments, the kits comprise a set of the polynucleotides encoding each of the polypeptide chains and/or subunits of a multimeric polypeptide. For example, in some embodiments, the kits comprise a first polynucleotide comprising a first translation initiation sequence operably linked to a first open-reading frame that encodes the first polypeptide chain of a multimeric polypeptide of the present disclosure, a second polynucleotide comprising a second translation initiation sequence operably linked to a second open-reading frame that encodes the second polypeptide chain of a multimeric polypeptide of the present disclosure, a third polynucleotide comprising a third translation initiation sequence operably linked to a third open-reading frame that encodes the third polypeptide chain of a multimeric polypeptide of the present disclosure, and a fourth polynucleotide comprising a fourth translation initiation sequence operably linked to a fourth open-reading frame that encodes the fourth polypeptide chain of a multimeric polypeptide of the present disclosure. In some embodiments, one or more of the first, second, third, and fourth translation initiation sequences is not operably linked with its respective open-reading frame as the respective open-reading frame exists in a naturally occurring host cell genome.

In some embodiments, each of the polynucleotides in a kit of the present disclosure is part of one or more expression vectors of the present disclosure.

In some embodiments, each of the polynucleotides in a kit of the present disclosure is operably linked to a promoter of the present disclosure. For example, in some embodiments, each of the polynucleotides is operably linked to a distinct promoter. In some embodiments, two or more of the polynucleotides are operably linked to the same promoter. For example, if the multimeric polypeptide is a bispecific antibody, the polynucleotides encoding the open-reading frames of the heavy and light chains for each half antibody can be operably linked to the same promoter. In some embodiments, the "same promoter" refers to the same physical polynucleotide. In some embodiments, the "same promoter" refers to physically distinct polynucleotides sharing the same promoter sequence.

In some embodiments, the kit or article of manufacture further comprises instructions for using the set of the polynucleotides to produce a subunit or multimeric polypeptide of the present disclosure, e.g., according to any of the methods described in section II supra or using any of the host cells described in section III supra.

EXAMPLES

The present disclosure will be more fully understood by reference to the following examples. The examples should not, however, be construed as limiting the scope of the present disclosure. It is understood that the examples and embodiments described herein are for illustrative purposes only and that various modifications or changes in light thereof will be suggested to persons skilled in the art and are to be included within the spirit and purview of this application and scope of the appended claims.

Example 1: Tuning Protein Production with Kozak Sequence Variants in Transient Transfection in Mammalian Cells Currently, there are a few systematic approaches to precisely control the translation levels of recombinant proteins in mammalian cells. The region at which translation initiates the synthesis of a polypeptide is called the translation initiation site (TIS). The translation initiation site (TIS) consists of the start codon and its adjacent bases. In eukaryotes, translation initiation typically follows the scanning mechanism model (Kozak M. *Cell.* 1978; 15(4):1109-23) that postulates the ribosomal preinitiation complex, consisting of the small 40S ribosomal subunit, Met-tRNA, eIF2-GTP, eIF1, eIF1A, eIF3, and eIF5, binds at the 5' end of mRNA and advances linearly to the 3' direction in search of a start codon. After positioning of the small 40S ribosomal subunit in the start codon, initiation factors dissociate, the large subunit is bound to the small 40S ribosomal subunit forming the ribosomal complex, and the translation starts (Nanda J S, Saini A K, Munoz A M, Hinnebusch A G, Lorsch J R. *J Biol Chem.* 2013; 288(8):5316-29; Pestova T V, Kolupaeva V G. *Genes Dev.* 2002; 16(22):2906-22). Initiation is not always restricted to the start codon (AUG) nearest the 5' end. If the first AUG codon occurs in an optimal context, the ribosomal complex initiates translation, but if the translation initiation site (TIS) around the first AUG triplet is suboptimal, some 40S subunits bypass that site and initiate farther downstream. Therefore, cells can control protein translation levels by tuning the TIS, so that the sequence around the start codon plays a major role in the initiation and subsequent enhancement of translation efficiency (Kozak M. *J Biol Chem.* 1991; 266(30):19867-70; Kozak M. *J Cell Biol.* 1991; 115(4):887-903; Sonenberg N, Hinnebusch A G. *Cell.* 2009; 136(4):731-45; Ivanov I P, Loughran G, Sachs M S, Atkins J F. *Proc Natl Acad Sci USA.* 2010; 107(42):18056-60).

Kozak has reported CCRCCAUGG (purine, R=A or G; start codon underlined) to be a highly efficient mammalian TIS (Kozak M. *Nucleic Acids Res.* 1981; 9(20):5233-52). Within that sequence, the purine in position −3 (3 nucleotides upstream of the AUG codon) is most highly conserved in vertebrate messenger RNA (Kozak M. *Nucleic Acids Res.* 1987; 15(20):8125-48). Point mutational studies provide evidence of the importance of A or G in position −3, and G in position +4 (immediately following the AUG codon) as crucial for optimum translation efficiency (Kozak M. *EMBO J.* 1997; 16(9):2482-92). The Kozak consensus sequence differs in length and nucleotide composition between species but is conserved for most genes within the species. Not surprisingly, point mutations in the Kozak sequence affect translation initiation both in higher (Kozak M. *Cell.* 1986; 44(2):283-92) and lower (Dvir S, Velten L, Sharon E, Zeevi D, Carey L B, Weinberger A, et al. *Proc Natl Acad Sci USA.* 2013; 110(30):E2792-801) eukaryotes and have been associated with the development of human diseases, including cancer and metabolic disorders (Sonenberg N, Hinnebusch A G. *Cell.* 2009; 136(4):731-45; Mohan R A, van Engelen K, Stefanovic S, Barnett P, Ilgun A, Baars M J, et al. *Am J Med Genet A.* 2014; 164A(11):2732-8).

To investigate whether variants of the Kozak sequence could tune the protein production in industrialized producer cell lines, the −3 position and a combination of the −3, −2, and −1 positions upstream of the start codon of an ORF encoding for an Fc-fusion protein were varied.

Methods

Cell Line and Cell Culture

A CHO cell line was used for transient transfection assays in plates and for constitutively antibody-producing cell lines via target integration. CHO cells were cultured in a DMEM/F12-based medium in 125 mL shake flask vessels shaking at 150 rpm, 37° C. and 5% $CO_2$. Cells were passaged at a seeding density of $3 \times 10^5$ cells/ml every 3-4 days.

Transient Transfection

CHO cells were transfected with transient transfection plasmids using lipofectamine 2000 CD according to the manufacturer's recommendation (Invitrogen, Carlsbad, CA). As internal controls, DNA of a well-expressing antibody and a poorly expressing antibody were also carried. Briefly, DNA vector (2 µg) plus 10 µl of lipofectamine in 500 µl of media were incubated for 30 min at room temperature to promote complex formation. The transfection complex was transferred to a 96-well plate (FalconR) containing exponentially growing CHO cells in a DMEM/F12-based medium plus 5% DFBS for a total working volume of approximately 2.5 ml. Transfected cells were cultured at 37° C., 5% $CO_2$, and 80% of humidity. 24h post transfection, the cell culture medium was exchanged for production medium and then cells were cultivated at 33° C. Each transfection was performed in biological duplicates. For antibody concentration determination, supernatant samples were collected from cultures at 48h post-transfection and assayed in replicate by HTRF (Homogeneous Time-Resolved FRET) assay.

Homogenous Time-Resolved FRET (HTRF) Assay

For HTRF assay, see Degorce, F., et al. (2009). *Curr Chem Genomics* 3: 22-32.

Design and Construction of Kozak Sequence Variants

Based on the nucleotide frequencies around the translation start site in vertebrates determined by Kozak (*Kozak M. Nucleic Acids Res.* 1987; 15(20):8125-48), variants with the lower and intermediate frequencies for these positions were designed as shown in FIG. 1. DNA of the Kozak sequence variants of the Fc-fusion protein A or B was synthesized by Genewiz, Inc. Variants were cloned in a transient transfection vector property of Genentech under the transcriptional control of the CMV promoter and with the ampicillin resistance marker. Verification of the sequence was done using universal forward and reverse primers.

DNA Library Design

The Fc-fusion protein B was used as the backbone for the synthetic DNA library of the Kozak sequence. Positions to diversify were −5, −4, −3, −2, −1 and +4 of the start codon to any of the four nucleotides. The library was synthesized by Genewiz, Inc. The library was cloned in a transient transfection vector under the transcriptional control of the CMV promoter and with the ampicillin resistance marker. The library was transfected into Max Efficiency® DH5a competent cells (Invitrogen, Carlsbad, CA) and several dilutions to optimize the selection of individual colonies were done. DNA preps of individual colonies were done according to the manufacturer's recommendation (QIAGEN, Hilden, Germany). Sequencing was performed using universal forward and reverse primers.

Stable Vector Construction

Two integrated antibody expression vectors were used to develop the bispecific stable cell line. The expression vectors contain two separate cytomegalovirus (CMV) promoters to direct the transcription of both the heavy chain (HC) and light chain (LC) as two separate units. The *Streptomyces alboniger* puromycin-N-acetyltransferase (PUR)(Vara J A, Portela A, Ortin J, Jimenez A. *Nucleic Acids Res.* 1986; 14(11):4617-24) gene was used as the selection marker in one plasmid. A gene encoding a fusion protein containing the positive-negative selection marker HyTK that confers resistance to hygromycin (Hyg R) was used as the selectable marker in the other plasmid. Generation of the 25 expression vectors per arm was done by cloning a combination of five heavy chains by five light chains under different Kozak sequence variants to generate the Kozak mix pools. Two expression plasmids, one for each antibody with the heavy and light chains under Wt Kozak sequence, were used to develop the Wt Kozak pools.

Stable Cell Line Development

CHO cells were transfected using the MaxCyte STX Transfection System according to the manufacturer's recommendation (MaxCyte, Gaithersburg, MD). Transfected cells were pooled into two separate pools and selected with selective medium containing Puromycin 5 μg/ml and FIAU 0.5 μM. After recovery, one pool was subjected to single cell cloning (SCC) by limiting dilution at 1 cell/well into 384-well clear, flat-bottom, tissue culture treated plates (Corning Inc, Corning, NY) using the Wellmate Microplate dispenser (Thermo Matrix) with an Integra Viafill sterile 8 channel tubing of 0.5 mm pore size (IntegrA). Plates were incubated at 37° C. and 5% $CO_2$. Three to four weeks after seeding, 704 individual colonies were picked into 96-well plates (Corning Inc, Corning, NY) and after about 2 days were evaluated for antibody production using Homogeneous Time-Resolved FRET (HTRF). The top 48, and subsequently the top 24, antibody-expressing clones were assayed via HTRF. The top 11 single cell clones were adapted to suspension growth and evaluated in a production assay. An additional seven clones that showed medium and low HCCF titers compared with the top clones were also selected for further analysis.

Shake Flask Fed-Batch Production Assay

Fed-batch production cultures were performed in shake flasks (Corning Inc, Corning, NY) with chemically-defined basal medium along with bolus feeds on days 7 and 10. Cells were seeded at $1.0 \times 10^6$ cells/ml. A temperature shift from 37° C. to 35° C. was carried out on day 3. Day 14 titers were determined using protein A affinity chromatography with UV detection. Percent viability and viable cell count was determined on days 0, 3, 7, 10 and 14 using the Vi-Cell XR instrument (Beckman Coulter). Glucose and lactate concentrations were monitored on days 7 and 14 using a Bioprofile 400 Analyzer (Nova Biomedical).

Antibody Surface Staining Protocol

For antibody surface staining, about 2 million cells were pelleted and washed twice with PBS buffer. Cells were then re-suspended in 0.5 mL of PBS containing anti-human IgG (H+L) Allophycocyanin (APC)-conjugated secondary antibody (Jackson Immunoresearch, West Grove, PA) at a 1:100 dilution and incubated for 20 min at 37° C. with shaking. The unstained control sample was re-suspended in PBS without antibody. Empty host was also stained to set up the gates. After 20 min of incubation with the staining antibody, cells were washed once with PBS and re-suspended in 400 μl of PBS. Then, cells were analyzed in a FACscan flow cytometer (Attune NxT Flow Cytometer, Life Technologies). For each analysis, 20000 events were recorded.

Product Quality Analysis

Standard product quality analyses were conducted by subjecting the total protein A-purified antibody to non-reducing capillary electrophoresis sodium dodecyl sulfate (CE-SDS). A TECAN Evo200 system was used to automate the sample preparation. All samples were diluted to 1mg/ml to ensure consistent liquid handling and maintain optimal dye-to-protein ratios. Prepared samples were immediately analyzed by the labChip GXII system and the data processed using the Chromeleon software. Signal intensity, peak profiles and relative peak area distributions were assessed.

Mass Spectrophotometry

To identify and quantify protein product-related variants, qualitative analysis and mass determination was performed on an Agilent 6230 Time-of-Flight mass spectrometer using HPLC-Chip separation and ion source. Data deconvolution was performed using MassHunter software. We determined ion abundances for the bispecific as well as for species with incorrect LC and HC stoichiometry.

Genomic DNA Extraction, PCR Amplification and Sequencing Analysis

Genomic DNA extraction was performed using the DNeasy Blood & Tissue Kit (QIAGEN, Hilden, Germany) following manufacturer's manual. Genomic DNA was quantified with a SimpliNano Microvolume Spectrophotometer (GE Lifesciences). PCR amplifications were performed using Q5® Hot Start High-Fidelity 2x Master Mix (New England Biolabs). 1 μg of gDNA was used as a template. PCR conditions were optimized. An annealing temperature of 64° C. and 30 cycles were used. Specific annealing primers in the variable region of each chain were designed to distinguish the same chain between molecules. The following forward (F) and reverse (R) primers were used to amplify the Ab1 heavy chain, Ab1 light chain, Ab2 heavy chain and Ab2 light chain: HC-Ab1: F-5'-GA-TACCAGCACCAGCACCGCCT-3' (SEQ ID NO:12) and R-5'-ATGGGCGGTAGGCGTGTACGG-3' (SEQ ID NO:13); LC-Ab1: F-5'-CTGAACAGCCGCACCCGCAA-3' (SEQ ID NO:14) and R-5'-ATGGGCGGTAGGCGTGTACGG-3' (SEQ ID NO:15); HC-Ab2: 5'-GTGATTTGGCGCGGCGGCA-3' (SEQ ID NO:16) and R-5'-ATGGGCGGTAGGCGTGTACGG-3' (SEQ ID NO:17); and LC-Ab2: 5'-GTGCGCAACCTGGTGGTGTGG-3' (SEQ ID NO:18) and R-5'-ATGGGCGGTAGGCGTGTACGG-3' (SEQ ID NO:19). PCR products were cleaned with a PCR purification Kit (QIAGEN) following manufacturer's instructions and the correct size was analyzed by 12-well 2% premade agarose gels (Thermo Fisher Scientific). Sequencing was performed using the following primers: SEQ1: 5'-AACGGTGCATTGGAACGCGG-3' (SEQ ID NO:20) and SEQ2: 5'-TGGCTTCGTTAGAACGCAGC-3' (SEQ ID NO:21). The Kozak sequence variant for each chain in each clone was confirmed at least twice. Sequencing revealed Kozak mix clones lacking one of the chains. These were Kozak mix clones 3, 11, 29, 60 and 21L for Ab2-LC, Ab2-HC, Ab1-LC, Ab2-HC and Ab1-LC, respectively. Kozak mix clone 24 does not have the 1-IC and LC of Ab1 (FIGS. 23A-23C), Results To investigate whether changes in the consensus Kozak sequence could tune protein production in industrialized producer cell lines, the position −3 and a combination of the −3, −2, and −1 positions upstream of the start codon of an ORF encoding for an Fc-fusion protein 'A' were varied (FIG. 1). The Kozak sequence variants were tested by transient transfection in a CHO production cell line and the Fc-fusion protein production was evaluated at 48 hours post transfection by HTRF (homogeneous time resolved fluorescence) assay. A well-expressing antibody and a poorly expressing antibody were also included as internal assay controls.

As shown in FIG. 2, changes in the consensus Kozak sequence modulated the Fc-fusion protein A titer. The results confirmed that the presence of purines at the −3 position (GCCATGG and ACCATGG, SEQ ID NOs:4 and 3, respectively) produced high levels of Fc-fusion protein A titer. The weakest Kozak sequence variant evaluated, TTTATGG (SEQ ID NO:7), modulated the titer at a level half that of the Kozak consensus, hereafter referred to as Wild type (Wt) Kozak.

To determine if Kozak sequence variants were capable of modulating protein production regardless of the molecule, these combinations in a different Fc-fusion protein were tested: Fc-fusion 'B' (FIG. 2). Similar to cells transfected with Kozak sequence variants for Fc-fusion A, cells transfected with variants of the Kozak sequence for Fc-fusion B showed a change in titer compared with Wt Kozak and a similar pattern was observed for variants of Fc-fusion B. These results suggested that variations in the Wt Kozak sequence can be used to adjust antibody titer.

Figure 3:
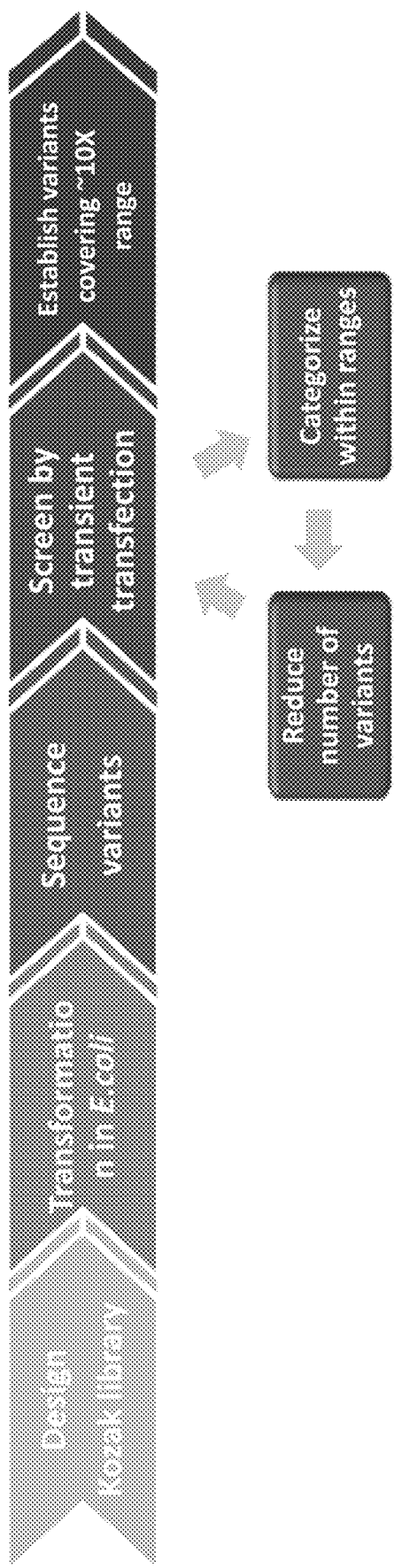
FIG. 3 illustrates the processes for the design of a Kozak library, transformation of E. coli cells with the library, sequencing to determine the nucleotide sequence of variants, screening of variants by transient transfection, categorizing within ranges and narrowing down variants, and finally the selection of the variants that cover the entire range of expression.

Example 2: Designing and Screening a Library of Kozak Sequences to Expand the Range of Expression Levels Additional Kozak sequence variants were tested to achieve a comprehensive range of expression levels from 0.1× to 1.0×-fold of the Wt Kozak. As shown in the detailed workflow provided in FIG. 3, a variant library of the Kozak sequence using the ORF encoding the Fc-fusion protein B, a representative of a well-behaved molecule, was designed and screened. The library encompassed the randomization of the five bases upstream (positions −5, −4, −3, −2, and −1) and one base downstream (position +4) of the start codon to any of the four nucleotides (FIG. 4). The expected diversity of this construction is around 4100 variants of the Kozak sequence. The randomization of the position +4 created an amino acid change from Glycine present in the $2^{nd}$ position of the signal sequence to Arginine when this position was occupied by an adenine (A) or cytosine (C). The library was transformed into competent E. coli cells and sequencing of individuals variants was done to exclude those that showed non-designed mutations, deletions, as well as variants that contained stop codons as the second amino acid of the signal sequence, which happened when the position +4 was occupied by thymine (T).

Results

Figure 5:
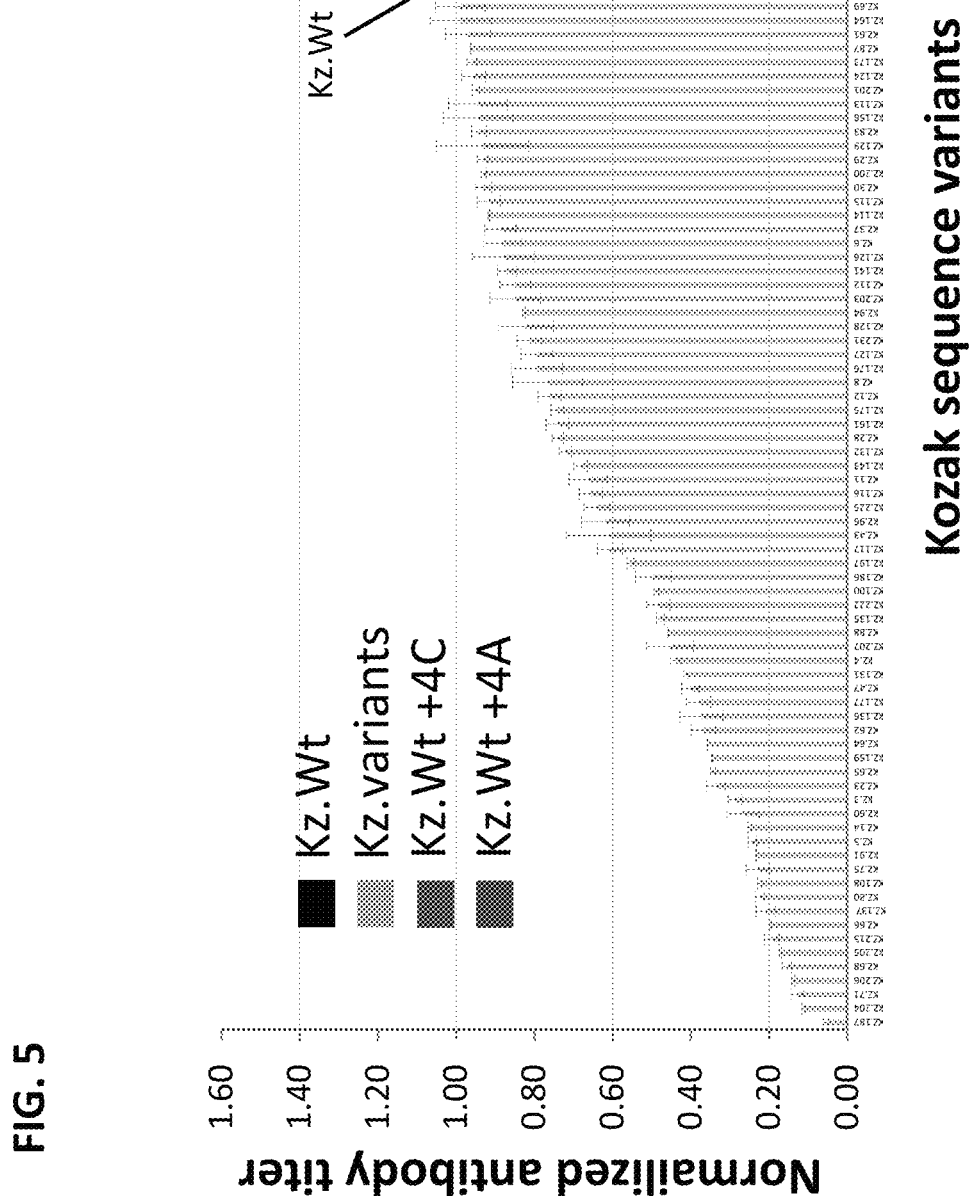
FIG. 5 shows the normalized antibody titer of 111 Kozak sequence variants that were transiently transfected into CHO cells. Data are presented as mean values and error bars represent the standard deviation (SD) of two independent transfections. A nearly continuous range of translation from 0.05 to 1.54 units of normalized titer was observed (1.0 corresponds with titer produced using the Wt Kozak sequence).

An initial screen by transient transfection in CHO cells was performed with 111 correct variants, which included Wt Kozak and Wt Kozak with a C or A at the position +4 as controls for changes of the second amino acid of the signal sequence. As shown in FIG. 5, the Fc-fusion protein titer measured at 48 hours post transient transfection by HTRF assay showed a broad range of expression levels. A nearly continuous range of translation from 0.05 to 1.54 units of normalized titer, where 1.0 corresponds with the Wt Kozak, was observed. These variants satisfied the goal for desired expression range such that further variant screening was halted. In general, regardless of the Kozak sequence upstream of the start codon, the presence of A or C in the position +4 increased the titer over Wt Kozak. The screening was repeated and data of two independent transient transfections was represented (FIG. 5).

Figure 6:
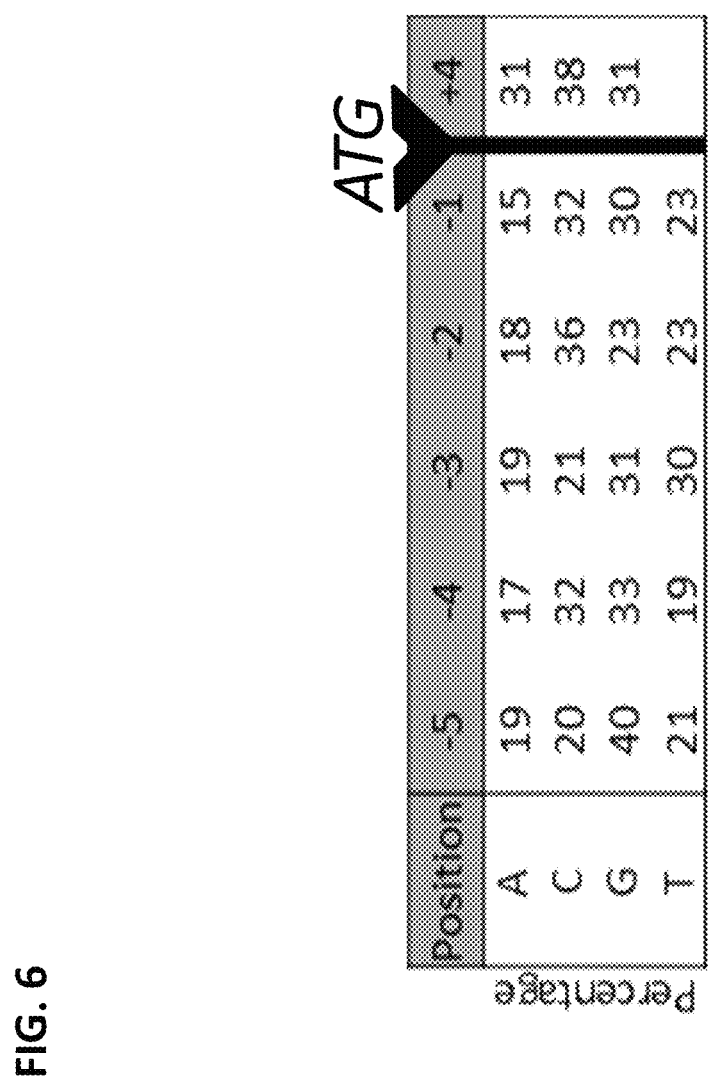
FIG. 6 provides the nucleotide distribution of 108 colonies of the Kozak library. The percentage of each nucleotide for each position is shown. The nucleotide distribution for the variants analyzed was random and diverse per position, which showed that the library screening was not skewed.
Figures 8A, 8B:
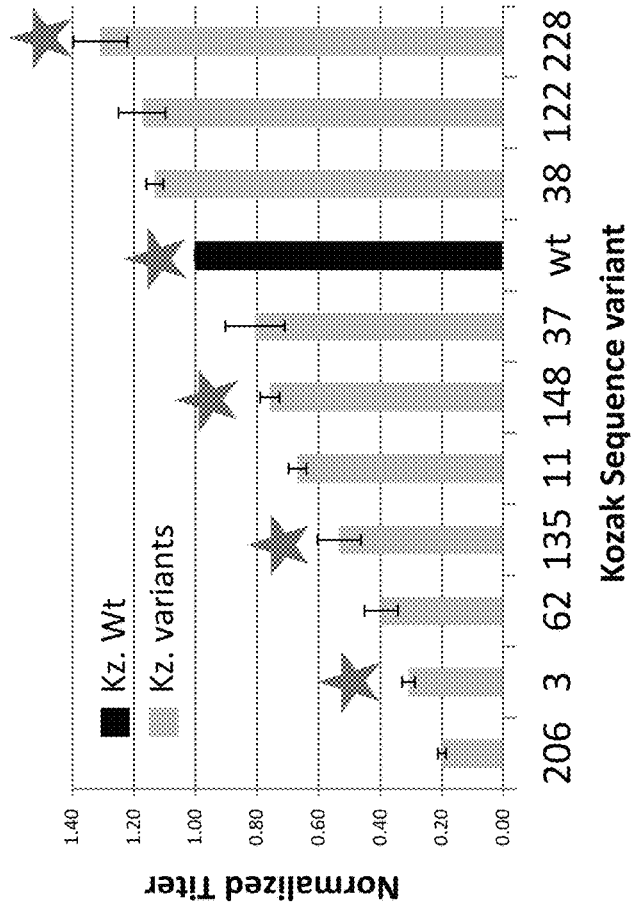
FIGS. 8A & 8B provide the normalized titer and sequences of the final panel of Kozak sequence variants.

As shown in FIG. 6, nucleotide distribution for the variants analyzed was random and showed that the library screening was not skewed. Next, the variants were categorized into five groups based on their titer and performance. The group ranges were: group I, 0.05-0.3; group II, 0.31-0.6; group III, 0.61-0.8; group IV, 0.81-1.00; and group V, 1.01-1.34. Except for the preference of adenine and thymine in most of the positions for the weakest group, and arginine as second amino acid of the signal sequence for the strongest group, other correlations between antibody production and Kozak sequence variant were not detected. Several rounds of transient transfections were done to decrease the number of variants (FIG. 7). The criteria to select variants round to round were reproducibility between transient transfections, stability between different DNA preparations, and preservation of the nucleotide diversity. As shown in FIGS. 8A-8B, this screen established 11 Kozak sequence variants, representing expression ranges from 0.2 to 1.3-fold of Wt Kozak, enabling modulation of titer with high precision.

Figure 9:
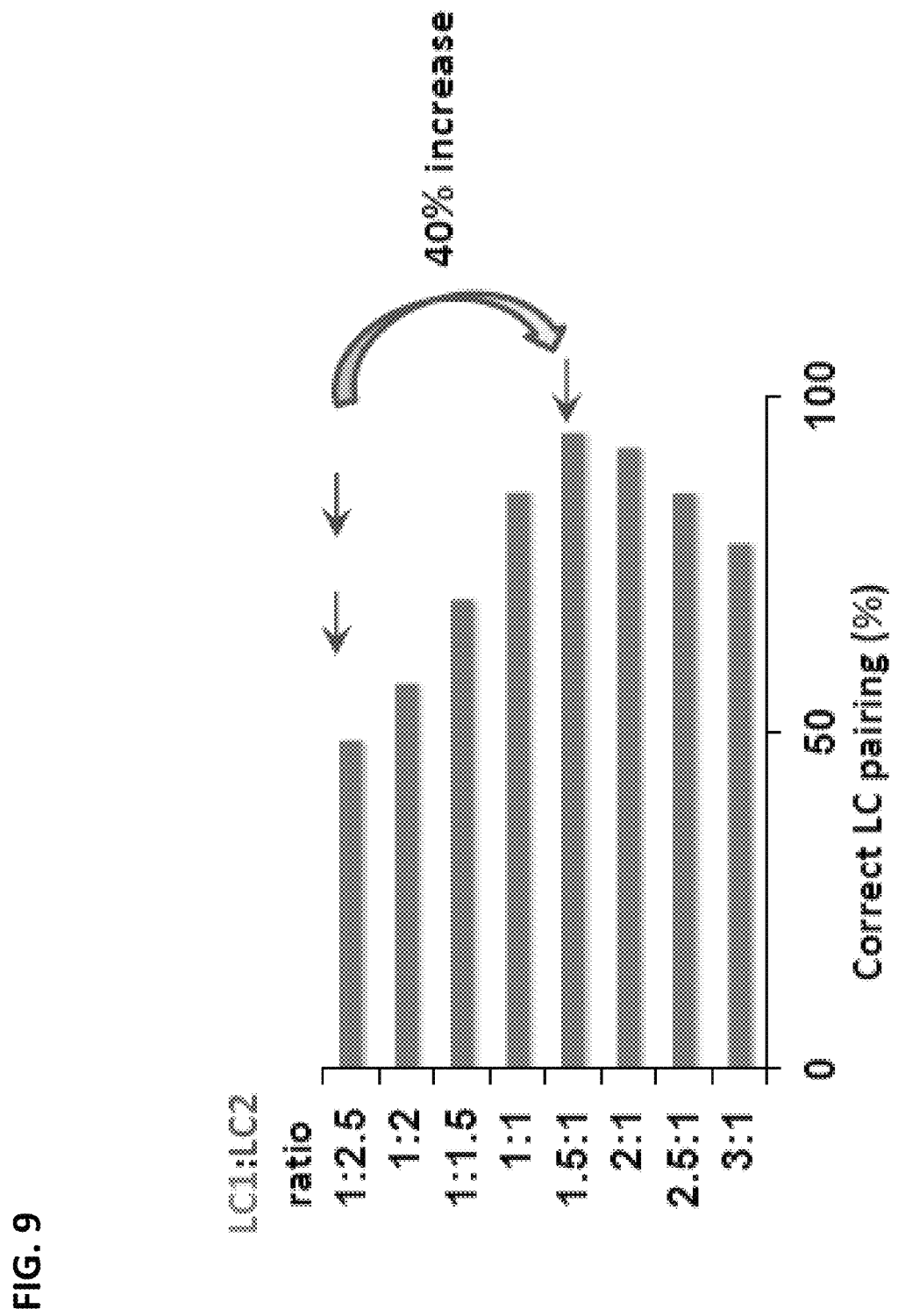
FIG. 9 shows that a higher percent of correctly assembled BsAb can be obtained by manipulating the ratios of the light chains (LC1:LC2). For example, a modification of the LC1:LC2 ratio from 1:2.5 to 1.5:1 leads to a 40% increase in correctly-paired light chains.

Example 3: Generation of Bispecific Stable Clones Under a Mix of Kozak Sequence Variants Although advances have been made in the engineering of complex antibody formats such as bispecific antibodies, the manufacturability of these in a single mammalian expression system often exhibits low performance. A low titer and insufficient product quality are two of the factors that contribute to making stable production of bispecific antibody (BsAb) difficult. As a consequence, there is an urgent need to identify the limiting steps in the production system. One bottleneck limiting the efficiency of assembly of bispecific and other multi-chain formats in a single cell is the limited control over individual chain levels. Designing vectors that can tailor the ratio of the individual chains in a multi-chain format could improve assembly efficiency as previously demonstrated in *E. coli* with the translational initiation region (TIR) variants (Simmons L C, Yansura D G. *Nat Biotechnol.* 1996; 14(5):629-34). For example, as shown in FIG. 9, the ratio of light chains (LC1:LC2) that constitute a BsAb can be manipulated to achieve a higher percent of correctly assembled BsAb.

Since identification of a unique parental antibody ratio to merge into a bispecific format is needed to generate bispecific antibodies, the capability of Kozak sequence variants to yield higher assembly and production of BsAb in a single cell was tested. The successful application of Kozak sequence variants as a technology to modulate protein expression was evaluated in the establishment of a stable CHO host cell line. In order to do that, a representative panel of five variants, including Wt Kozak, was selected (FIG. 10 and FIG. 8A). The relative protein production strengths of these variants were about 0.3x-fold, about 0.5x-fold, about 0.8x-fold, about 1.0x-fold and about 1.3x-fold of the Wt Kozak sequence for Kozak sequence variants #3, #135, #148, Wt and #228, respectively. Thus, the panel of variants covered the broad range of expression levels observed in transient transfections (FIG. 10).

The bispecific antibody Ab1/Ab2 was selected as a model to evaluate the effect of Kozak sequence variation on tuning chain ratios on the basis of the following criteria. First, a well-characterized process development platform was available for Ab1/Ab2 that facilitates the analysis and characterization of the product. Second, Ab1 is a poorly expressing molecule with a bottleneck downstream of the transcription process, while Ab2 represents an example of a well-behaved molecule. Thus, this is an appropriate scenario to examine the capability of Kozak sequence variants to create successful chain pairings.

In order to preferentially promote heavy chain heterodimerization, the heavy chain (HC) of both Ab2 and Ab1 carried knob and hole mutations, respectively. Point mutations were used to mitigate light chain (LC) mispairings (Dillon M, Yin Y, Zhou J, McCarty L, Ellerman D, Slaga D, et al. *MAbs.* 2017; 9(2):213-30). A combination of heavy and light chains under the previously described panel of five Kozak sequence variants was used to develop 25 integrated expression vectors per arm (FIG. 11). A mix of the 50 plasmids was transfected into CHO cells (hereafter referred to as Kozak mix). The diversity generated with this approach reached up to a potential 625 different chain ratio combinations. As reference value, the four chains of the BsAb were cloned under the Wt Kozak sequence, transfected into CHO cells, and carried in parallel (hereafter referred to as Wt Kozak). Two different transfections were performed for each condition.

Results

Figure 12:
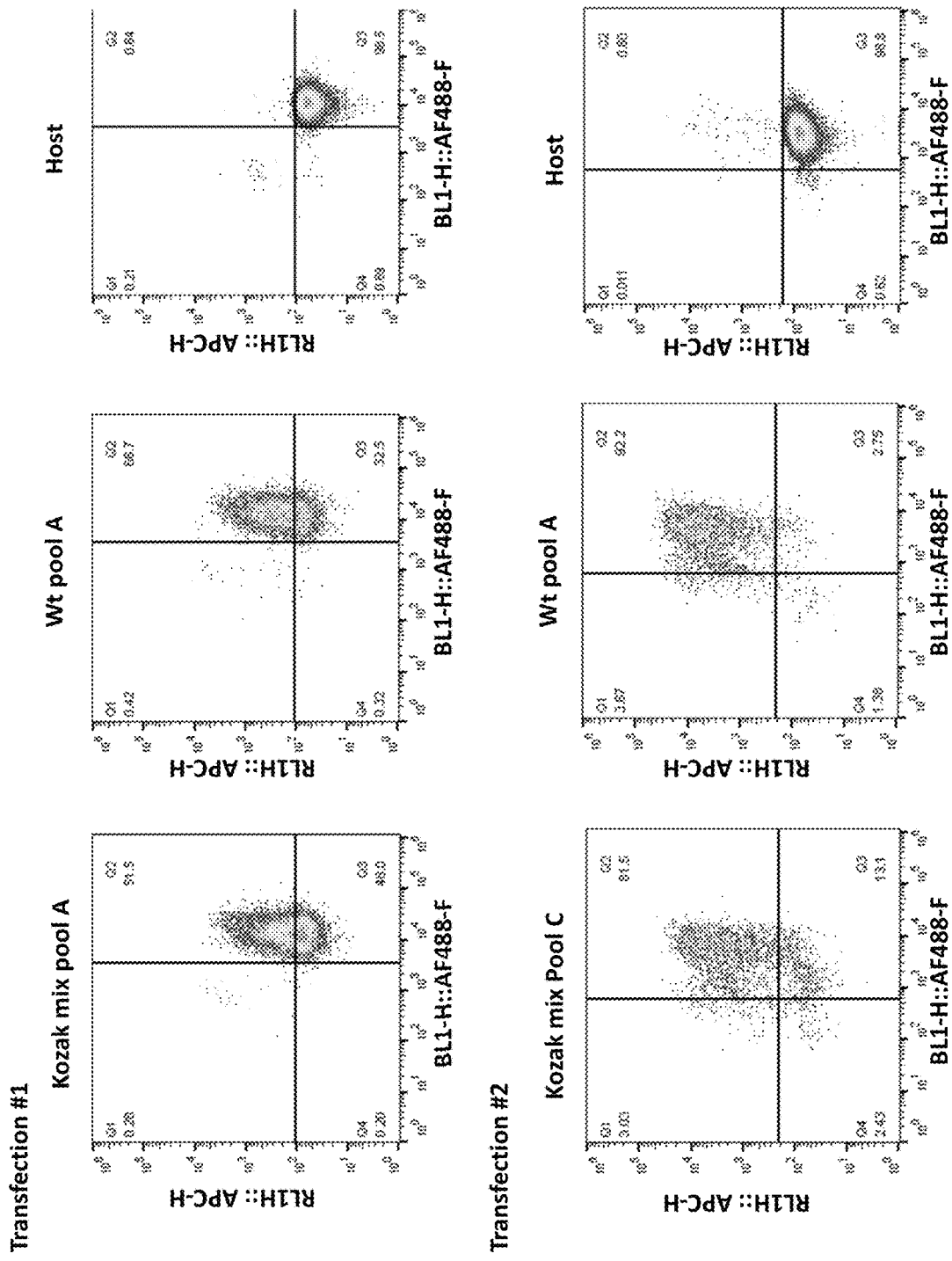
FIG. 12 shows the transfection efficiency of the indicated Kozak mix pools and transfection number. The transfection efficiency was monitored by performing cell surface staining analysis with allophycocyanin-(APC) labeled anti-hu IgG antibody and measuring of antibody-APC expression by flow cytometry. An empty host was used to set up the gates for Ab expression negative and GFP positive cells. The X-axis shows the GFP expression and the Y-axis shows the APC-antibody expression. Similar transfection efficiency was observed for both Kozak mix and Wt Kozak pools.
Figure 13A:
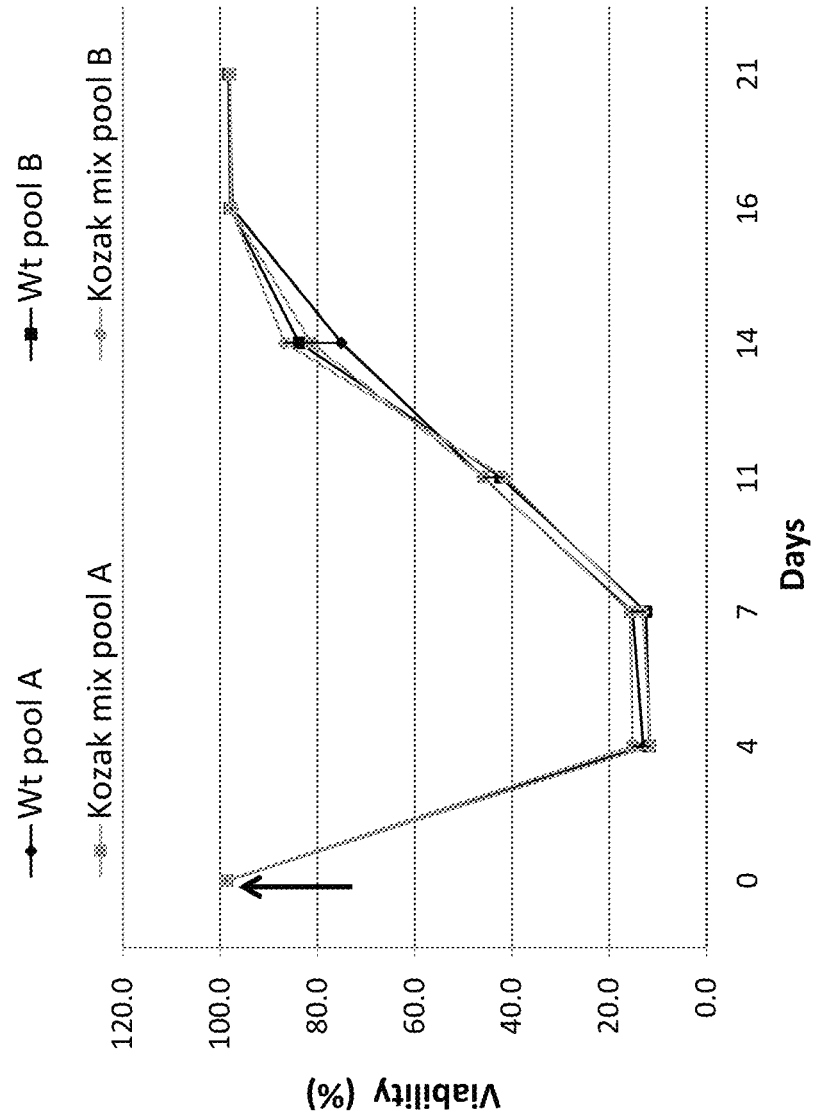
FIGS. 13A & 13B show the stable pool recovery time course. Two pools per condition are shown. The addition of selection drugs to establish the stable pools is indicated with an arrow. The Y-axis shows the percentage of viability and the X-axis shows the days after addition of selection drugs.
Figure 13B:
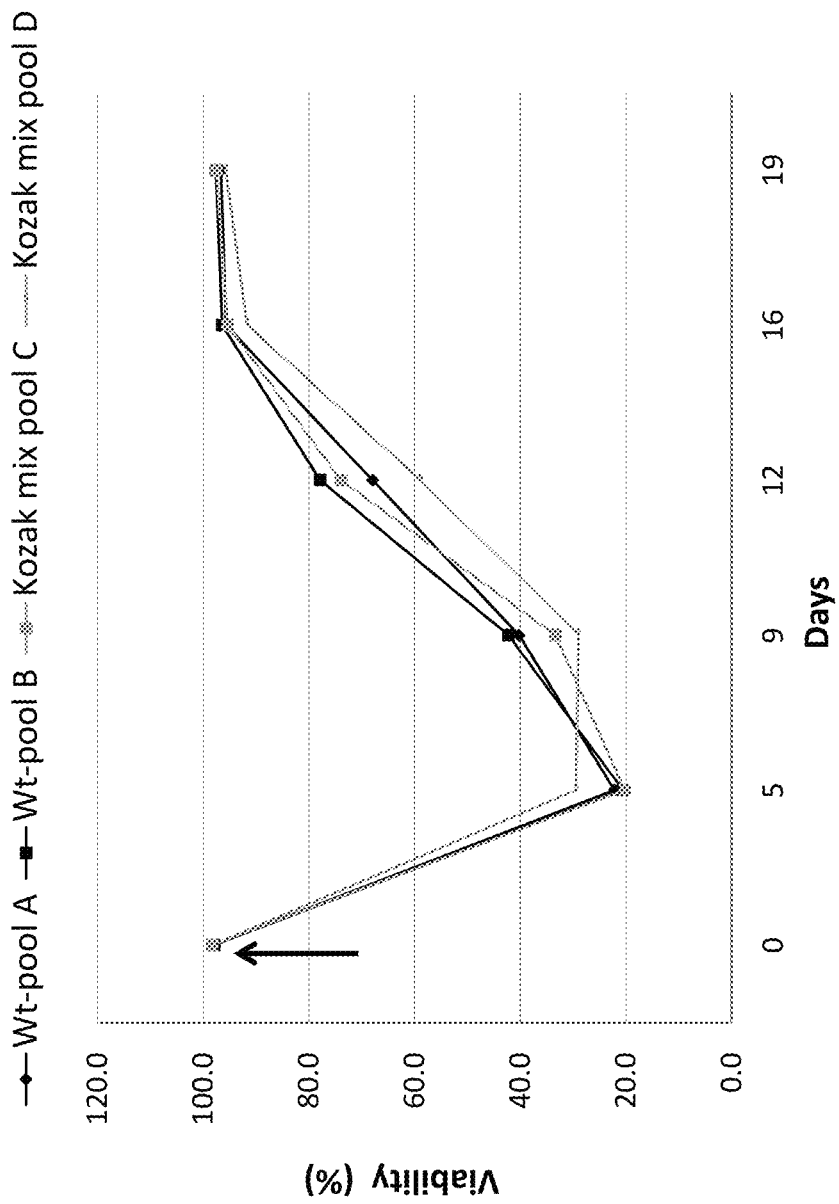
Figure 14A:
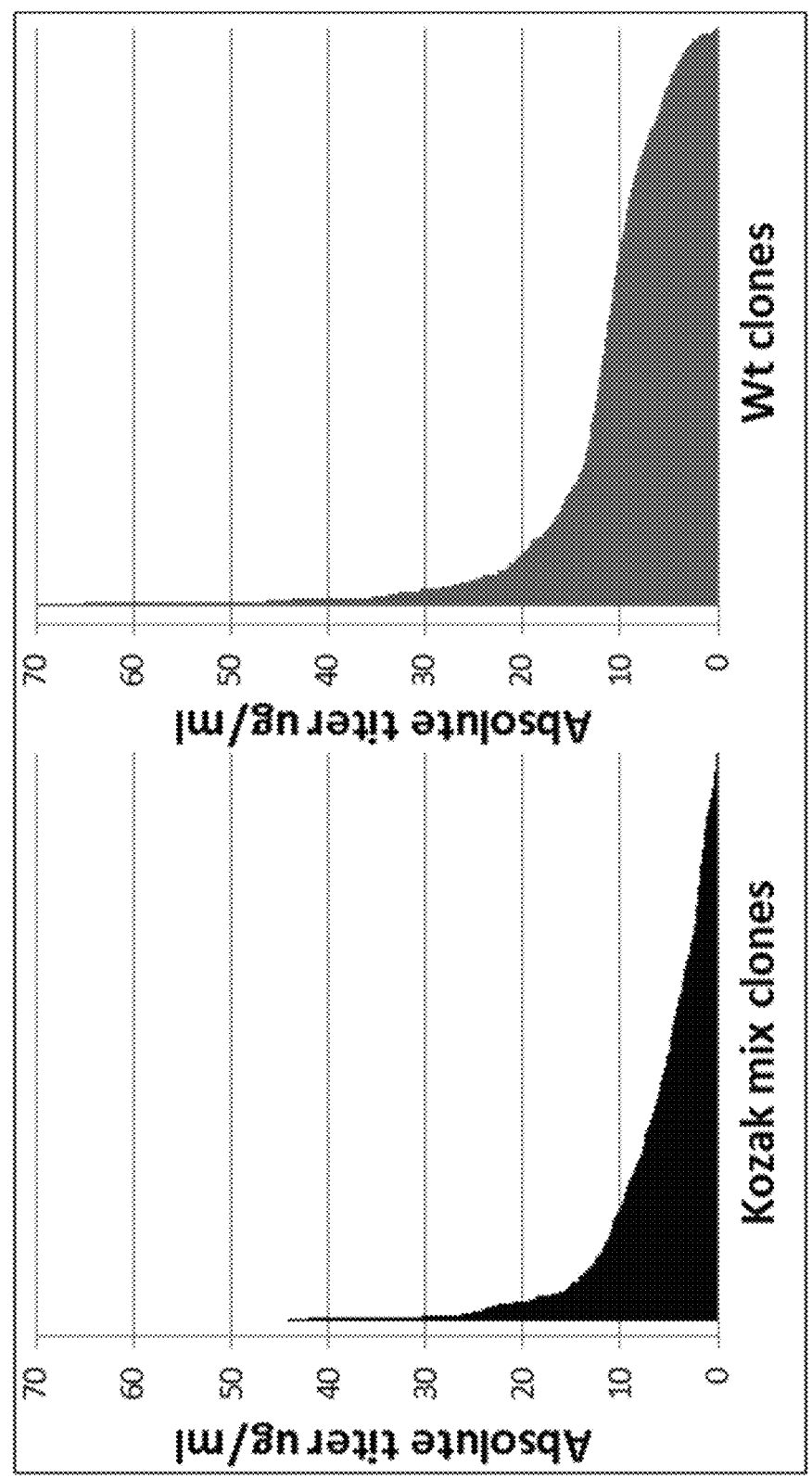
FIGS. 14A & 14B provide the absolute titer for 704 individual clones of Kozak mix clones or Wt Kozak clones that were selected from each transfection and condition, and subjected to single cell cloning. The titer was measured by HTRF. Presented in pairs based on transfection number as indicated.
Figure 14B:
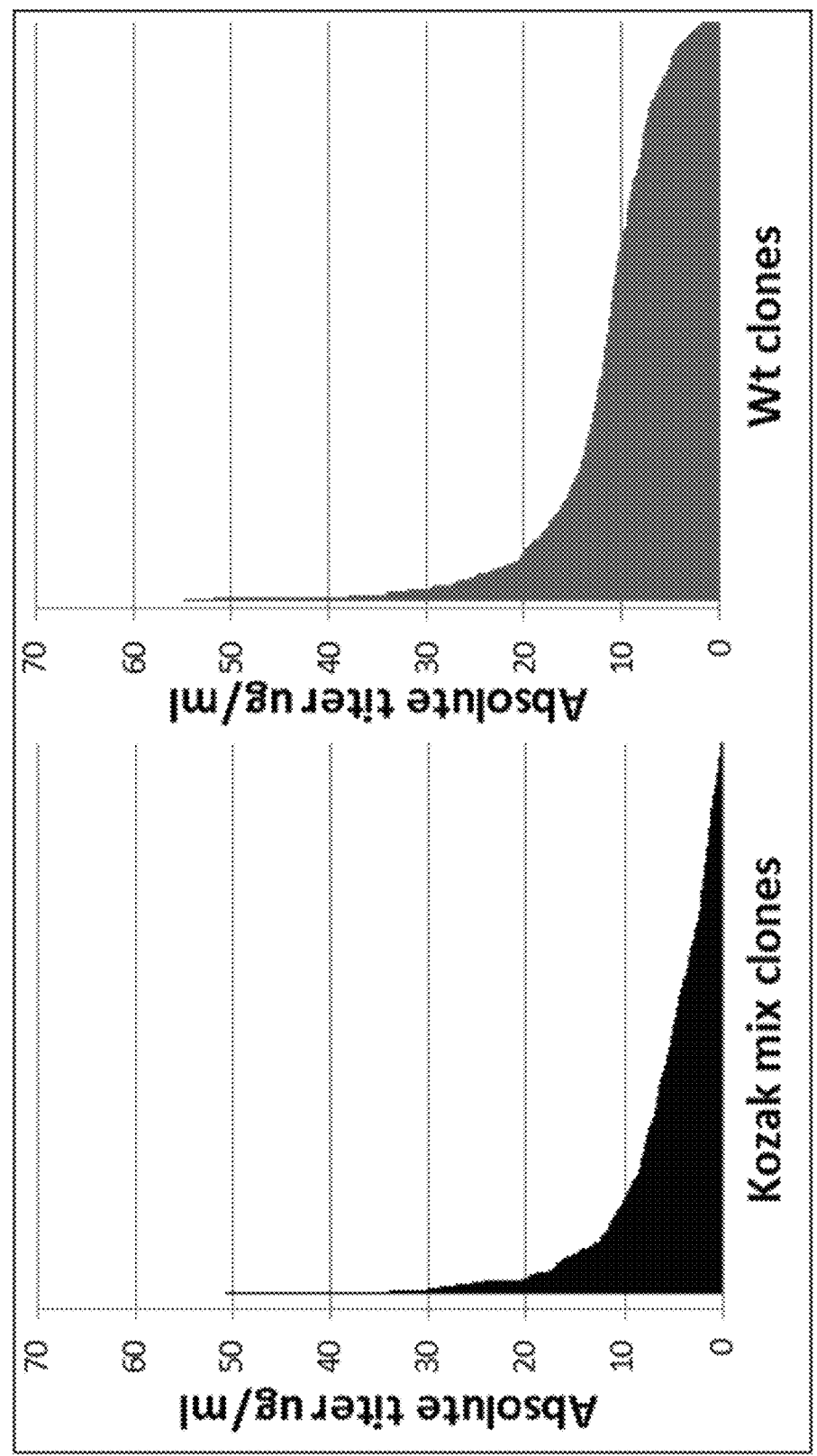

Transfection efficiency was monitored by cell surface staining for total IgG and measured by FACS analysis. FIG. 12 shows that similar transfection efficiency was observed for both the Kozak mix and Wt Kozak pools. Following the transfection of expression plasmids, stable cell pools were established by drug selection. As shown in FIGS. 13A & 13B, similar cell viability was observed for both Kozak mix and Wt Kozak pools following addition of selection drugs (indicated by the black arrows). Then, one stable pool of each transfection for each condition was selected and subjected to single cell cloning. After recovering, plates were analyzed for clone recovery rate and 704 recovered clones per pool and condition were picked into 96 well plates. Primary screening based on harvest cell culture fluid (HCCF) titer showed differences in the profile and the absolute titer between conditions. Kozak mix clones showed less absolute titer and a more pronounced decrease in the titer that Wt Kozak clones (FIGS. 14A & 14B). This result matches the planned diversity of chain ratio combinations in Kozak mix clones while the profile of Wt Kozak clones was as expected for clones carrying only one chain ratio combination. Several rounds of screening based on HCCF titer, suspension-adaptation, and scale up were completed to determine the 11 top clones per pool of each transfection and for each condition, which resulted in 22 clones in total for each condition. Due to the fact that each Kozak mix clone has the potential to carry a different Kozak sequence variant combination and in order to understand the differences between combinations, an additional seven clones that showed medium and low HCCF titers compared with the top clones were also selected for further analysis.

Figure 15A:
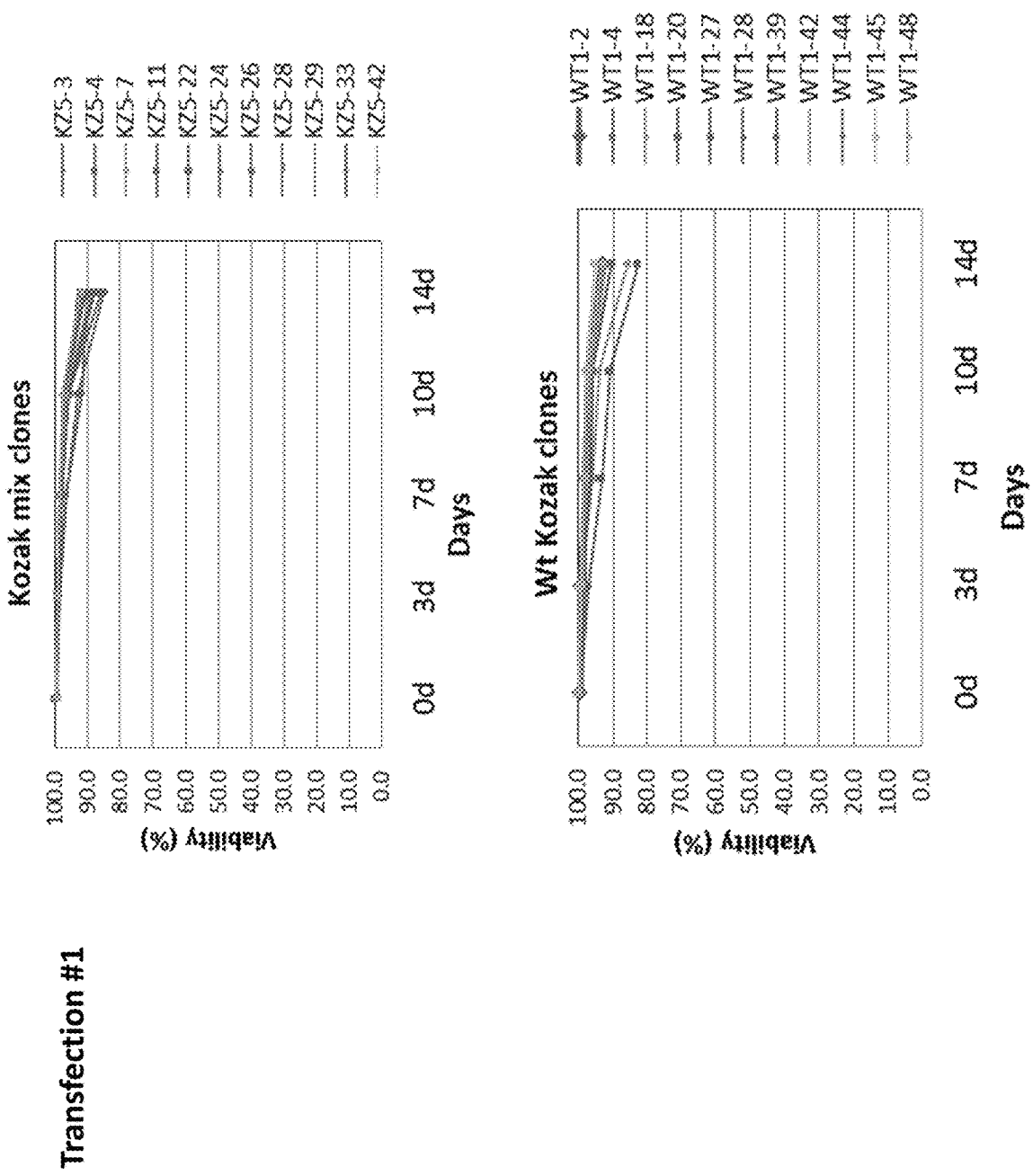
FIGS. 15A & 15B provide the viabilities for 14-day shake flask fed-batch production of Kozak mix clones and Wt-Kozak clones. The X-axis shows the days and the Y-axis shows the percentage of viability. The transfection number is indicated. All investigated clones showed comparable viabilities across the production assay. Final viabilities at day 14 were approximately 80-95% in both conditions except for one Kozak mix clone that ended up with 74% viability.
Figure 15B:
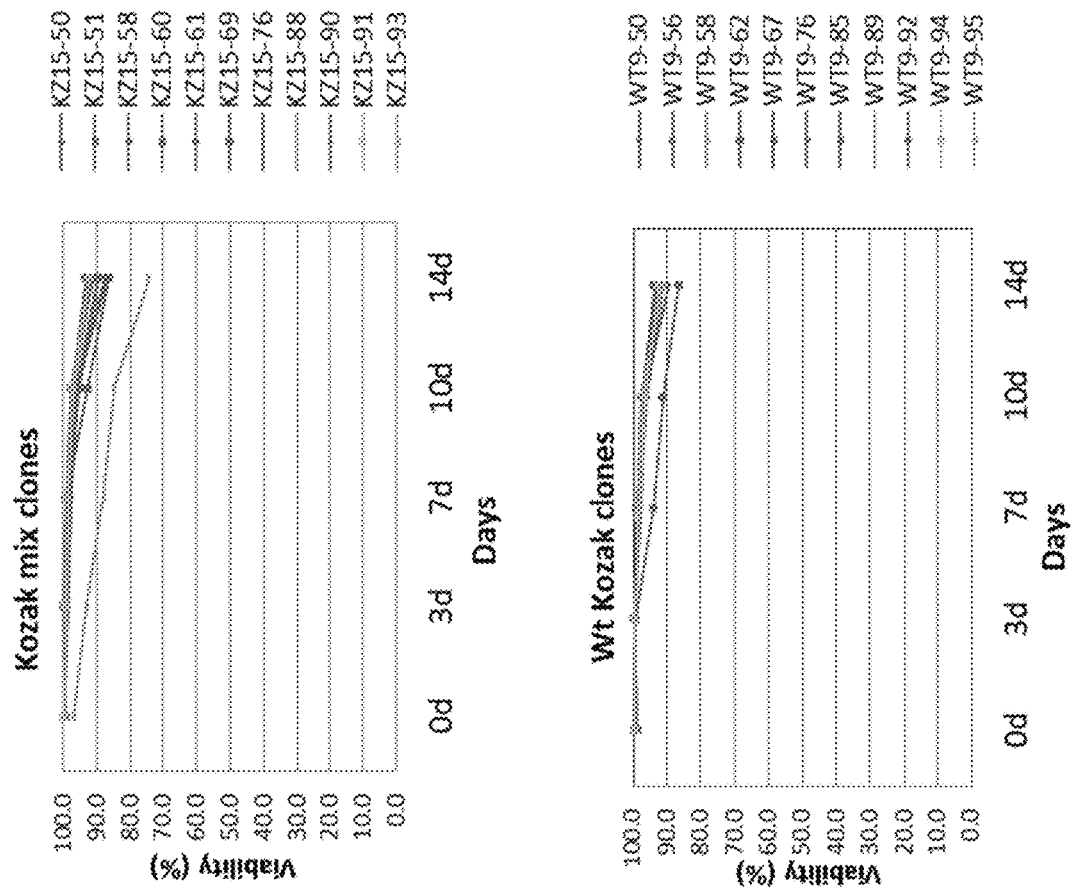
Figure 16A:
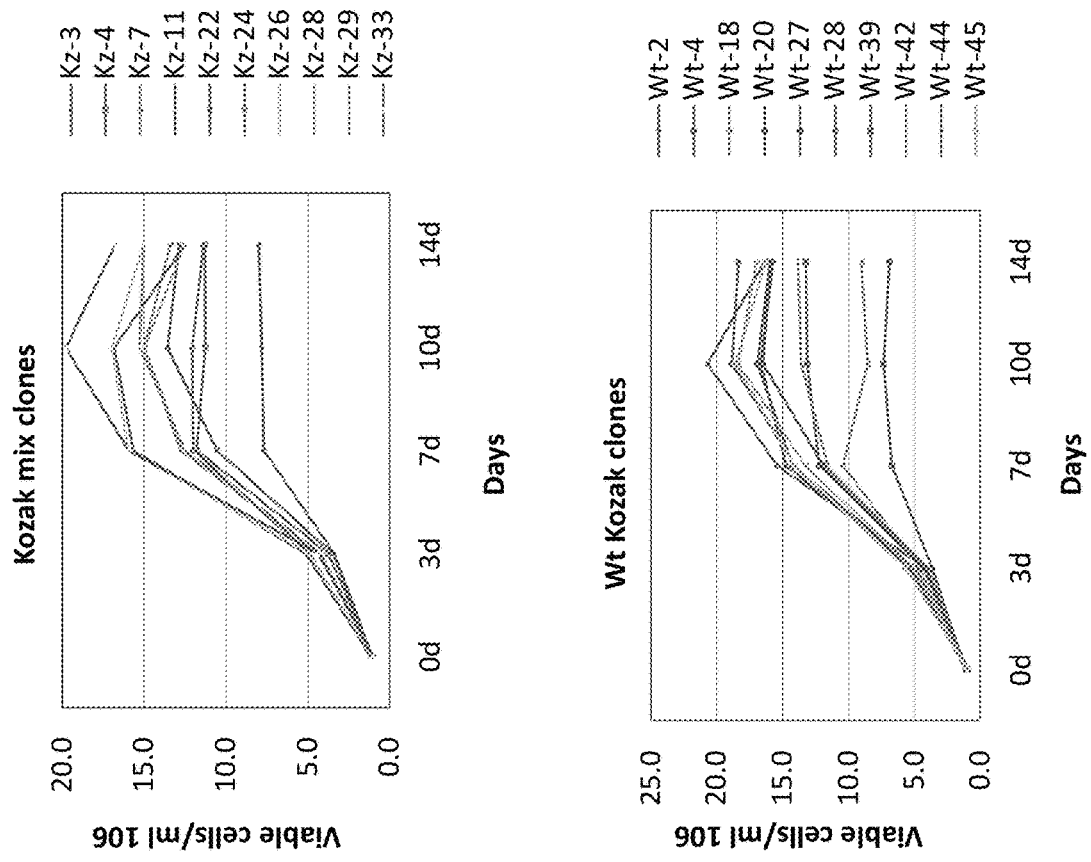
FIGS. 16A & 16B show the viable cell count for 14-day shake flask fed-batch production of Kozak mix clones and Wt-Kozak clones. The X-axis shows the days and the Y-axis shows the viable cells per milliliter per $10^6$. The transfection number is indicated. An exponential growth rate was observed until day 7, and subsequently a plateau phase was achieved for all individual clones.
Figure 16B:
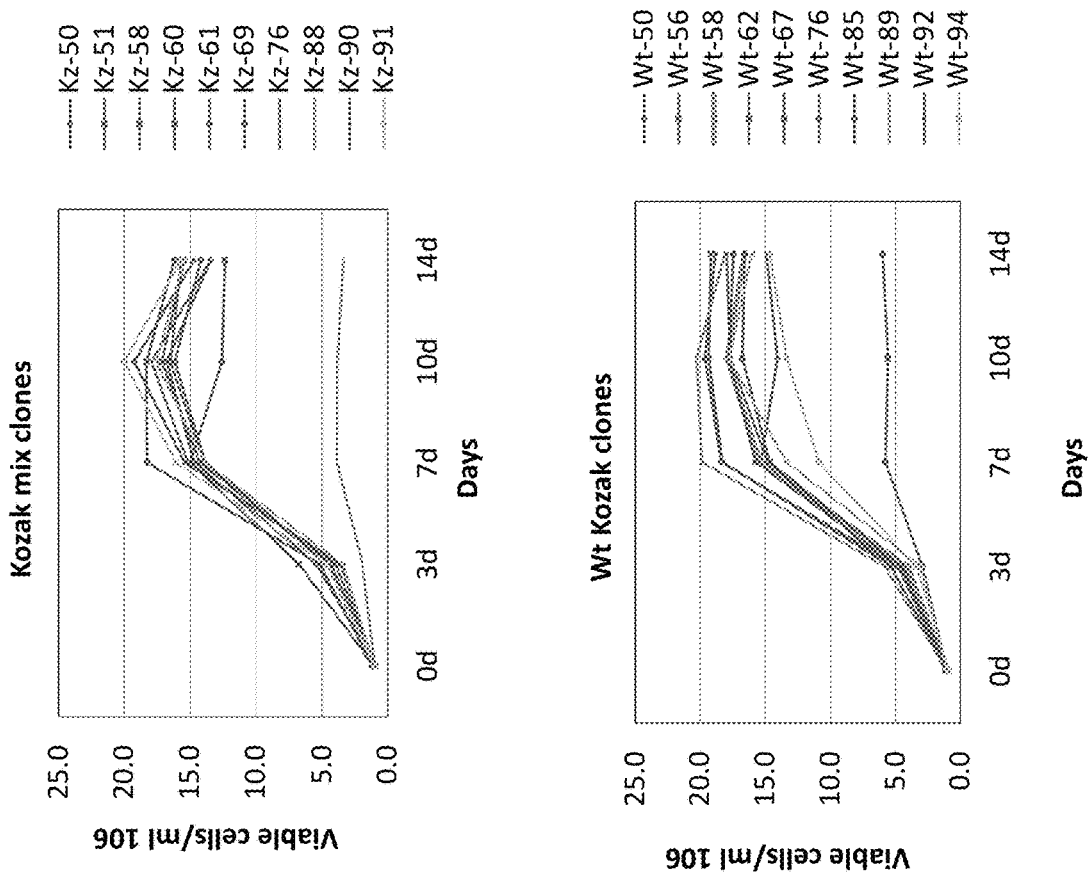

Example 4: Shake-Flash Performance of Bispecific Stable Clones Derived from a Mix of Kozak Sequence Variants A 14-day shake flask fed-batch production was used to evaluate the productivity and bispecific assembly of each individual clone selected from Example 3, above. All investigated clones showed comparable viabilities across the production assay. Final viabilities at day 14 were approximately 80-95% in both conditions except for one Kozak mix clone that ended up with 74% (FIGS. 15A & 15B). Similarly, for all individual clones, viable cell counts showed an exponential growth rate until day 7 and thereafter achieved plateau phase (FIGS. 16A & 16B). For each clone general titer, product quality and assembly efficiency were measured at day 14.

Figure 17:
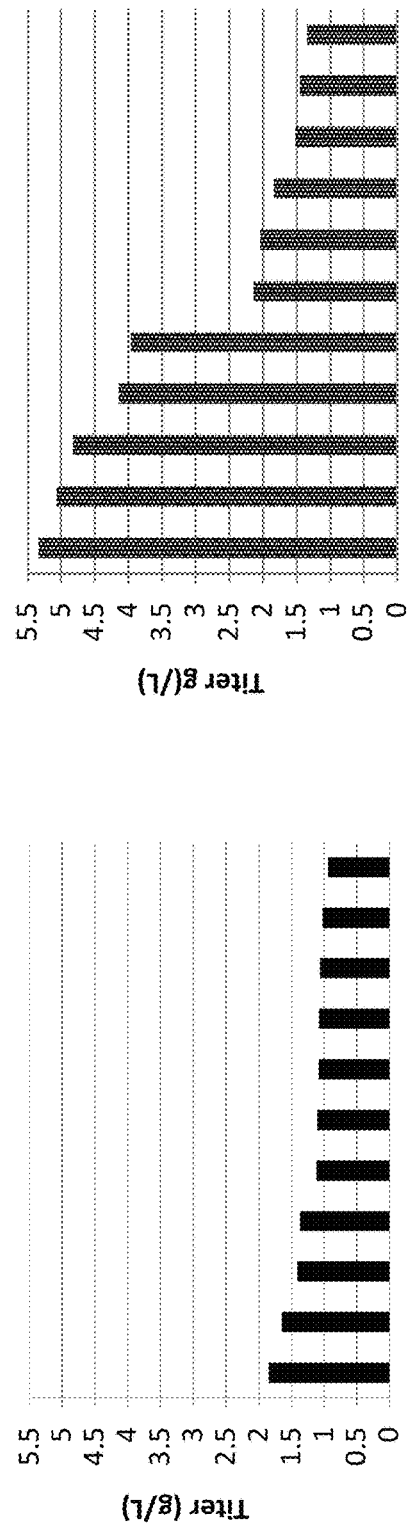
FIG. 17 shows the general absolute titer of the 11 top Kozak mix clones and Wt Kozak clones of each transfection. The titer was measured at day 14 of a shake flask fed-batch production. Individual Wt Kozak clones showed higher general absolute antibody titer than individual Kozak mix clones in both transfections. Note that titers represented the correctly assembled bispecific antibodies as well as half antibodies and other unwanted side products.
Figure 17:
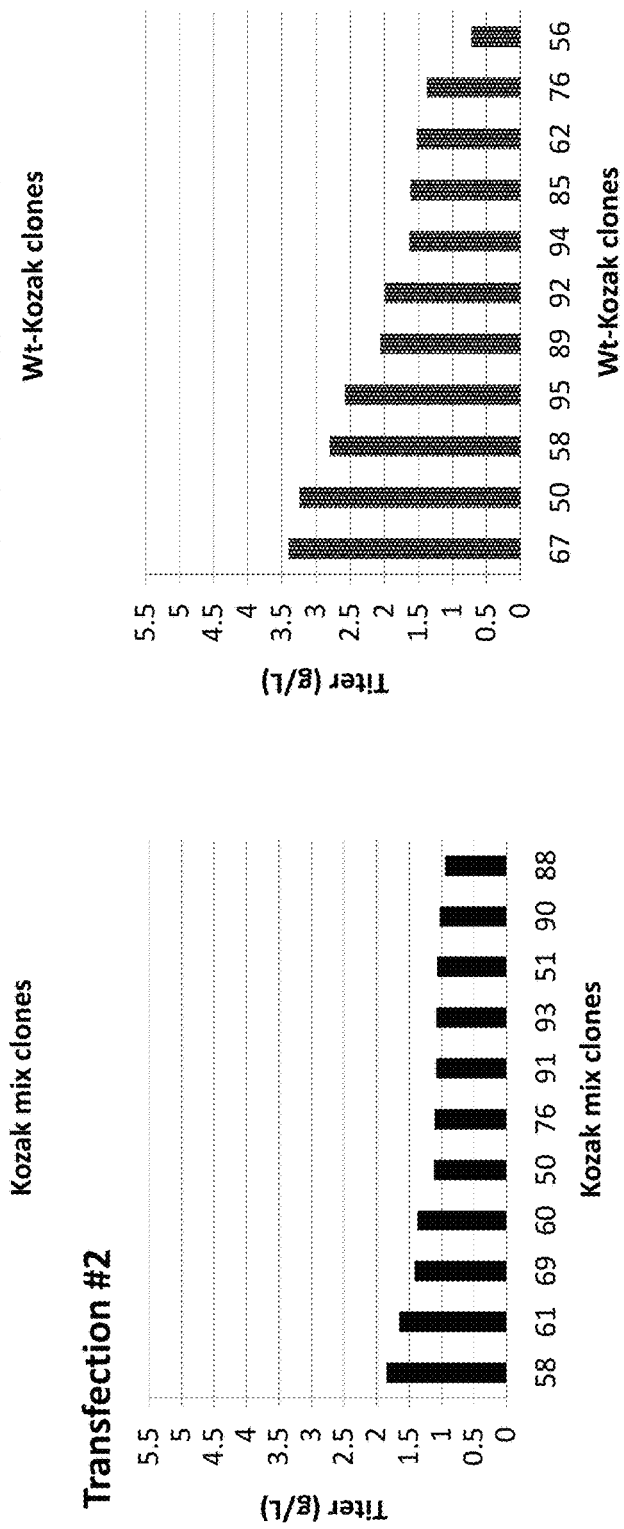
Figure 18:
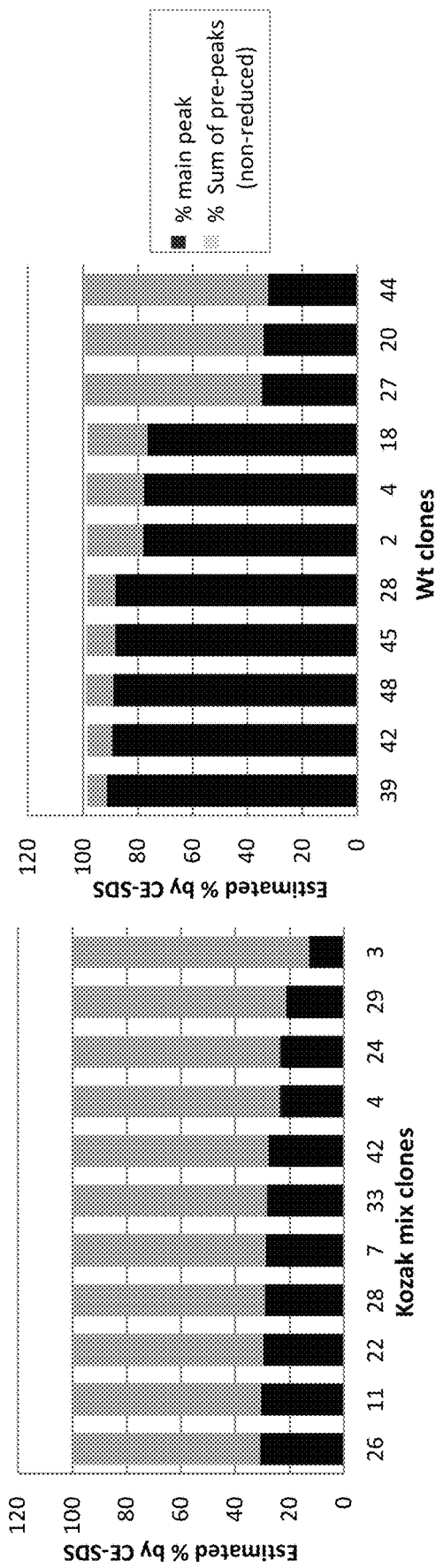
FIG. 18 provides an assessment of the quality of assembled antibodies for the 11 top clones of Kozak mix and Wt Kozak of each transfection. Samples were analyzed by Non-reducing capillary electrophoresis sodium dodecyl sulfate (CE-SDS) to distinguish and quantify two antibody formats: the main peak that equated with the full antibody (full-ab) in format of correctly and not-correctly assembled BsAb, and the sum of the pre-peaks that represented other species of different molecular weight. The transfection number is indicated. Within the top 22 clones there were fewer Kozak mix clones with a high percentage of full-ab formation than the Wt Kozak clones.
Figure 18:
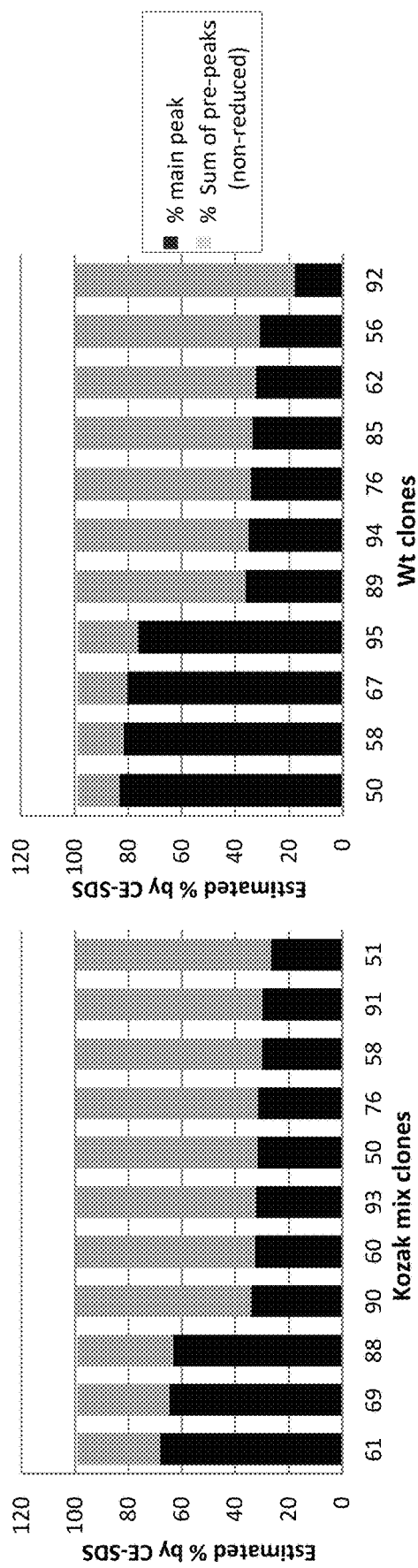

As shown in FIG. 17, individual Wt Kozak clones showed higher general absolute antibody titer than individual Kozak mix clones in both transfections. Note that in this titer correctly assembled bispecific antibodies, half antibodies, and other unwanted side products are all represented. In order to assess product quality, samples were analyzed by non-reducing capillary electrophoresis sodium dodecyl sulfate (CE-SDS) to provide information about molecular weight forms and other impurities. This technique permitted to distinguish and quantify two formats: the main peak that equated with the full antibody (full-ab) in format of correctly and not-correctly assembled BsAb, and the sum of pre-peaks that represented other species of different molecular weight. In general, within the top 22 clones, fewer Kozak mix clones with a high percentage of full-ab formation were observed compared to the Wt Kozak clones (FIG. 18). This result is consistent with the fact that although the chain ratios combination was different between conditions (1 versus 625 for Wt Kozak clones and Kozak mix clones respectively), the same number of individual clones was screened and selected for each condition, which favored finding a higher number of Wt Kozak clones with high product quality. The percentage of full antibody varied from clone to clone. Four individual Kozak mix clones of transfection 2 ranged around 60% of full antibody and then the percentage dropped to 30%.

All the individual Kozak mix clones of transfection 1 showed around 30% of the main peak (FIG. 18). This result is in agreement with the fact that within the diversity of chain ratio combinations for the Kozak mix pool, some of them were weak in terms of full-ab production. In addition, not all the highest antibody-producing clones (general titer) were linked with the highest content of full-ab in Kozak Mix clones.

In general, the best single Wt Kozak clones ranged between 80-90% of full-ab production. Similar to Kozak mix clones, individual Wt Kozak clones showed variability in the percentage of main peak depending on the clone. Also, a correlation between high general titer and high content of main peak in these clones was observed (FIG. 18).

Figure 19A:
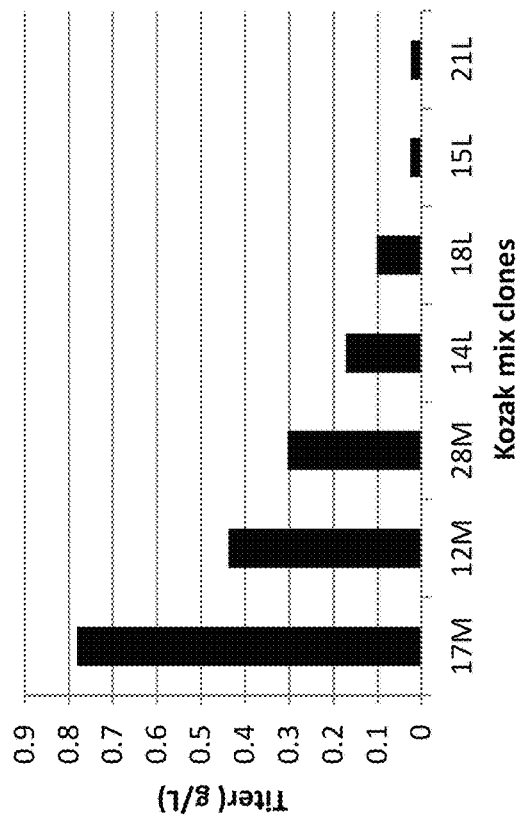
FIGS. 19A & 19B show the quality and assembly efficiency of medium (labeled with an M) and low (labeled with an L) HCCF titer Kozak mix clones.
Figure 19B:
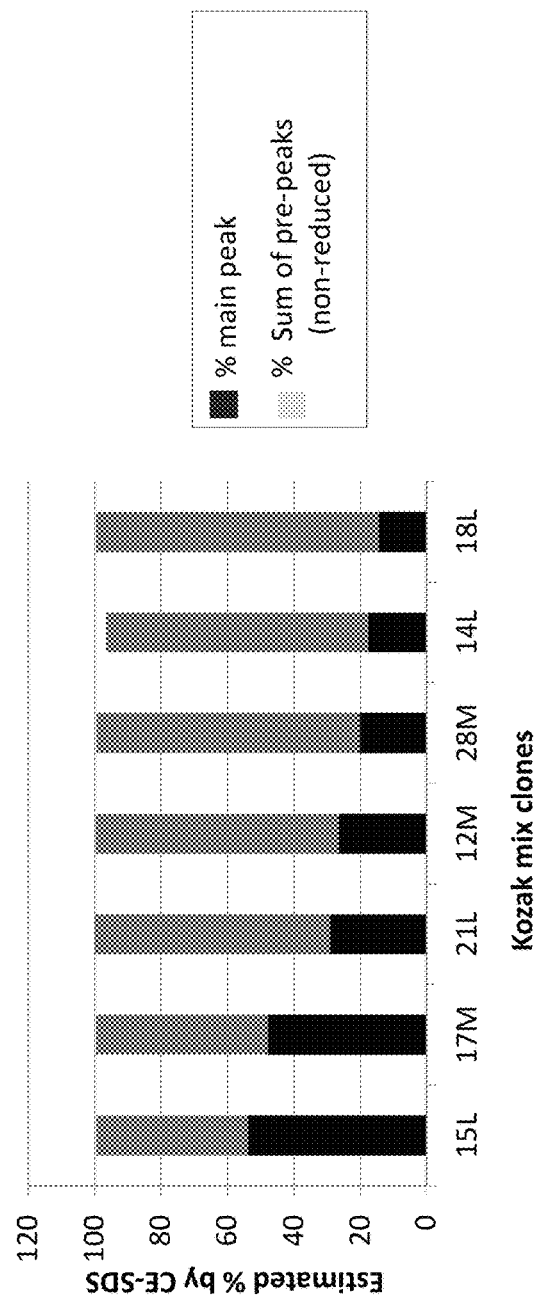

In parallel, evaluation of the performance in production of the seven additional clones with medium and low HCCF titer as compared with the top clones was done. Production titer of these clones showed a similar behavior as previously observed in the primary screening (FIG. 19A). CE-SDS data exhibited that product quality varied from clone to clone. Again, there was no direct correlation between general titer and the highest content of full antibody. In this way, some Kozak mix clones with more moderate titer compared to the top 11 clones showed a similar percentage of full-ab of about 50-60% (FIG. 19B).

Figure 20A:
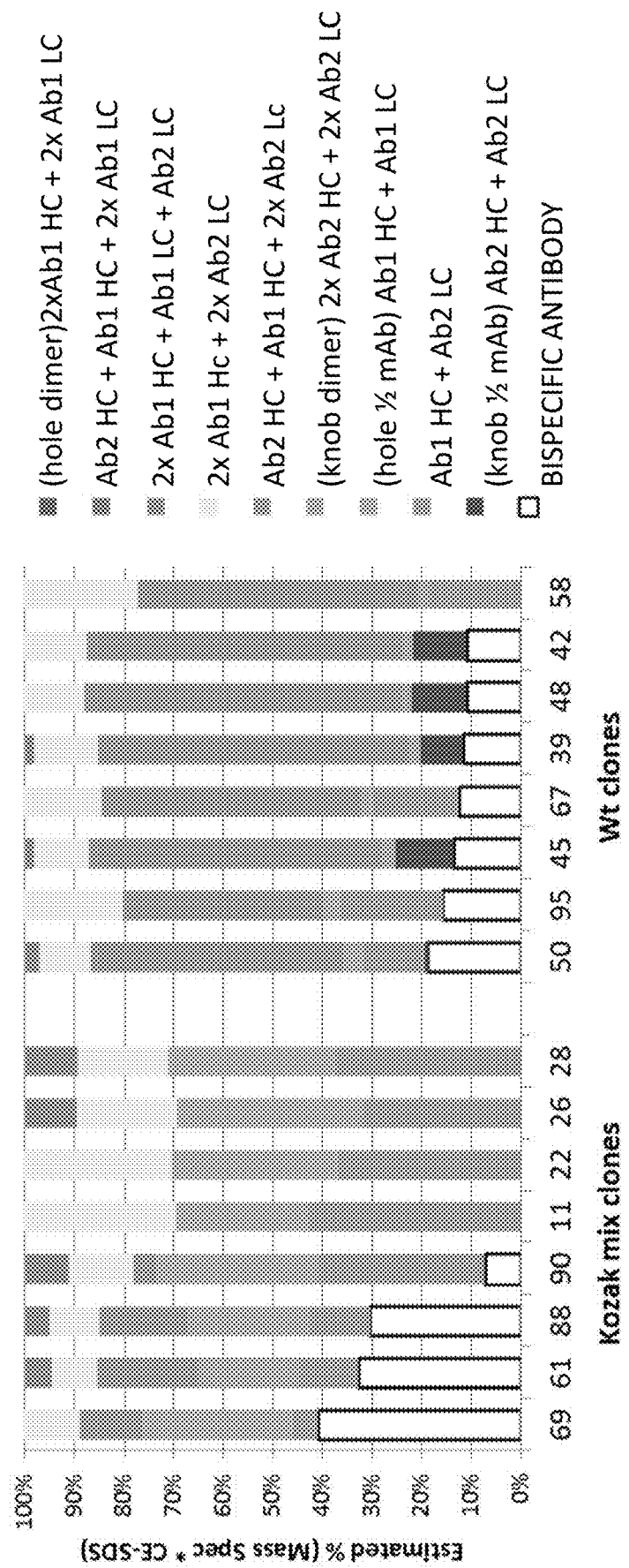
FIGS. 20A & 20B show the quality and effective BsAb titer of the indicated Wt Kozak and Kozak mix clones.

Example 5: Kozak Sequences Variants Enhanced Bispecific Assembly in Stable Clones The top four clones from CE-SDS analysis per condition and transfection were analyzed to identify and quantitate incorrect pairing of HC and LC. IgG was recovered from cell culture medium using Protein A affinity chromatography, and the resulting pools were analyzed by intact liquid-chromatography mass spectrometry (LC-MS). Following data deconvolution, several product-related variants including half-antibodies (HC+LC), homodimers (two of the same HC) and mispaired LC-HC species were identified. Using a calculation reported in the methods section, the LC-MS data was used to orthogonally weight the CE-SDS results to report percentages of species that otherwise overlap analytically on CE-SDS due to having similar mass.
Results Seven different bispecific antibody formats and three half-antibody formats were distinguished and quantified (FIG. 20A). The best individual Kozak mix clone showed around 40% of correctly assembled BsAb, which is more than double of what is observed with the best individual Wt Kozak clone (about 18%) (FIG. 20A). Since every single Kozak mix clone carried potentially a different combination of Kozak sequence variants, every clone showed a different percentage of BsAb assembly whereas Wt Kozak clones carrying the same combination showed a similar amount of BsAb assembly. Remarkably, the non-correctly assembled bispecific format Ab1-HC+Ab2-HC+2× Ab2-LC, which had a mispairing of the light chains, ranged from 41% to 64% of the full antibody produced by the Wt Kozak clones (FIG. 20A). These data point out the importance of tuning light chain ratios in order to achieve BsAb assembly when using single cell production. Analysis by mass spectrometry of Kozak mix clones with the lowest full-ab formation yield, as measured by CE-SDS, confirmed that the majority of the production material of those clones was as half-ab. The formats were the Ab1-HC+Ab2-LC and hole half-Ab1. The BsAb formats presented by these clones were mostly the non-correctly assembled BsAb 2×Ab1-HC+2×Ab2-LC and in a lower percentage, the BsAb format 2×Ab2-HC+Ab1-LC+Ab2-LC (FIG. 20A).

Figure 20B:
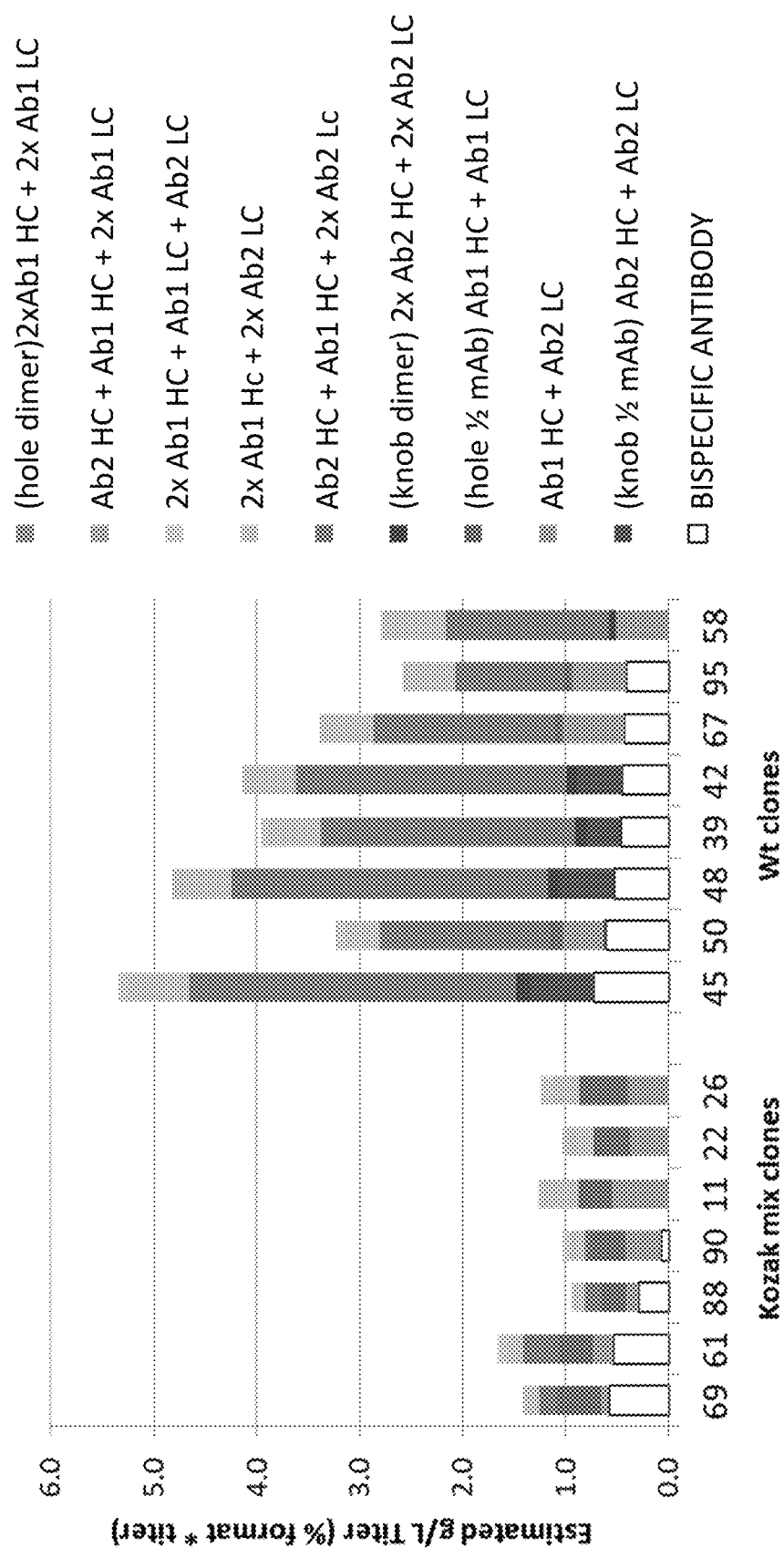

Knowing the percentage of each format, the effective bispecific titer was calculated (FIG. 20B). Because of the fact that some Kozak mix clones have higher BsAb assembly than Wt Kozak clones, Kozak mix clones overcame the deficit in general titer indicated previously (FIG. 17 and FIGS. 20A-20B). The effective bispecific titer was similar between the best clone per condition: 0.7 g/L and 0.6 g/L for the best Wt Kozak and Kozak mix clone, respectively. Since every Kozak Mix clone potentially carried a different Kozak variant combination, each clone showed a different percentage of bsAb assembly, whereas WT Kozak clones which carried the same combination showed a much narrower range of bsAb assembly (FIG. 20A). Remarkably, the incorrectly assembled bispecific format Ab2 HC+Ab1 HC+2× Ab2 LC, which had a mispairing of the light chain, ranged from 41-64% of the full-ab produced by the Wt Kozak clones (FIG. 20A). These data point out the importance of tuning light chain translational levels in order to achieve correct bsAb assembly when using single cell production.

However, as shown in FIG. 20B, Kozak clones offered smaller amounts of impurities that have to be removed during purification compared to Wt Kozak clones. Because of the fact that some Kozak mix clones have higher BsAb assembly than Wt Kozak clones, some Kozak mix clones overcame the deficit in general titer previously shown in FIG. 17. Importantly, Kozak Mix clones also presented fewer product-related impurities than the WT Kozak clones (FIG. 20B). Purification of the correctly assembled bsAb from a large number of almost identical potential byproducts is challenging. As some of the byproducts display close similarity to the target bsAb, their removal downstream often comes at the expense of yield or product quality. New analytical methods were needed to differentiate between the product of interest and these unique impurities but they require high-cost manufacturing and complicated technologies. Kozak Mix clones minimized the impurities and product-related variants formation (FIGS. 20B & 22B) demonstrating the benefit of this approach to produce bsAb in a single cell.

These data show that tailoring translational strength using Kozak sequence variants improves bispecific antibody assembly and reduces product-related impurities in CHO cells.

Example 6: Tuning Chain Ratios with Kozak Sequence Variants Produced High BsAb Yield The heterogeneity and diversity observed between Kozak mix clones in terms of BsAb assembly efficiency and product quality suggested that each clone had the chains expressing under a different Kozak sequence variant. In order to identify the Kozak combinations that each clone had and determine the best combination, sequencing of 29 Kozak mix clones was performed.
Results Data showed that Kozak mix clones with low product yield had expression of the heavy chain of Ab2 under either of the weakest Kozak sequence variants, Kz.135 and Kz.3, and the rest of the chains had either Wt or the strongest Kozak sequence variants (FIG. 21A-21B). As a result, an insufficient amount of the heavy chain of Ab2 was likely generated and consequently the final product was preferentially half-ab in the format of Ab1-HC+Ab2-LC and hole half-Ab2 (FIG. 20A). In other words, there was a range within which the expression of the heavy chain can be reduced before compromising full ab assembly.

Otherwise, when a combination of both Wt Kozak and the strongest Kozak sequence variants modulated the expression of the four chains, Kozak mix clones displayed a high BsAb assembly with a high titer (FIG. 21A). On the other hand, when a combination of both WT Kozak and the strongest Kozak sequence variant (Kz.228; relative strength of 1.3) modulated the expression of the four chains, Kozak Mix clones displayed high bsAb assembly and effective titer (FIGS. 20A & 21A, Kozak Mix Clones 69, 61 and 88). Interestingly, a slight light chain ratio of 1.3×-fold for the light chain of Ab1 vs 1.0×-fold for the light chain of Ab2 or vice versa exhibited by Kozak Mix Clone 69 and Kozak Mix Clone 61, respectively, significantly reduced the Ab2 light chain mispairing observed in WT Kozak clones (FIG. 20A; Ab2 HC+Ab1 HC+2×Ab2 LC). These data suggest that a reduction in translation of a selected chain, relative to the translational level of the other chains, can increase bsAb assembly efficiency and improve overall product quality by limiting the accumulation of sub-species. However, expression of either of the light chains under the strongest Kozak sequence variants prompted the generation of more sub-products composed by that chain instead of more correctly assembled BsAb. For instance, Kozak clone 69, which has the light chain Ab1 under the strongest Kozak sequence, exhibited about 30% of product as hole ½ Ab1 (FIG. 20A). This observation was in line with the fact that manufacturing of BsAb requires a stoichiometric chain pairing to merge into the bispecific format. In this regard, saturation of the protein production system can result in the accumulation of sub-species.

Considering this, and without wishing to be bound to theory, it is thought that a reduction in translation can prevent the accumulation of species and result in an enhancement of yield. Consistent with this conclusion, one combination that performed with half of the titer of the top Kozak clone and carried both the heavy and light chains of Ab1 under a weaker Kozak sequence, variant #135, exhibited the highest bispecific assembly detected (FIG. 22D). CE-SDS data of this clone showed that the product quality was about 48% of full-ab and about 52% of half-ab. MS data indicated that 100% of the full-ab corresponded with only the bispecific format, which is about 50% of correctly assembled BsAb. On the other hand, almost all of the half-ab species were knob ½ Ab2 (FIGS. 22A-22B), which is in line with the fact that the heavy and light chains of Ab2 were under Wt Kozak and the strongest Kozak sequence variant #228, respectively. Therefore, within a certain range, the downregulation of the expression of both chains of the molecule, which likely presents bottlenecks downstream of translation during the production process, had a positive impact on the assembly efficiency.

Clone 17M was one of the additional clones taken forward, even though the primary HCCF titer was modest (FIG. 19A). Although this clone had only roughly half the effective titer of the top Kozak clones, it exhibited the highest bispecific assembly at approximately 48%. MS data indicated that 100% of the full-ab corresponded with only the correct bispecific format and the half-ab species was limited almost exclusively to knob ½ mAb2 (FIGS. 22A & 22B).

These data can be explained from the sequencing results (FIG. 22C). Both the heavy and light chains of aAb1 were under a weaker Kozak variant (Kz.135) and, as noted earlier, Ab1 is a difficult to express molecule. Down-regulation of both chains, as in the case of using Kz.135 with a relative strength of approximately 0.5, could alleviate bottlenecks downstream of translation, such as in protein folding, resulting in a positive impact on assembly efficiency. With respect to Ab2, heavy chain and light chain were under stronger Kozak sequences, WT Kozak and the strongest Kozak variant (Kz.228), respectively (FIG. 22C).

Figure 22A:
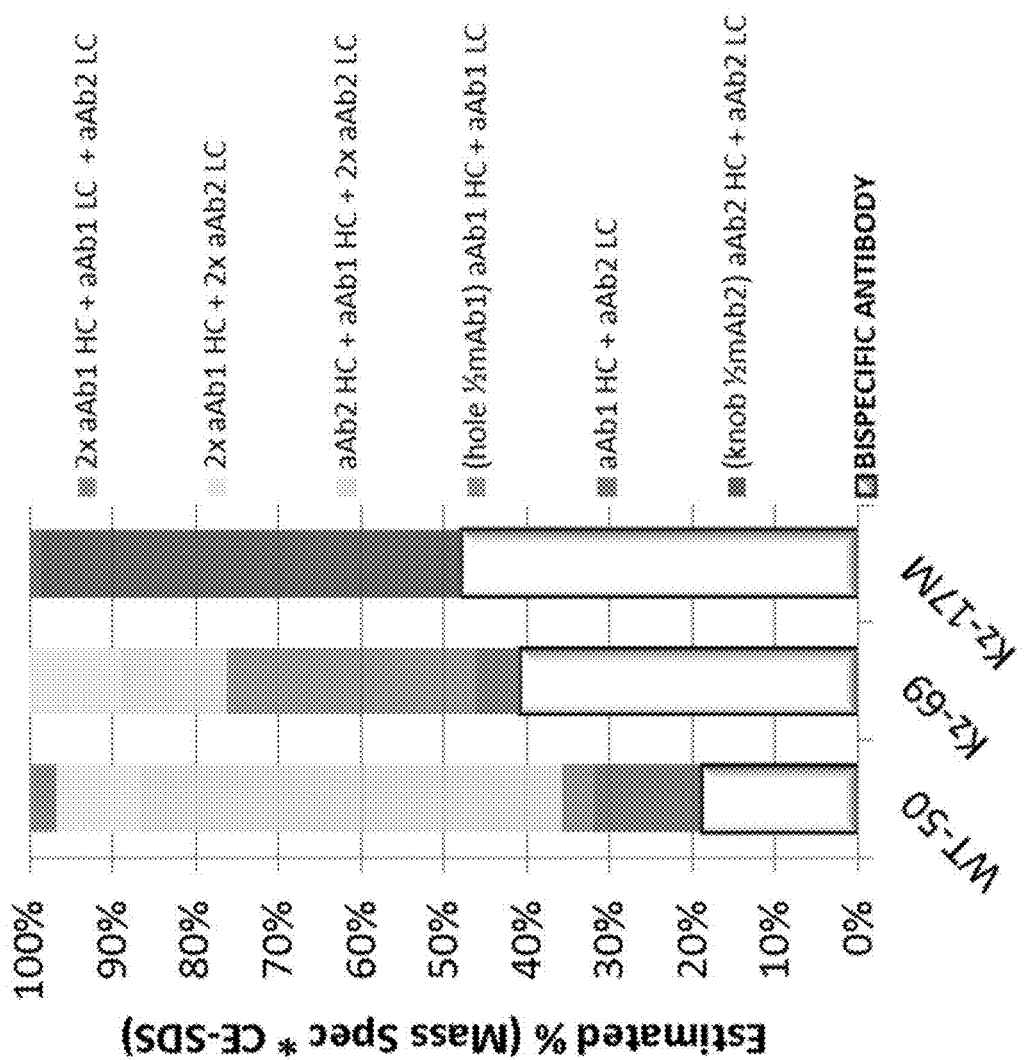
FIG. 22A shows quantification of bispecific antibody, incorrectly paired side products, and half-antibody species by mass spectrometry for WT Kozak Clone 50 and Kozak Mix Clones 69 and 17M. Correctly assembled bispecific antibody is highlighted in white.
Figure 22B:
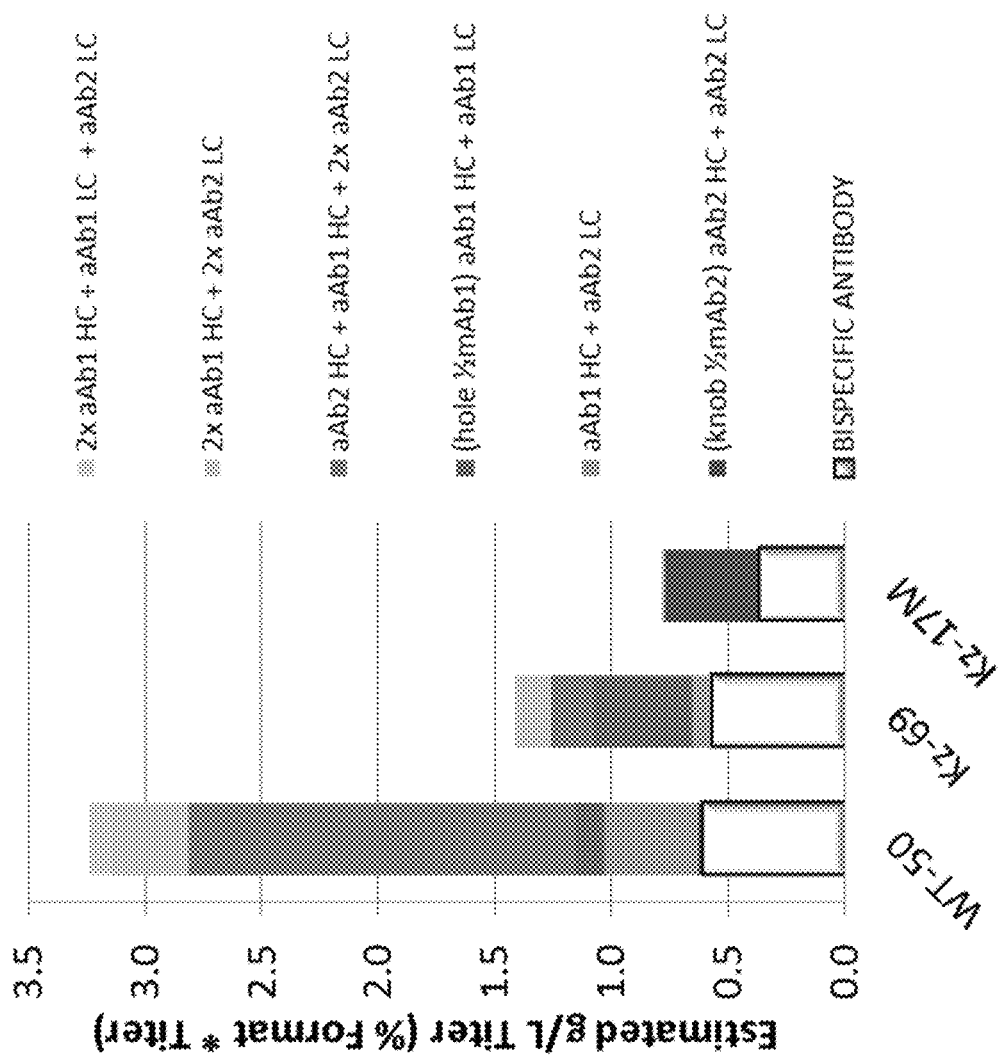
FIG. 22B shows the effective titer of bispecific antibody, incorrectly paired side products, and half-antibody species, calculated as a percentage of each species multiplied by general titer, is shown on the right. Correctly assembled bispecific antibody is highlighted in white.
Figure 22D:
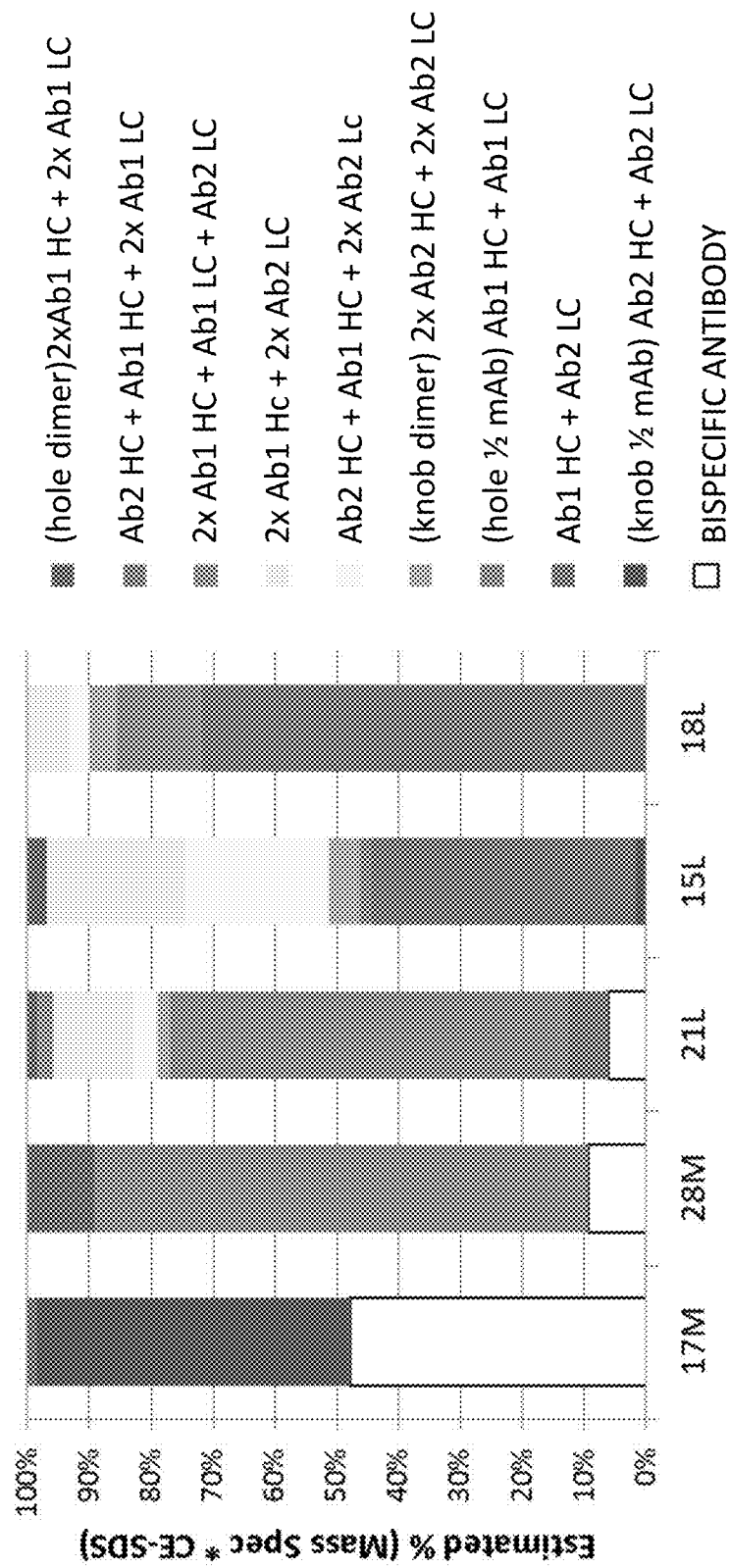
FIG. 22D provides quantification of the bispecific antibody, incorrectly paired side products, and half-antibody formats by mass spectrophotometry of the indicated medium and low Kozak mix clones. The percentage of BsAb assembly was below 10%, except for Kozak mix clone 17. The absolute abundance of each species correlated with the expression strength of each chain.

This combination, in conjunction with weaker Kozak sequences for aAb1, would result in an accumulation of aAb2 half-ab while limiting any significant buildup of other species (FIGS. 22A & 22B).

In the same way, sequencing of the seven additional clones with medium and low HCCF titer compared to the top clones was performed. In general, it was observed that the expression of most of the chains for both molecules was controlled by the weakest Kozak sequence variants in these clones (FIG. 21C). This result supports the low performance of these clones compared to the top clones.

In order to elucidate Ab species and BsAb formats, five of these Kozak mix clones carrying the combination of Kozak sequence variants most different from the top 11 clones were analyzed by mass spectrophotometry. The percentage of BsAb assembly was below 10%, except for the Kozak mix clone 17. The absolute abundance of each species correlated with the expression strength of each chain (FIG. 22D).

Although the foregoing disclosure has been described in some detail by way of illustration and example for purposes of clarity of understanding, the descriptions and examples should not be construed as limiting the scope of the present disclosure. The disclosures of all patent and scientific literature cited herein are expressly incorporated in their entirety by reference.

What is claimed is:

1. A method for producing a bispecific antibody in a eukaryotic host cell, wherein the bispecific antibody comprises a first half antibody comprising a first antibody heavy chain and a first antibody light chain and a second half antibody comprising a second antibody heavy chain and a second antibody light chain, the method comprising:
   (a) providing the eukaryotic host cell,
      wherein the eukaryotic host cell comprises a first polynucleotide comprising a first translation initiation sequence operably linked to a first open-reading frame that encodes the first antibody heavy chain, a second polynucleotide comprising a second translation initiation sequence operably linked to a second open-reading frame that encodes the first antibody light chain, a third polynucleotide comprising a third translation initiation sequence operably linked to a third open-reading frame that encodes the second antibody heavy chain, and a fourth polynucleotide comprising a fourth translation initiation sequence operably linked to a fourth open-reading frame that encodes the second antibody light chain,
      wherein the first half antibody is expressed at a lower level than the second half antibody when each half antibody is expressed individually in the eukaryotic host cell, and
      wherein the first translation initiation sequence comprises the sequence of SEQ ID NO:9, wherein the second translation initiation sequence comprises the sequence of SEQ ID NO:9, wherein the third translation initiation sequence comprises the sequence of SEQ ID NO:2, and wherein the fourth translation initiation sequence comprises the sequence of SEQ ID NO:11;
   (b) culturing the eukaryotic host cell under conditions suitable for expression of the first and second antibody heavy and light chains, wherein the first and second antibody heavy and light chains form the bispecific antibody, and wherein the first half antibody binds a first antigen and the second half antibody binds a second antigen; and
   (c) recovering the bispecific antibody produced by the eukaryotic host cell.

2. The method of claim 1, wherein:
   (a) the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the first antibody Fc region is altered so that within the CH3/CH3 interface one or more amino acid residues are replaced with amino acid residues having a smaller side chain volume, thereby generating a hole on the surface of the CH3 domain of the first antibody Fc region that interacts with the CH3 domain of the second antibody Fc region; and wherein the CH3 domain of the second antibody Fc region is altered so that within the CH3/CH3 interface one or more amino acid residues are replaced with amino acid residues having a larger side chain volume, thereby generating a knob on the surface of the CH3 domain of the second antibody Fc region that interacts with the CH3 domain of the first antibody Fc region; or
   (b) the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the second antibody Fc region is altered so that within the CH3/CH3 interface one or more amino acid residues are replaced with amino acid residues having a smaller side chain volume, thereby generating a hole on the surface of the CH3 domain of the second antibody Fc region that interacts with the CH3 domain of the first antibody Fc region; and wherein the CH3 domain of the first antibody Fc region is altered so that within the CH3/CH3 interface one or more amino acid residues are replaced with amino acid residues having a larger side chain volume, thereby generating a knob on the surface of the CH3 domain of the first antibody Fc region that interacts with the CH3 domain of the second antibody Fc region.

3. The method of claim 2, wherein the knob mutation comprises at least one of: T366Y, T366W, T394W, and F405W, numbering based on human IgG1 according to EU index; and/or wherein the hole mutation comprises at least one of: F405A, Y407T, Y407A, T366S, L368A, Y407V, and T394S, numbering based on human IgG1 according to EU index.

4. The method of claim 1, wherein:
   (a) the first antibody light chain comprises a first mutation, wherein the first antibody heavy chain comprises a second mutation, and wherein the first and second mutations promote selective association of the first antibody light chain with the first antibody heavy chain; or (b) the second antibody light chain comprises a third mutation, wherein the second antibody heavy chain comprises a fourth mutation, and wherein the third and fourth mutations promote selective association of the second antibody light chain with the second antibody heavy chain.

5. The method of claim 4, wherein the first mutation comprises an amino acid substitution at V133, and wherein the second mutation comprises an amino acid substitution at S183, numbering based on EU index; or wherein the third mutation comprises an amino acid substitution at V133, and wherein the fourth mutation comprises an amino acid substitution at S183, numbering based on EU index.

6. The method of claim 1, wherein the first antibody light chain comprises a V133K mutation, the first antibody heavy chain comprises an S183E mutation, the second antibody light chain comprises a V133E mutation, and the second antibody heavy chain comprises an S183K mutation, numbering based on EU index; or wherein the second antibody light chain comprises a V133K mutation, the second antibody heavy chain comprises an S183E mutation, the first antibody light chain comprises a V133E mutation, and the first antibody heavy chain comprises an S183K mutation, numbering based on EU index.

7. The method of claim 6, wherein the first antibody heavy chain further comprises T366S, L368A, and Y407V mutations, and the second antibody heavy chain further comprises a T366W mutation, numbering based on human IgG1 according to EU index;

wherein the second antibody heavy chain further comprises T366S, L368A, and Y407V mutations, and the first antibody heavy chain further comprises a T366W mutation, numbering based on human IgG1 according to EU index.

8. The method of claim 1, wherein the first, second, third, and fourth polynucleotides are integrated into one or more chromosomes of the eukaryotic host cell.

9. The method of claim 1, wherein the first, second, third, and fourth polynucleotides are part of one or more extrachromosomal polynucleotides in the eukaryotic host cell.

10. The method of claim 1, wherein the eukaryotic host cell is a mammalian host cell.

11. The method of claim 10, wherein the mammalian host cell is a Chinese hamster ovary (CHO) cell.

12. The method of claim 1, wherein the first half antibody is expressed at a level that is at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or at least 100% lower than expression level of the second half antibody when each half antibody is expressed individually in the eukaryotic host cell.

13. A recombinant eukaryotic host cell for expression of a bispecific antibody that comprises a first half antibody comprising a first antibody heavy chain and a first antibody light chain and a second half antibody comprising a second antibody heavy chain and a second antibody light chain, the recombinant cell comprising:

(a) a first polynucleotide comprising a first translation initiation sequence operably linked to a first open-reading frame that encodes the first antibody heavy chain;

(b) a second polynucleotide comprising a second translation initiation sequence operably linked to a second open-reading frame that encodes the first antibody light chain;

(c) a third polynucleotide comprising a third translation initiation sequence operably linked to a third open-reading frame that encodes the second antibody heavy chain; and (d) a fourth polynucleotide comprising a fourth translation initiation sequence operably linked to a fourth open-reading frame that encodes the second antibody light chain;

wherein the first half antibody is expressed at a lower level than the second half antibody when each half antibody is expressed individually in the recombinant eukaryotic host cell; and wherein the first translation initiation sequence comprises the sequence of SEQ ID NO:9, wherein the second translation initiation sequence comprises the sequence of SEQ ID NO:9, wherein the third translation initiation sequence comprises the sequence of SEQ ID NO:2, and wherein the fourth translation initiation sequence comprises the sequence of SEQ ID NO:11.

14. The cell of claim 13, wherein the first, second, third, and fourth polynucleotides are part of one or more extrachromosomal polynucleotides in the eukaryotic host cell.

15. The cell of claim 13, wherein the eukaryotic host cell is a mammalian host cell.

16. A kit of polynucleotides for expression of a bispecific antibody that comprises a first half antibody comprising a first antibody heavy chain and a first antibody light chain and a second half antibody comprising a second antibody heavy chain and a second antibody light chain, the kit comprising:

(a) a first polynucleotide comprising a first translation initiation sequence operably linked to a first open-reading frame that encodes the first antibody heavy chain;

(b) a second polynucleotide comprising a second translation initiation sequence operably linked to a second open-reading frame that encodes the first antibody light chain;

(c) a third polynucleotide comprising a third translation initiation sequence operably linked to a third open-reading frame that encodes the second antibody heavy chain; and (d) a fourth polynucleotide comprising a fourth translation initiation sequence operably linked to a fourth open-reading frame that encodes the second antibody light chain;

wherein the first translation initiation sequence comprises the sequence of SEQ ID NO:9, wherein the second translation initiation sequence comprises the sequence of SEQ ID NO:9, wherein the third translation initiation sequence comprises the sequence of SEQ ID NO:2, and wherein the fourth translation initiation sequence comprises the sequence of SEQ ID NO:11 wherein one or more of the first, second, third, and fourth translation initiation sequences is non-native with regard to the respective open-reading frame to which it is operably linked.

17. The method of claim 1, wherein each of the first, second, third, and fourth polynucleotides is operably linked to a promoter.

18. The method of claim 17, wherein the first and the second polynucleotides are operably linked to the same promoter, and wherein the third and the fourth polynucleotides are operably linked to the same promoter.

19. The method of claim 8, wherein the first, second, third, and fourth polynucleotides are integrated into the same chromosomal locus of the eukaryotic host cell.

20. The cell of claim 15, wherein the mammalian host cell is a Chinese hamster ovary (CHO) cell.

21. The cell of claim 13, wherein each of the first, second, third, and fourth polynucleotides is operably linked to a promoter.

22. The cell of claim 13, wherein:
(a) the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the first antibody Fc region is altered so that within the CH3/CH3 interface one or more amino acid residues are replaced with amino acid residues having a smaller side chain volume, thereby generating a hole on the surface of the CH3 domain of the first antibody Fc region that interacts with the CH3 domain of the second antibody Fc region; and wherein the CH3 domain of the second antibody Fc region is altered so that within the CH3/CH3 interface one or more amino acid residues are replaced with amino acid residues having a larger side chain volume, thereby generating a knob on the surface of the CH3 domain of the second antibody Fc region that interacts with the CH3 domain of the first antibody Fc region; or
(b) the first antibody heavy chain comprises a first antibody Fc region comprising a CH2 domain and a CH3 domain; wherein the second antibody heavy chain comprises a second antibody Fc region comprising a CH2 domain and a CH3 domain; wherein the CH3 domain of the second antibody Fc region is altered so that within the CH3/CH3 interface one or more amino acid residues are replaced with amino acid residues having a smaller side chain volume, thereby generating a hole on the surface of the CH3 domain of the second antibody Fc region that interacts with the CH3 domain of the first antibody Fc region; and wherein the CH3 domain of the first antibody Fc region is altered so that within the CH3/CH3 interface one or more amino acid residues are replaced with amino acid residues having a larger side chain volume, thereby generating a knob on the surface of the CH3 domain of the first antibody Fc region that interacts with the CH3 domain of the second antibody Fc region.

23. The cell of claim 22, wherein the knob mutation comprises at least one of: T366Y, T366W, T394W, and F405W, numbering based on human IgG1 according to EU index.

24. The cell of claim 22, wherein the hole mutation comprises at least one of: F405A, Y407T, Y407A, T366S, L368A, Y407V, and T394S, numbering based on human IgG1 according to EU index.

25. The cell of claim 13, wherein the first antibody heavy chain comprises T366S, L368A, and Y407V mutations, and the second antibody heavy chain comprises a T366W mutation, numbering based on human IgG1 according to EU index; or wherein the second antibody heavy chain comprises T366S, L368A, and Y407V mutations, and the first antibody heavy chain comprises a T366W mutation, numbering based on human IgG1 according to EU index.

\* \* \* \* \*

SEQUENCE LISTING

```
<160> NUMBER OF SEQ ID NOS: 23

<210> SEQ ID NO 1
<211> LENGTH: 11
<212> TYPE: DNA
<213> ORGANISM: Artificial Sequence
<220> FEATURE:
<223> OTHER INFORMATION: Synthetic Construct
<220> FEATURE:
<221> NAME/KEY: misc_feature
<222> LOCATION: 1, 2, 3, 4, 5, 9
<223> OTHER INFORMATION: n = A,T,C or G

<400> SEQUENCE: 1
nnnnnatgng a                                                          11

<210> SEQ ID NO 2
<211> LENGTH: 9
<212> TYPE: DNA
<213> ORGANISM: Artificial Sequence
<220> FEATURE:
```

```
<223> OTHER INFORMATION: Synthetic Construct

<400> SEQUENCE: 2 ccaccatgg                                                                  9

<210> SEQ ID NO 3
<211> LENGTH: 7
<212> TYPE: DNA
<213> ORGANISM: Artificial Sequence
<220> FEATURE:
<223> OTHER INFORMATION: Synthetic Construct

<400> SEQUENCE: 3 accatgg                                                                    7

<210> SEQ ID NO 4
<211> LENGTH: 7
<212> TYPE: DNA
<213> ORGANISM: Artificial Sequence
<220> FEATURE:
<223> OTHER INFORMATION: Synthetic Construct

<400> SEQUENCE: 4 gccatgg                                                                    7

<210> SEQ ID NO 5
<211> LENGTH: 7
<212> TYPE: DNA
<213> ORGANISM: Artificial Sequence
<220> FEATURE:
<223> OTHER INFORMATION: Synthetic Construct

<400> SEQUENCE: 5 tccatgg                                                                    7

<210> SEQ ID NO 6
<211> LENGTH: 7
<212> TYPE: DNA
<213> ORGANISM: Artificial Sequence
<220> FEATURE:
<223> OTHER INFORMATION: Synthetic Construct

<400> SEQUENCE: 6 tagatgg                                                                    7

<210> SEQ ID NO 7
<211> LENGTH: 7
<212> TYPE: DNA
<213> ORGANISM: Artificial Sequence
<220> FEATURE:
<223> OTHER INFORMATION: Synthetic Construct

<400> SEQUENCE: 7 tttatgg                                                                    7

<210> SEQ ID NO 8
<211> LENGTH: 9
<212> TYPE: DNA
<213> ORGANISM: Artificial Sequence
<220> FEATURE:
<223> OTHER INFORMATION: Synthetic Construct

<400> SEQUENCE: 8 tttttatgg                                                                  9
```

```
<210> SEQ ID NO 9
<211> LENGTH: 9
<212> TYPE: DNA
<213> ORGANISM: Artificial Sequence
<220> FEATURE:
<223> OTHER INFORMATION: Synthetic Construct

<400> SEQUENCE: 9 ggctcatgc                                                                     9

<210> SEQ ID NO 10
<211> LENGTH: 9
<212> TYPE: DNA
<213> ORGANISM: Artificial Sequence
<220> FEATURE:
<223> OTHER INFORMATION: Synthetic Construct

<400> SEQUENCE: 10 cctagatgc                                                                     9

<210> SEQ ID NO 11
<211> LENGTH: 9
<212> TYPE: DNA
<213> ORGANISM: Artificial Sequence
<220> FEATURE:
<223> OTHER INFORMATION: Synthetic Construct

<400> SEQUENCE: 11 gaagtatga                                                                     9

<210> SEQ ID NO 12
<211> LENGTH: 22
<212> TYPE: DNA
<213> ORGANISM: Artificial Sequence
<220> FEATURE:
<223> OTHER INFORMATION: Synthetic Construct

<400> SEQUENCE: 12
gataccagca ccagcaccgc ct                                                     22

<210> SEQ ID NO 13
<211> LENGTH: 21
<212> TYPE: DNA
<213> ORGANISM: Artificial Sequence
<220> FEATURE:
<223> OTHER INFORMATION: Synthetic Construct

<400> SEQUENCE: 13
atgggcggta ggcgtgtacg g                                                      21

<210> SEQ ID NO 14
<211> LENGTH: 20
<212> TYPE: DNA
<213> ORGANISM: Artificial Sequence
<220> FEATURE:
<223> OTHER INFORMATION: Synthetic Construct

<400> SEQUENCE: 14
ctgaacagcc gcacccgcaa                                                        20

<210> SEQ ID NO 15
<211> LENGTH: 21
<212> TYPE: DNA
<213> ORGANISM: Artificial Sequence
<220> FEATURE:
<223> OTHER INFORMATION: Synthetic Construct
```

<400> SEQUENCE: 15
atgggcggta ggcgtgtacg g                                                 21

<210> SEQ ID NO 16
<211> LENGTH: 19
<212> TYPE: DNA
<213> ORGANISM: Artificial Sequence
<220> FEATURE:
<223> OTHER INFORMATION: Synthetic Construct

<400> SEQUENCE: 16
gtgatttggc gcggcggca                                                    19

<210> SEQ ID NO 17
<211> LENGTH: 21
<212> TYPE: DNA
<213> ORGANISM: Artificial Sequence
<220> FEATURE:
<223> OTHER INFORMATION: Synthetic Construct

<400> SEQUENCE: 17
atgggcggta ggcgtgtacg g                                                 21

<210> SEQ ID NO 18
<211> LENGTH: 21
<212> TYPE: DNA
<213> ORGANISM: Artificial Sequence
<220> FEATURE:
<223> OTHER INFORMATION: Synthetic Construct

<400> SEQUENCE: 18
gtgcgcaacc tggtggtgtg g                                                 21

<210> SEQ ID NO 19
<211> LENGTH: 21
<212> TYPE: DNA
<213> ORGANISM: Artificial Sequence
<220> FEATURE:
<223> OTHER INFORMATION: Synthetic Construct

<400> SEQUENCE: 19
atgggcggta ggcgtgtacg g                                                 21

<210> SEQ ID NO 20
<211> LENGTH: 20
<212> TYPE: DNA
<213> ORGANISM: Artificial Sequence
<220> FEATURE:
<223> OTHER INFORMATION: Synthetic Construct

<400> SEQUENCE: 20
aacggtgcat tggaacgcgg                                                   20

<210> SEQ ID NO 21
<211> LENGTH: 20
<212> TYPE: DNA
<213> ORGANISM: Artificial Sequence
<220> FEATURE:
<223> OTHER INFORMATION: Synthetic Construct

<400> SEQUENCE: 21
tggcttcgtt agaacgcagc                                                   20

<210> SEQ ID NO 22
<211> LENGTH: 10

```
<212> TYPE: DNA
<213> ORGANISM: Artificial Sequence
<220> FEATURE:
<223> OTHER INFORMATION: Synthetic Construct

<400> SEQUENCE: 22
ccaccatggg                                                                 10

<210> SEQ ID NO 23
<211> LENGTH: 11
<212> TYPE: DNA
<213> ORGANISM: Artificial Sequence
<220> FEATURE:
<223> OTHER INFORMATION: Synthetic Construct

<400> SEQUENCE: 23
ccaccatggg a                                                               11
```